United States Patent [19]

Milligan et al.

[11] 4,410,942
[45] Oct. 18, 1983

[54] SYNCHRONIZING BUFFERED PERIPHERAL SUBSYSTEMS TO HOST OPERATIONS

[75] Inventors: Charles A. Milligan, St. David; Edwin R. Videki, II; Winston F. Yates, both of Tucson, all of Ariz.

[73] Assignee: International Business Machines Corporation, Armonk, N.Y.

[21] Appl. No.: 241,273

[22] Filed: Mar. 6, 1981

[51] Int. Cl.³ .................. G06F 15/00; G06F 3/00
[52] U.S. Cl. .................................................... 364/200
[58] Field of Search ............................ 364/200, 900

[56] References Cited

U.S. PATENT DOCUMENTS

| | | | |
|---|---|---|---|
| 3,293,612 | 12/1966 | Ling | 364/200 |
| 3,297,994 | 1/1967 | Klein | 364/200 |
| 3,411,143 | 12/1968 | Beausoleil et al. | 364/200 |
| 3,432,813 | 3/1969 | Annunziata et al. | 364/200 |
| 3,528,062 | 9/1970 | Lehman et al. | 364/200 |
| 3,564,502 | 2/1971 | Boehner et al. | 364/200 |
| 3,593,302 | 3/1971 | Ochi et al. | 364/200 |
| 3,639,909 | 2/1972 | Hauck et al. | 364/200 |
| 3,643,227 | 2/1972 | Smith et al. | 364/200 |
| 3,699,530 | 10/1972 | Capowski | 364/200 |
| 3,710,324 | 1/1973 | Cohen et al. | 364/200 |
| 3,736,566 | 5/1973 | Anderson et al. | 364/200 |
| 3,848,233 | 11/1974 | Lotan et al. | 364/200 |
| 3,896,418 | 7/1975 | Brown | 364/200 |
| 3,949,380 | 4/1976 | Barbour et al. | 364/200 |
| 4,040,026 | 8/1977 | Gernelle | 364/200 |
| 4,047,161 | 9/1977 | Davis | 364/200 |
| 4,106,092 | 8/1978 | Millers | 364/200 |
| 4,110,830 | 8/1978 | Krygowski | 364/200 |
| 4,128,876 | 12/1978 | Ames et al. | 364/200 |
| 4,164,017 | 8/1979 | Randell et al. | 364/200 |
| 4,200,930 | 4/1980 | Rawlings et al. | 364/200 |
| 4,225,922 | 9/1980 | Porter | 364/200 |

OTHER PUBLICATIONS

IBM Technical Disclosure Bulletin, vol 21, No. 1, pp. 280, 281, "Overlapped Checkpointing", D. J. Lucas; 6/78.
IBM Technical Disclosure Bulletin, vol. 18, No. 8, pp. 2643-2644, "Checkpoint Copying", R. F. Arnold et al.
IBM Technical Disclosure Bulletin, vol. 20, No. 5, 1/76, Oct. 77, "Checkpoint Copy for a . . . ", N. K. Oachi et al.

Primary Examiner—Mark E. Nusbaum
Assistant Examiner—Jameson Lee
Attorney, Agent, or Firm—Herbert F. Somermeyer

[57] ABSTRACT

A peripheral device subsystem enables its peripheral devices to operate asynchronously with respect to attaches hosts through the use of managed buffers, new multiple data transfer modes, control and error recovery operations. In a preferred first or buffer mode of operation, all data of each record being transferred can be resident in a buffer before transfer to either a host or device. For a host to device write transfer, receipt of such a record by the buffer results in the subsystem signaling to the host a completion of a transfer to an addressed device even though the device has received none or only part of the data. In a second or tape write mode, recording data in a peripheral device, such as a tape recorder, completion of recording is not signaled until after the buffer has transferred the data to the recorder. In the event allocatable buffer space is insufficient to enable operations in the first or second modes, the subsystem automatically switches to a tape synchronous or third mode of data transfer in which data signals are simultaneously transferred between the buffer and the host and peripheral device. A host SYNCHRONIZE command synchronizes buffer operations to host operations. Data to be recorded in a peripheral device and resident in the buffer can be retrieved by a host via a READ BUFFER command. Errors in the subsystem are reported even when delayed after completion of host operations. Additional mode controls are also disclosed.

7 Claims, 42 Drawing Figures

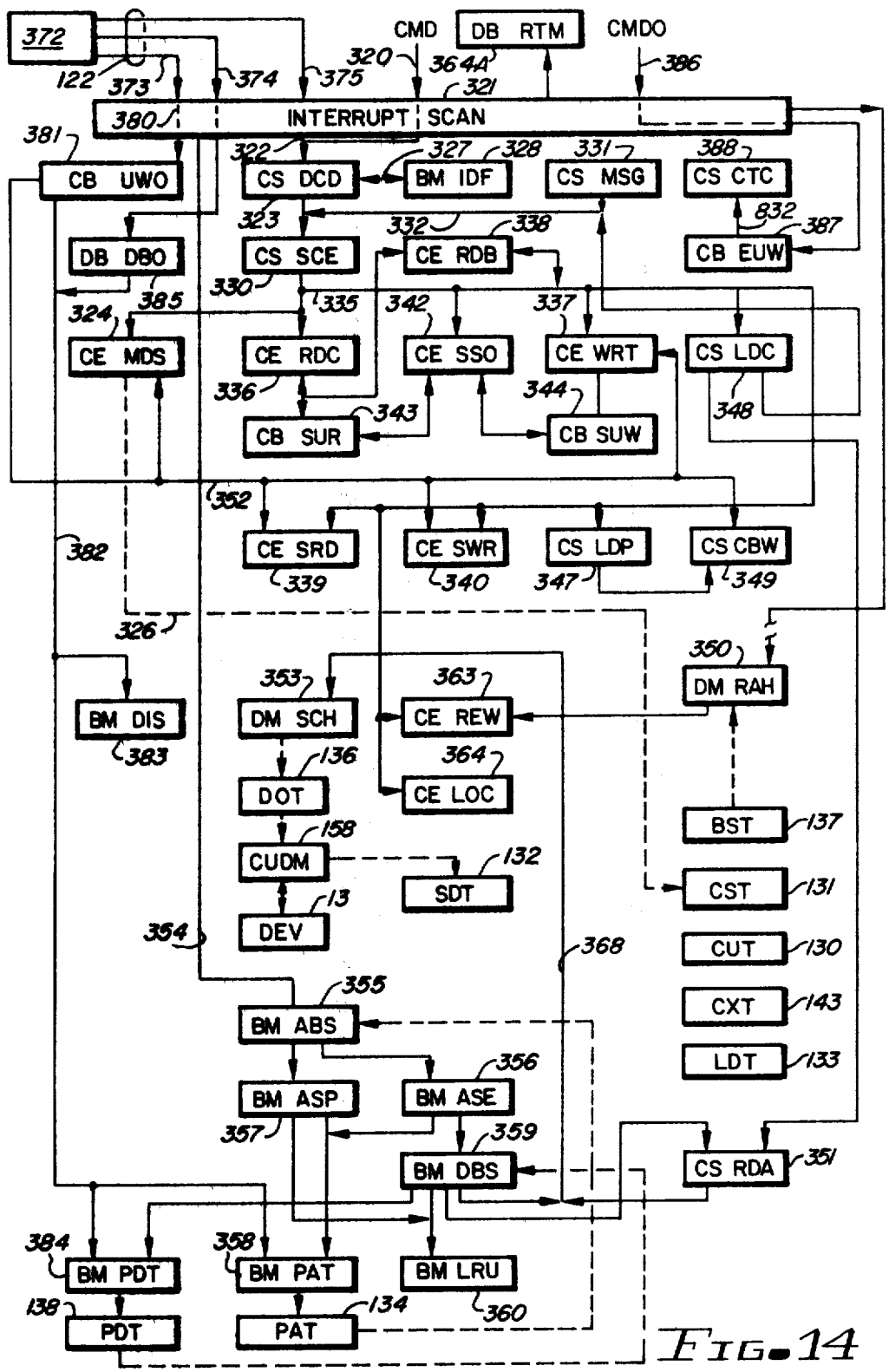

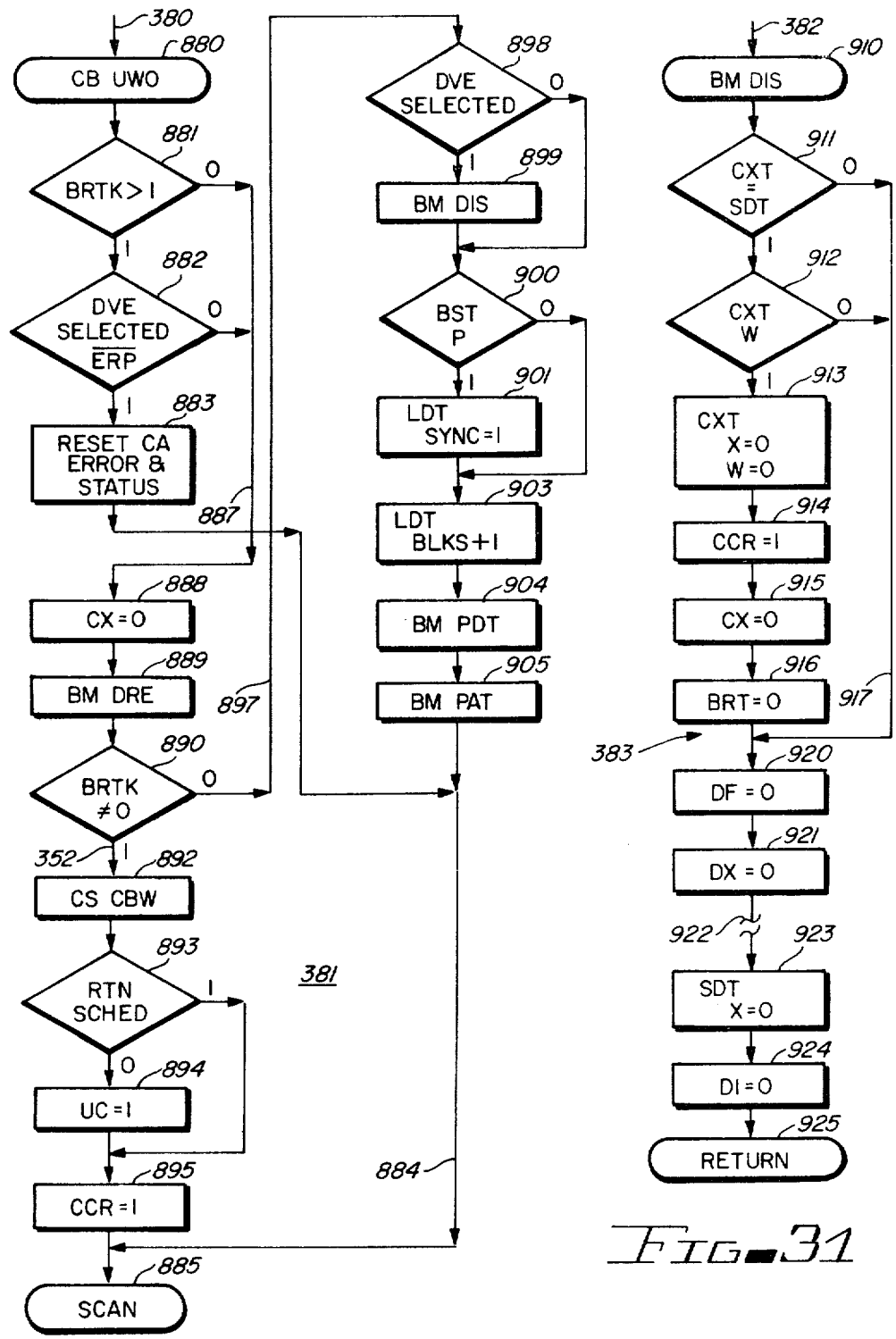

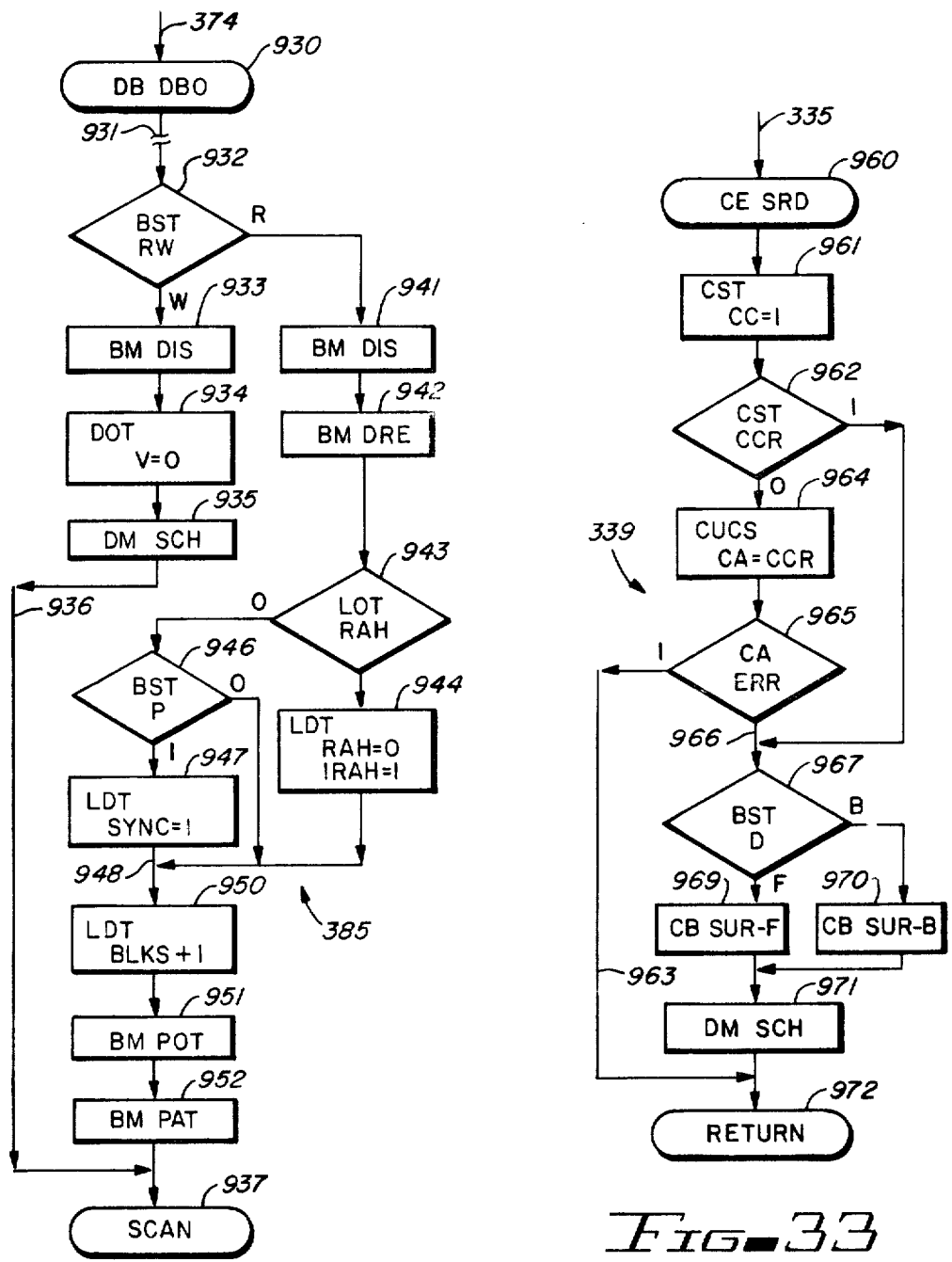

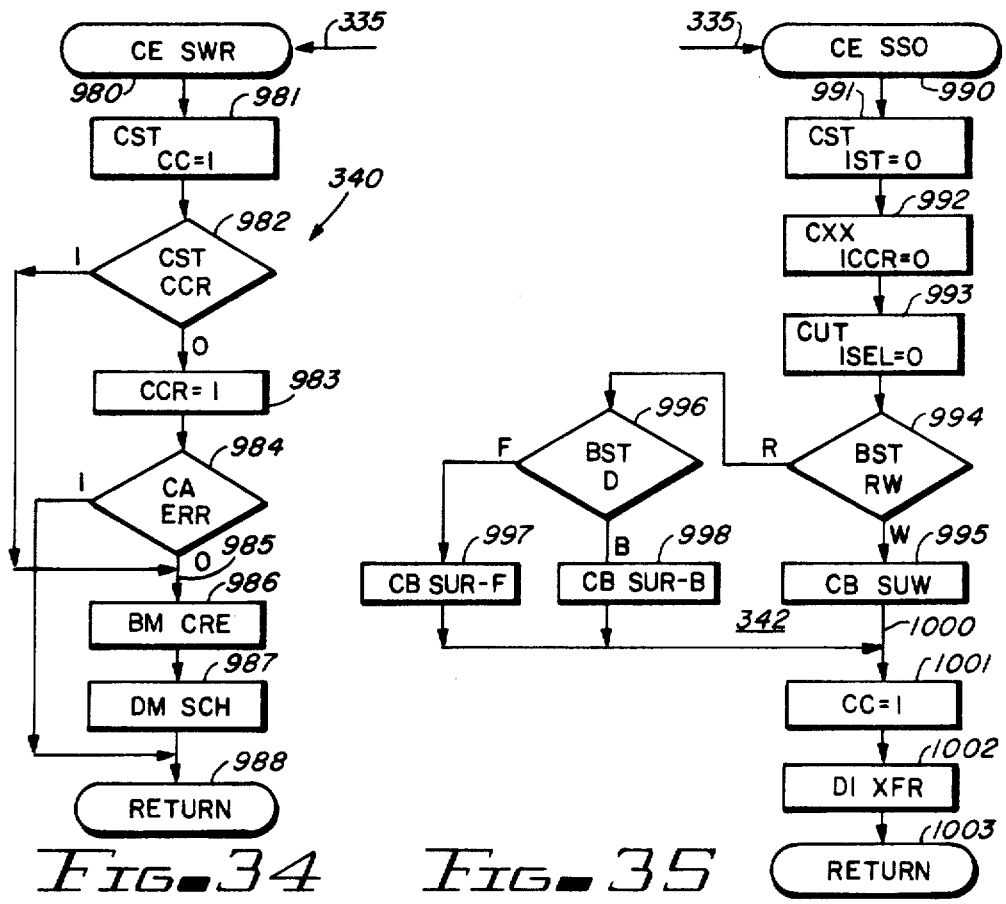
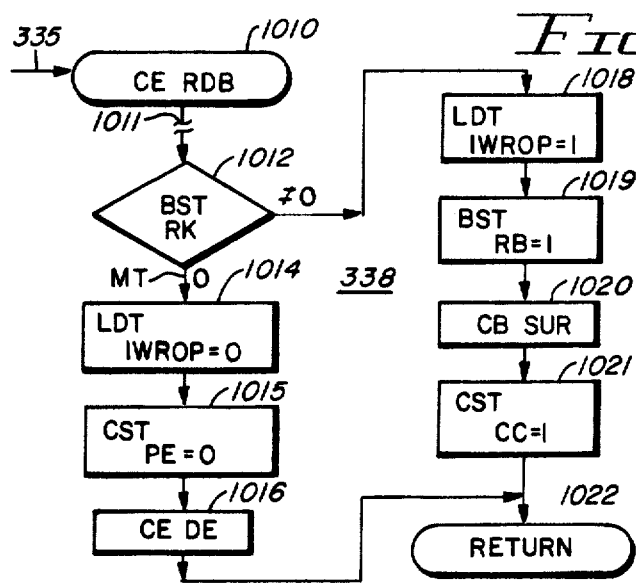

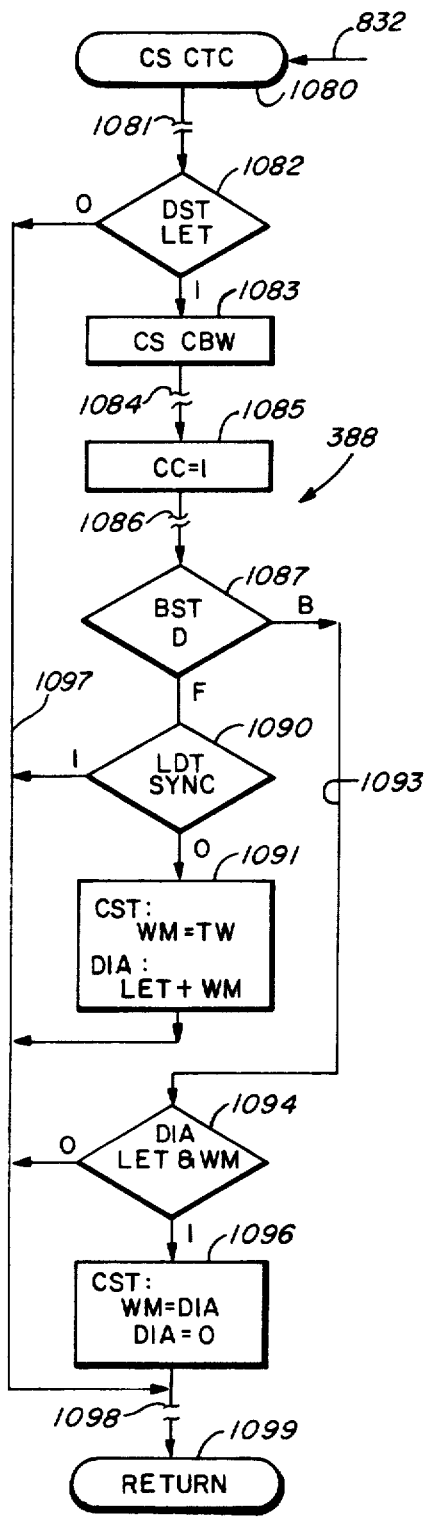
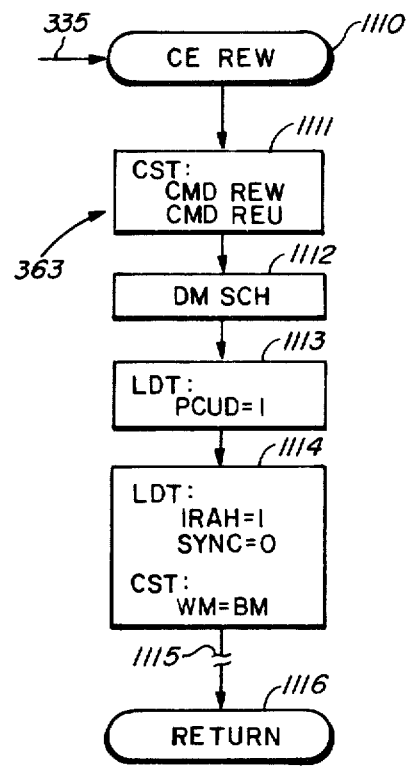
FIG-41
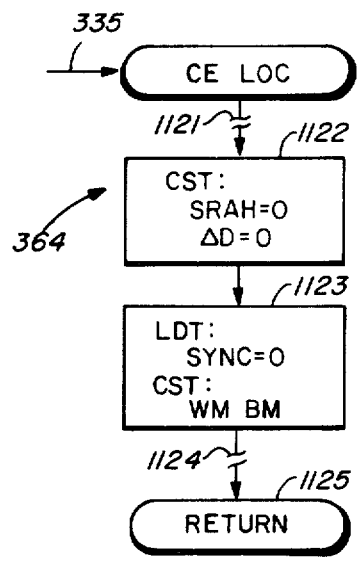
FIG-42
FIG-39

SYNCHRONIZING BUFFERED PERIPHERAL SUBSYSTEMS TO HOST OPERATIONS

DOCUMENTS INCORPORATED BY REFERENCE

R. L. Cormier et al U.S. Pat. No. 3,688,274 shows a channel command retry (CCR), usable with the present invention.

G. M. Amdahl et al U.S. Pat. No. 3,400,371 shows a computer and a peripheral subsystem employing input/output channels (FIG. 41, et seq) operated with CCW's (FIG. 29) and using so-called chaining maintained by a SUPPRESS OUT signal described in Column 130 of this cited patent.

FIELD OF THE INVENTION

The present invention relates to peripheral subsystems particularly to those subsystems employing data buffering in a volatile buffer. More particularly the present invention relates to peripheral subsystems employing data storage devices, such as magnetic tape recorders and magnetic disk recorders.

BACKGROUND OF THE INVENTION

The illustrated embodiment of this invention employs magnetic tape recorders as data storage apparatus. In such prior tape storage subsystems of recent vintage, mechanical buffering of the tape was employed to enable high performance by such peripheral subsystems. For example, in high performance subsystems, so-called vacuum columns were employed as a mechanical buffer between a reel of tape and a transducing station. Such mechanical buffer allowed high acceleration rates of the tape thereby providing fast access to the data recorded on the tape. In lower performance systems, so-called "dancer arms", which are spring loaded tensioning arms, provide mechanical buffering with lower acceleration rates, hence longer access times. In the high performance area, the cost of manufacturing vacuum columns is quite high; further, the physical size of such tape recorders is relatively large. Accordingly, it is desired to use reel-to-reel tape drives and yet achieve short access times. Immediately, the idea of an electronic buffer for the data come to mind. In this regard, U.S. Patent R. A. Gregory et al. No. 2,960,683 shows an electronically buffered magnetic tape recorder, one buffer per tape recorder. In general, Gregory et al. show supplying signals to an electronic buffer during the same period of time that the magnetic tape is being accelerated. It should be noted that the tape recorder of Gregory et al. employs vacuum columns; therefore, even with vacuum columns higher performance was attempted.

In many recording systems, the length of record or block of signals is unknown. Since it has been common practice in data processing to have similar types of data in data sets, the lengths of records in each data set can be comparable; it is a reasonable expectation that a short record will be followed by another short record. Accordingly, by measuring a given record length, the expected record length of data yet to be recorded or read from a record medium can be predicted with reasonable accuracy. This observation of data processing data structures can be and is used to advantage by the present invention.

The operation of a data storage system often employs the use of a so-called MODE SET command, which for tape recording subsystems is similar to that described in the book "IBM Systems/360 and Systems/370 I/O Interface Channel to Control Unit Original Equipment Manufacturers' Information," Book GA22-6974-4, file number S360-S370-19, available from International Business Machines Corporation, Data Processing Division 1133 Westchester Avenue, White Plains, N.Y. 10604.

The reduction of storage access times at low cost has been a goal of all storage subsystems regardless of the type of data storage apparatus. For example, Eden et al. U.S. Pat. No. 3,569,938 shows an apparent store concept with a directory operated buffer for magnetic storage disk drives and magnetic tape storage drives. The buffer in Eden et al. is managed in the manner similar to that employed for a main memory in a data processing unit. The concept is to have a high performance (short access time) buffer masking the slow access times of tape recorders and magnetic storage disks. The general notion is to transfer data from the tape recorder or disk drive to the buffer. Upon receiving a request for some data from a using host, not only is the request data transferred from the tape recorder or disk drive to the buffer, but data surrounding the requested data is also transferred such that a next subsequent request from the host can most likely be satisfied from the buffer, i.e., exhibit enhanced performance. In all instances, the first request will be subject to the slow access times of the tape recorder or disk drive. The Eden et al. apparatus operates very efficiently for randomly accessed data wherein the method of managing the buffers determines total performance. There are instances when such random access is not always employed, such as in connection with tape recorders and other serial devices and in many instances, with disk drives as well. It is desired that the buffering enhance the access time in a maximal manner beyond that provided by Eden et al. in a storage subsystem.

One of the goals of the Eden et al. patent, is to make the host or user operation somewhat asynchronous with respect to the operation of the tape recorder/disk drive and for maximizing the asynchronous aspect of such operations which requires a relatively large electronic buffer. The larger the buffer, the greater the cost for the buffer as well as the greater the cost for controlling the buffer. Accordingly, it is desired to minimize the size of the buffer while still maximizing the asynchronous aspects of host to storage device operations and providing rapid access to data. For handling relatively large record sizes, the Eden et al. apparatus requires relatively large buffering for segmenting the operation in such a manner that undue complexity may be required in the storage subsystem—which which undue complexity tends to raise the cost of the subsystem.

In maximizing asynchronous aspects of operations of the host and a peripheral subsystem, the timing of the host and storage apparatus operations may drift a long way apart. That is, the operation of the peripheral subsystem may lag behind the operation of the host to such an extent that error recovery becomes difficult, if not impossible. On the other hand, the operation of the storage subsystem may actually lead the operation of the processor (in fetching data from the storage subsystem for example) such that buffer space is not well utilized. Accordingly, some means must be provided for limiting the asynchronous drift of operations. In multiprocessing, various computer processes within a central processing unit are also subject to asynchronous characteristics. A retry of programs and processes are preserved in central processing units, particularly in pipelined processes, by synchronizing program execution to data error recovery procedures. David W. Anderson et al. in U.S. Pat. No. 3,736,566 shows adding additional electronic circuits in a central processing unit for providing the ability to periodically establish a checkpoint. At each periodic checkpoint, a minimal amount of CPU status information is stored to permit processing to proceed with a plurality of instructions with the ability to enable the central processing unit to recover all the data and status at the time of the last periodic checkpoint. As stated above, it is desired to minimize the cost of the subsystem; therefore the periodic establishment in the subsystem could add undue costs. Accordingly, it is desired to provide prevention of the above described risk in operations at low costs for error recovery purposes. Checkpoint control has been implemented for input-output operations as shown by William E. Boehner et al. in U.S. Pat. No. 3,564,502. So-called "positional" information about an interrupted I/O device is communicated to the CPU as a result of an error in the channel. Such positional information about the I/O device is chosen in relation to the execution steps in a channel instruction so that a retry may be made of the channel instruction being executed at the time of the channel error. Such recovery action could be taken at the I/O device with the same channel instruction based upon the positional information existing at the time of channel error. With start-stop I/O devices, the apparatus of this patent enables a retry of a single erroneously executed channel command both during a chained command operation as well as during non-chained command operations. In accordance with this patent, the channel-I/O interface is monitored by a time-position signaling circuit which discretely cycles at different points in the execution of a channel instruction or command to an I/O device to generate codes representing respective time positions during the execution. At the moment of a channel error, the input to the signaling circuit is blocked, so that it continues to provide the position code existing at the time of the channel error. This particular apparatus requires one monitor per each operation. In a peripheral subsystem having a large plurality of devices with interleaved operations, such a system, which may be efficient for channel operations, becomes cumbersome and expensive for peripheral subsystems. Accordingly, even though input/output systems have employed time indicating positions for error recovery purposes, other means should be provided; particularly for a buffered peripheral subsystem.

SUMMARY OF THE INVENTION

It is an object of the invention to provide enhanced buffer operations, particularly buffer operations for peripheral subsystems.

In accordance with the invention, error control of a buffered peripheral subsystem includes synchronizing the buffer operation with host program execution. The host can supply a SYNCHRONIZE command to the peripheral subsystem such that the peripheral subsystem will then record all data in a device before signaling completion of all transfers. This operation occurs even in the buffer mode where the peripheral subsystem had previously signaled the host that the data transfers had been completed.

The foregoing and other objects, features and advantages of the invention will be apparent from the following more particular description of preferred embodiments of the invention, as illustrated in the accompanying drawings.

DESCRIPTION OF THE DRAWINGS

FIG. 6 shows a buffer record table BRT; FIG. 7 shows a buffer status table BST; FIG. 8 shows a command status table CST; FIG. 9 shows a control unit table CUT; FIG. 10 shows a channel transfer table CXT; FIG. 11 shows a device operations table DOT; FIG. 12 shows a logical device table LDT; and, FIG. 13 shows a selected device table SDT.

FIG. 14 is a logic diagram showing all the logic modules of the FIG. 3 illustrated control necessary for an understanding of the present invention.

FIG. 15 shows logic module CS DCD which enables a microprocessor to decode input/output commands received from a host as well as perform other functions.

FIG. 30 illustrates logic module CB UWO relation to operations performed when an overrun is detected by the FIG. 29 illustrated circuits in a data transfer from the channel to a buffer in the control unit.

FIG. 31 illustrates logic module BM DIS for a buffer control operation implemented after an overrun has been detected and reported.

FIG. 32 illustrates logic module DB DBO relating to operations when a buffer space is overrun by a data transfer from a device to the buffer.

FIG. 33 shows logic module CE SRD which interprets a received read command when a tape synchronous mode of operation is to be employed.

FIG. 34 illustrates logic module CE SWR which shows operations performed during execution of a write command during a third or tape synchronous mode.

FIG. 35 illustrates logic module CE SSO which shows operations for starting a tape synchronous operation as mentioned with respect to FIGS. 33 and 34.

FIG. 36 illustrates logic module CE RDB which executes a READ DATA BUFFER comand.

FIG. 39 shows logic module CS CTC relating to mode controls at logical end of tape.

FIG. 41 shows logic module CE REW relating to REWIND and REWIND UNLOAD commands and their incorporation into the present invention.

FIG. 42 shows logic modules CE LOC as it relates to practicing the present invention with a LOCATE BLOCK command.

Detailed Description

Figure 1:
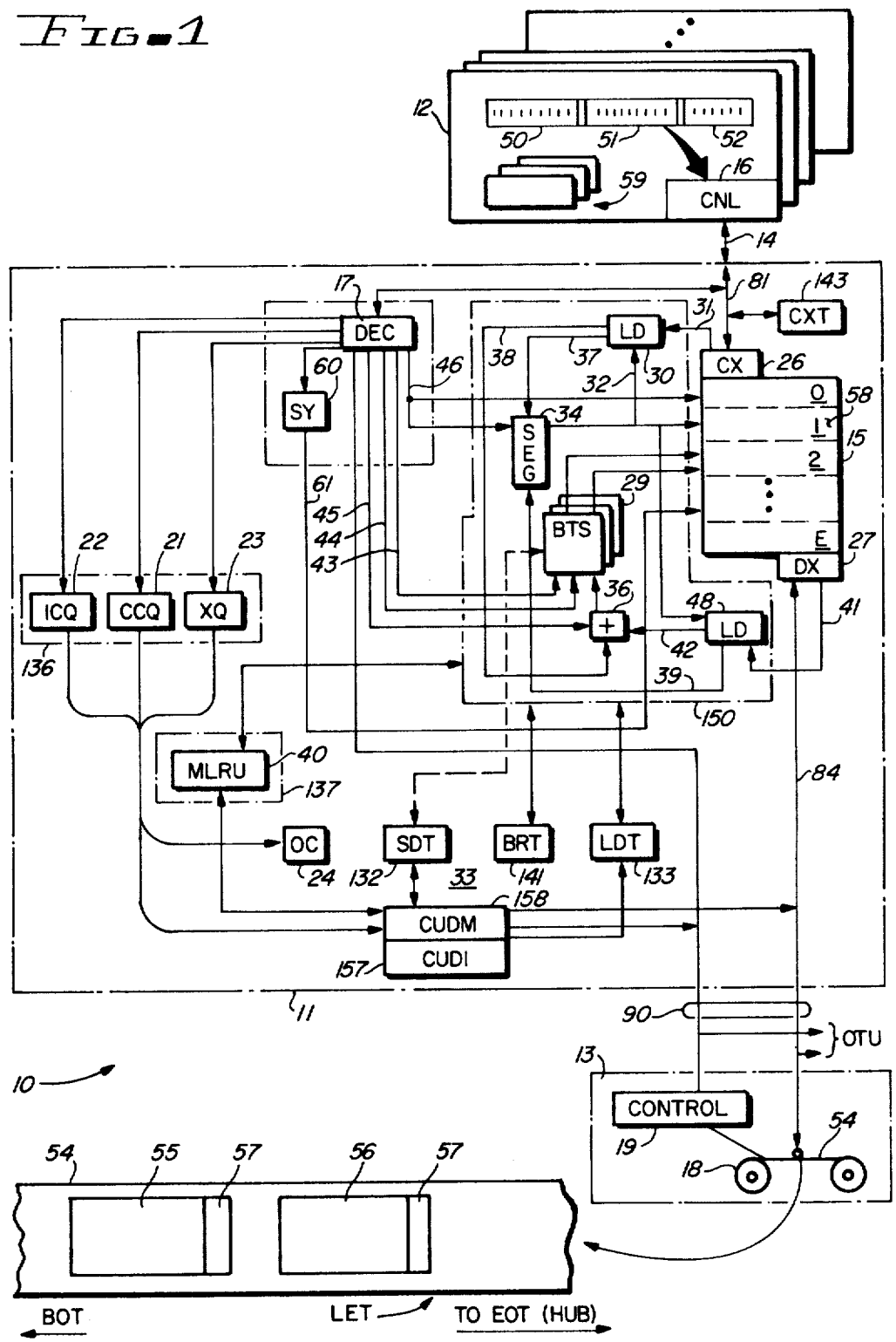
FIG. 1 is a logic diagram of a peripheral subsystem arranged to show incorporation of the invention into such subsystem.

Referring now more particularly to the drawing, like numerals indicate like parts in structural features in the various diagrams. The end of the description includes a glossary of selected acronyms used in the description of the drawing. Referring particularly to FIG. 1, a data storage subsystem 10 includes a control unit (CU) 11 for connecting one or more hosts 12 to one or more peripheral devices 13. Devices 13 are illustrated as being magnetic tape reel-to-reel recorders, no limitation thereto intended. Hosts 12 are connected to CU 11 via input-/output connections 14. In transferring data signals between hosts 12 and devices 13, buffer 15 within CU 11 temporarily stores the data signals for enabling asynchronous operation of devices 13 with respect to hosts 12. Buffer 15 includes a plurality of allocatable storage spaces called segments and enumerated O through F. A control 33 manages the allocation of the buffer 15 segments to devices 13 as well as supervises and controls the transfer of data signals between the devices 13 and buffer 15 and other functions commonly performed by such control units as indicated in FIG. 1 by other circuits OC 24.

Each host 12 includes a plurality of channel circuits CNL 16 which process and control input/output operations. Included in such control is the transmission of input/output commands to CU 11 for performing diverse data processing operations. CU 11 receives the commands via input/output connection 14 and in accordance with known circuits and procedures directs the received command signals to decoder DEC 17. Decoder 17 interprets the commands and generates orders within the subsystem, such as orders to be performed by CU 11 or a device 13. Such orders are queued in first in, first out (FIFO) queues for execution. As an example, device 13 data transfer operations are queued in XQ 23 which is a portion of device operation table 136, later described. The orders queued in XQ 23 are interpreted by a group of logic modules CUDM 158, later described, and CUDI 157, later described, for transferring device orders over interconnection 90 to devices 13. These transferred device orders are interpreted by control 19 of each device 13 which operates a magnetic tape transport 18, all of these actions use known techniques.

Some of the commands received from host 12 can be executed by CU 11. Such commands result in orders queued in ICQ 22 and CCQ 21 which also are a portion of device operation table 136, later described. ICQ 22 stores those device orders relating to the transfer of data from device 13 and CU 11 to host 12 such as sense data and other configuration data not pertinent to an understanding of the present invention. CCQ 21 queues those orders requiring operations of a device 13 not requiring the transfer of control data to a host 12 such as rewind to BOT.

The transfer of data signals between a host 12 and devices 13 is bidirectional but will be generally described as flowing from hosts 12 to devices 13. The data signals are transferred only after appropriate set up procedures have been employed, as is well known. Data signals are transferred through CNL 16 over an I/O connection 14, then over bus 81 to automatic data transfer circuit CX 26 which handles the automatic data transfers on the so-called channel side of buffer 15. Suitable addressing circuits for buffer 15 are employed to lodge the received data signals in buffer 15. Since a transfer is to a logical device, i.e., the combination of a device 13 and an allocated segment of buffer 15, all of the signals in one series of transfers will go to but one of the segments O-F of buffer 15. The signals reside in buffer 15 until control 33 generates its own order to transfer the signals to device 13. Such internally generated orders are supplied and stored in XQ 23 for execution via CUDM 158 and CUDI 157. Assuming that the signal path has been set using the later described techniques, the signals are fetched from buffer 15 by automatic data transfer circuits DX 27 which controls and handles all of the data transfers on the so-called device side of buffer 15. The data signals are transferred over bus 84, then over interconnection 90 to a recording transducer (not shown) of tape transport 18. Interconnection 90 may extend to other tape units OTU (not shown).

Write data transfers can be achieved in any one of three modes of transfers—a buffer mode, a tape write mode, and a tape synchronous mode. A readback operation, transfer of data signals from a device 13 to host 12 can be one of two modes—a buffer read mode or a tape synchronous read mode. For each allocated segment of buffer 15 a control BTS 29 indicates to buffer control circuits (not shown in FIG. 1) the mode of operation of the buffer. In the preferred embodiment BTS 29 is indicated in later described logical device table 133 and buffer status table 137. Control of BTS 29 is shared between decoder 17 and length detectors (LD) 30 and 48. LD's 30 and 48 automatically switch CU 11 mode of operation from either buffer or tape modes to the tape synchronous modes, as will become apparent. But first the write modes will be described at a functional level.

Before recording or writing signals on a device 13, a socalled MODESET command is received by decoder 17. Within the MODESET command will be a signal indication of whether the first or buffer mode or the tape write or second mode is to be used in subsequent WRITE commands. The buffer mode signal results in an order traveling over line 43 to BTS 29 to select the buffer mode for the logical device addressed with the received MODESET command. This selection relates only to one buffer 15 segment allocated to a device 13 identified in the MODESET command. When the tape write mode is selected, an order signal travels over line 44 to the BTS 29 corresponding to the addressed logical device for placing the corresponding buffer 15 segment in the tape write mode.

It is assumed that a MODESET command has selected the buffer write mode when a WRITE command is received data signals are transferred from host 12 over interconnection 14 into buffer 15 at maximum channel transfer rates in a preferred mode of operation. Some time after the data transfer from host 12 has started, the tape unit 18 of the addressed logical device is signaled to start in a forward direction of motion. Such starting is handled via CUDM 158. When the tape unit 18 has reached its recording speed, data signals stored in the buffer 15 segment of the logical device start transferring signals through DX 27 to device 13 for recording on tape 54. In many instances a complete block of data signals, i.e., a record from a host 12 will be completely resident in buffer 15 before the time that tape unit 18 has reached its recording speed and begins to record data on tape 54. When a complete block of data signals is transmitted from host 12 and lodged into buffer 15, CU 11 responds with an ending status of CHANNEL END and DEVICE END. This response indicates to host 12 that the just transmitted data signals have been recorded on a device 13 while, in fact, part or all of the block of data may be in buffer 15. As a result, CNL 16 and its host 12 are free to continue with other work rather than waiting for a usual DEVICE END from CU 11 signifying a device 13 has recorded the received block of data.

While the data is in the process of being transferred to a device 13 at the device data rate (which may be different than the channel data rate) a read-back-check is performed using known read-back-check techniques. This action verifies that the data signal has been properly recorded on tape 54. When a block of signals just mentioned have been fully recorded on tape 54, buffer 15 may contain other blocks of data signals from subsequent WRITE commands. In this case, tape unit 18 continues to transport tape 54 and the later received blocks of data signals are transferred automatically from buffer 15 to the tape. Once buffer 15 segments of the logical device that was addressed is empty, then tape unit 18 is slowed and repositioned in preparation for the next received WRITE command. The number of successive blocks to be recorded can be limited by a timeout mechanism (not shown) so that one operation does not dominate subsystem operation to the detriment of other operations. In the event that the channel 16 transfers data so slowly that the receiving device 13 is able to exhaust the data in the buffer 15 segment before completion of the recording operation, then a so-called buffer overrun error occurs. Handling the overrun is described later.

A second mode of operation which can be selected by a host 12 is the tape write mode. When CU 11 has been conditioned by the MODESET command to operate in the tape write mode, then the received blocks of data signals are transferred to the buffer 15 segment corresponding to the addressed logical device to reside completely within that buffer 15 segment. Then partial ending status of CHANNEL END is given to host 12. Final ending status (CHANNEL END and DEVICE END) are not provided to the host until the received block of data signals was successfully recorded on tape 54. Even though final ending status is not provided, channel 16 is free for other activities. Channel command retry (CCR) can be sent to host 12 for channel disconnection. If channel command retry (CCR) is used for such channel disconnection, then the data signals in the allocated buffer 15 segment will have to be transferred twice over the channel path 14. This action ensures that a residual count field of the channel status word (CSW) is correct and that the ending status of CHANNEL END, DEVICE END will be sent to the program simultaneously as provided in the other two modes of recording. The preferred implementation of the invention always provides for the simultaneous supplying of CHANNEL END and DEVICE END. Channel disconnection while transferring data to a device 13 from buffer 15 by using burst multiplexing techniques. In the tape write mode, a read-back-check is performed during recording to ensure that the data was correctly recorded on tape 54. Once the read-back-check has been successfully completed, ending status, CHANNEL END, DEVICE END are supplied to host 12 by CU 11. Because ending status is not provided for the current WRITE command until the recording is actually completed on device 13, CNL 16 cannot supply additional data blocks for the addressed device to buffer 15. As a result, after the current data block is written into device 13, the buffer 15 segment allocated to the logical device is emptied and tape unit 18 must reposition for receiving the next WRITE command. This mode results in long delays between successive WRITE commands because of the required extra motion of tape unit 18 performed synchronously to the transmittal of signal blocks.

CU 11 can also select the tape write mode even though the buffer write mode was selected by a MODESET command. Each reel of tape 54 has a socalled logical end of tape (LET). This is a mark on the tape which indicates that a predetermined number of feet of tape remain until the hub of the tape reel is reached. Once LET is reached, all recordings in the logical device is in the tape write mode. Once the tape 54 is repositioned by tape unit 18 to be beyond LET, then the selected mode of write is reverted to. If a tape synchronous mode has been in effect for recording, then when LET is reached the tape write mode is not employed. The third recording mode is a tape synchronous mode in which device operation and host operations are synchronized. The data block is sufficiently large as to never be completely stored within the buffer 15 segment allocated to the addressed logical device. In this mode, CNL 16 transfers data to CU 11 at the rate of a tape device 13. If a CNL 16 cannot supply data fast enough, then overrun errors can occur. LD 30 selects the write synchronous mode as will be explained. Once LD 30 has selected the tape synchronous mode-write, it is assumed that all records will be sufficiently long as to not be containable in the allocated buffer 15 segment. Therefore this mode is maintained until an indication is received from host 12 that a change in operation or change in data set has occurred or will occur. This change is indicated to CU 11 by host 12 issuing either a REWIND command, a REWIND UNLOAD command, a LOCATE command or a TAPE MARK is encountered. The REWIND command orders subsystem 10 to rewind tape 54 that is on tape until 18 to beginning of tape (BOT) such that all of the tape is on the supply reel and very little is on the machine reel. REWIND UNLOAD indicates to device 13 that the tape is to be rewound as above described and tape reel is to be ejected from device 13. A LOCATE command indicates a high speed operation for searching for another area of tape, i.e., host 12 is performing an operation unrelated to the just recorded signals. TAPE MARK indicates end of a file; therefore, the new file may have different length records.

The READ mode is similar except that signal transfer is from an addressed device 13 to a host 12. A first received READ command encounters no data in buffer 15. CU 11 supplies a CCR for enabling the channel to disconnect. Then CU 11 causes data to be transferred from the addressed device 13 into an allocated buffer 15 segment. Usually after one data block is entirely read into buffer 15, the channel 16 is reconnected by sending a DEVICE END. CU 11 then receives the READ command for a second time and supplies data to host 12 at full channel speed. After the first READ command for an addressed logical device, CU 11 will preread data blocks from tape 54 and hold that data in buffer 15. The extent of such prereading depends upon devices expected activity relative to the activity of the entire storage subsystem 10. This is achieved via execution of a prefetch algorithm, the understanding of which is not pertinent to an understanding of the invention. Then at such time a host 12 supplies another READ command, data in buffer 15 is immediately available to CNL 16 and transferred at full channel speed to host 12. Prereading continues asynchronously as determined by the current operational status of storage subsystem 10. Such prereading is interleaved with operations recording data on other devices 13 and reading data from other devices 13.

In the event that a command following a first READ command is not a READ command, the preread data residing in the buffer 15 segment can be discarded. Depending upon the received command, tape 54 may be automatically repositioned by tape unit 18 for rereading the data blocks discarded from the buffer 15 segment. LD 48 measures the length of data blocks being transferred from device 13 into buffer 15 segment. When such blocks exceed a predetermined size, LD 48 institutes a tape synchronous mode for the subsequent READ commands. In general, a complete block of data signals is resident in the allocated buffer 15 segment. Prereading of data is dispensed with. Such large blocks of data signals are processed synchronously from device 13 through buffer 15 and bus 81 to CNL 16 at the device 13 data rate. If CNL 16 is slower than the device 13, an overrun error can occur. Once read operations have entered the tape synchronous mode, that mode is maintained until host 12 indicates to storage subsystem 10 that a major change in operations may occur, as indicated for the tape synchronous mode in writing, as by a REWIND command, REWIND UNLOAD command, a LOCATE command or a TAPE MARK is sensed from the tape. The read operation can be performed either in the forward tape motion, i.e., motion moving from BOT (beginning of tape) toward LET or in the backward direction when tape is moving from LET toward BOT.

Returning now to FIG. 1, the buffer 15 segments are determined by segment circuit SEG 34, which in the preferred embodiment is program control, and can follow allocation/deallocation and segmenting of memories as is practiced in the data processing art. LD 30, in sensing the length of data records transferred over bus 81, receives the length indicating signals over line 31 from CX 26. Segment size is received over bus 32 from SEG 34. LD 30 compares the two signals and supplies activating signals indicating excessive record length over line 38 to OR circuit 36 for setting BTS 29 to the synchronous mode. This action, of course, is only for the addressed logical device which is receiving signals from host 12 via a predetermined segment of buffer 15. In a preferred embodiment reallocation to a larger segment size can occur for maintaining the buffer mode. If the reallocated segment is still too small, the synchronous mode is then instituted. In other words, the synchronous mode is to be avoided if possible.

During the READ mode, LD 48 senses via line 31 the length of the records being transferred over cable 84 into DX 27. LD 48 also receives the size of the segment from SEG 34 over bus 32. If the segment size is less than the record size, as indicated by LD 48, a signal travels over line 42 through OR circuit 36 to BTS 29 setting the BTS control corresponding to the addressed logical device to the synchronous mode. Also provided, as an alternative embodiment, is the ability of decoder 17 to receive a command from host 12 to set the synchronous mode, such as indicated by an order signal traveling over line 45 to OR circuit 36.

LD 30 and 48 can request SEG 34 to allocate a plurality of buffer 15 segments for the addressed logical device, that is LD's 30 and 48 upon detecting a first overrun condition for a single segment respectively send actuating signals over line 37 or 39 to SEG 34. SEG 34 responds to such actuating signals to reallocate buffer 15 as a plurality of segments for the data transfer such that the buffer or tape write modes can be employed, i.e., the synchronous mode is to be avoided. When such a plurality of segments has an overrun, then the synchronous mode will be finally entered as previously described.

All of the described length detectors and segmenters can be found in preferred embodiment in CUBM 150 as will become apparent. Operations are coordinated with logical device table 133, buffer record table 141 and selected device table 132. Transfer of channel data is monitored and controlled via channel transfer table 143.

Host 12 transfers its data by records as indicated by numerals 50, 51 and 52. These records are transferred one at a time by each WRITE command to CNL 16, as previously described. Host 12 operations, relating to execution of a plurality of programs 59, for example, in transferring these records to storage subsystem 10 may proceed in its programming for a substantial number of records before all of the records are actually recorded in a device 13. For example, records 55, 56 together with their CU 11 added control data 57 are shown as recorded on tape 54. A complete record or more than one record can still be residing in buffer 15 as indicated by numeral 58 within segment 1. Assume that host 12 with record 58 in buffer 15 could still recover from a buffer or subsystem error. However, further records within buffer 15 could not be recovered because of the data processing status within host 12. Therefore it may be desirable for host 12 to synchronize the recording operation of device 13 with its own internal data processing operations. This synchronization is achieved in the course of the present invention by host 12 sending a SYNCHRONIZE command to CU 11. Decoder 17 actuates synchronizing circuit 60 which supplies an activating signal to buffer 15 for causing the record 58 to be transferred to a device 13. In the event that buffer 15 segment 1 were empty, then no data transfer operations are required. Generally the usage of the SYNCHRONIZE command will be minimal. The segmentation of buffer 15 and the setup for operating in the above described mode can also be commanded by host 12. Decoder 17 responds to such commands by supplying suitable activating signals over line 46 to SEG 34 in buffer 15. Since these techniques can be those used in data processing art for performing such functions, they are not further described.

Figure 2:
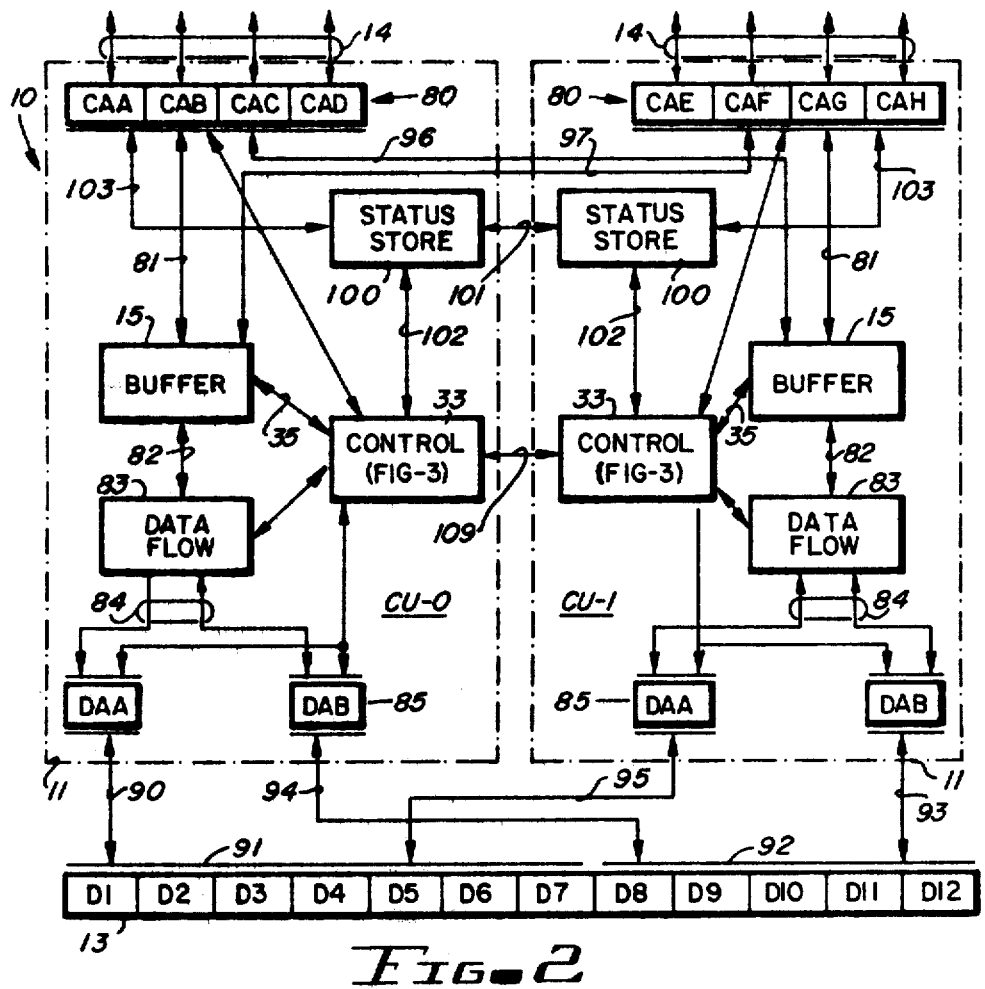
FIG. 2 is a block diagram of a constructed subsystem in which the present invention is advantageously practiced and for which the preferred embodiment is described.
Figure 3:
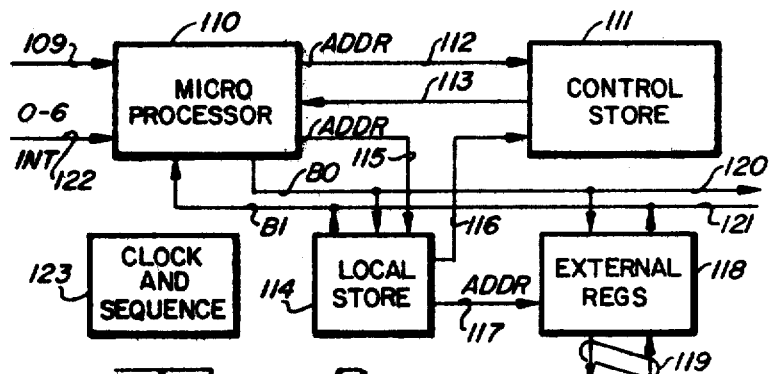
FIG. 3 shows a microprocessor control portion of the FIG. 2 illustrated peripheral subsystem.
Figure 4:
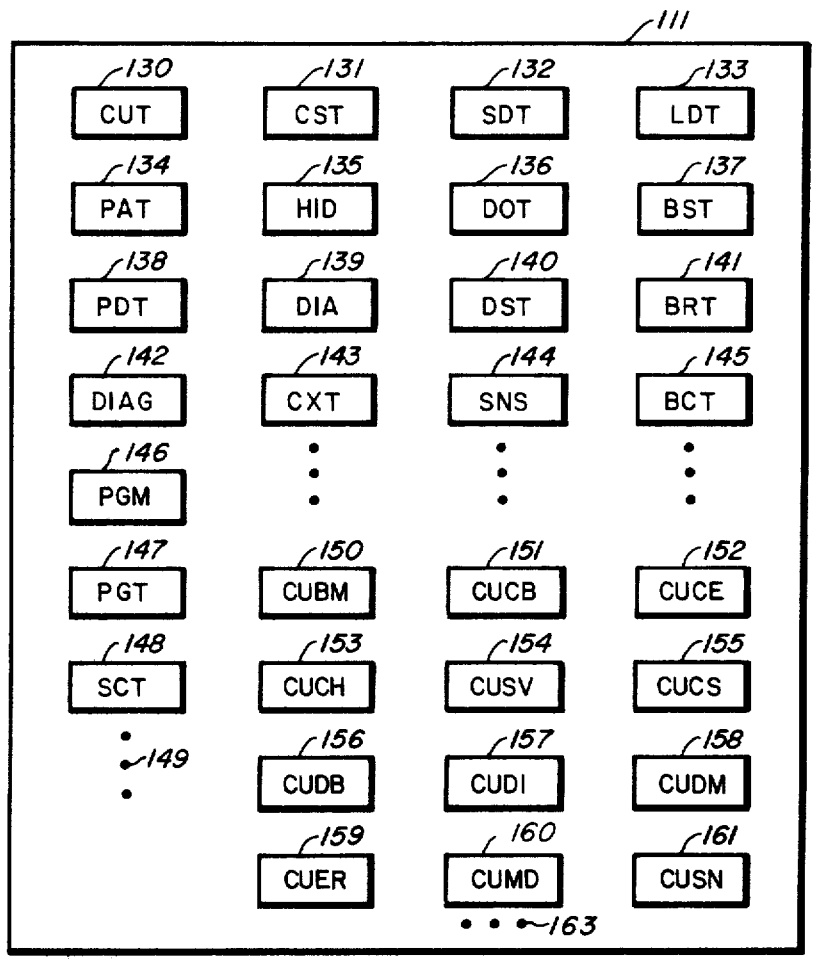
FIG. 4 is a map of a control store used in connection with the FIG. 3 illustrated control.

Before further describing the invention, the environment in which the invention preferably resides is described with particular reference to FIGS. 2-4 which illustrates a storage subsystem employing reel-to-reel tape drives denominated as devices 13DO-DF. The preferred arrangement includes two control units 11 denominated as CU-0 and CU-1. The arrangement is such that any of the devices can be connected to the host 12 via input/output channel 14 through either of the control units, CU-0 or CU-1. The attachment to a host 12 by each of the control units 11 is via a plurality of channel adapter circuits 80 which are individually denominated CAA-CAH. Each of the channel adapters 80 can communicate directly with a buffer 15 in either control unit 11. Both CU-0 and CU-1 are identically constructed. Accordingly, like numerals are indicating like parts in the two control units with the interconnections between the control units being separately denominated. Channel adapters CAA-CAD are in CU-0 while CAE-CAH are in CU-1. The respective channel adapters communicate with a buffer 15 in its own control unit via cable 81. Communications from the buffers to the devices 13 is over cable 82 through a data flow circuit 83, thence to cable 84 through a plurality of device adapter circuits 85. The device adapter circuits are separately denominated by characters DAA and DAB in both control units 11. Data flow circuits 83 contain recording circuits. The programmed control 33 is electrically connected to all of the described portions of the respective control units 11 and operates generally in a known manner for storage subsystems as generally shown in Irwin U.S. Pat. No. 3,654,617, filed in U.S.A. Oct. 1, 1970, application Ser. No. 77,088. The interconnections between the control units 11 and the devices 13 are on a primary/secondary basis. Devices D0-(D0 not shown) D7 are primary to CU-0 and secondary to CU-1. In a similar vein, devices D8-D12 (D13-D16 not shown) are primary to CU-1 and secondary to CU-0. The significance of primary and secondary connections relates to which of the control units CU-0 or CU-1 maintain status for the respective devices; i.e., the control unit CU-0 maintains status information for D0-D7 while CU-1 primarily maintains status information for D8-D16. As will become apparent, both control units CU-0 and CU-1 memorize status indications for all of the devices 13. In the primary connections, adapters DAA-DAB of CU-0 are connected via a cable 90 to all of the devices D0-D7. In a similar manner, the connection to D8-D16 to CU-1 is via cable 93 through adapters DAA-DAB. The secondary connection from CU-0 to devices D8-D16 is via cable 94 while CU-1 is connected to devices D0-D7 via cable 95. The operations between the device adapters 85 and the various devices includes tag control lines and bus data transfer lines which enables the control units 11 to closely control and operate devices 13.

In prior tape subsystems, the data flow paths were not fully multi-pathed in that the channel adapters 80 communicated only with the data flow circuits 83 in its respective control unit 11. In the preferred configuration, any of the channel adapters CAA-CAH can communicate with any of the devices 13 through either data flow circuit 83. The internal control unit 11 connection from the channel adapter CAA through CAD and adapter CAE-CAH of CU-1 are as previously described. Connections from channel adapters CAA--CAD to the buffer 15 of CU-1 is via cable 96 whereas channel adapter CAE-CAH connects to the buffer 15 of CU-0 via cable 97. Accordingly, either data flow circuit 83 or buffer 15 can communicate with any of the hosts via any of the channel adapters. This arrangement, of course, requires close coordination between control units 11. The total subsystem status is maintained in each of the control units 11 via a pair of status stores 100. Status stores 100 communicate with each other via a cable 101 independent of data processing operations; that is, as soon as CU-0 changes status, such as by selecting a device 13, the status store 100 in CU-0 immediately communicates to status store 100 in CU-1. Similarly, any cross-connection between the channel adapters 80 and the buffers 15 is immediately indicated in both status stores 100. Each of the status stores 100 contain a plurality of registers for containing bits relating to device status, buffer status, channel status and the like. Such status information reflects the selection status of the device, its busy status contingent connections and all other status necessary for operating the storage subsystem with the input/output channel 14.

One and only one control unit 11 can change the configuration of the storage system at a given time. In this regard, cables 102 extend from the respective status store 100 to control 33. When control 33 of CU-0 wants to change logical configuration of the subsystem by selecting a device 13, for example, control 33 communicates with its status store 100 and requests permission to change subsystem status. Status store 100 is in an appropriate master state and permits control 33 to make a selection. Otherwise, status store 100 of CU-0 requests the status store 100 of CU-1 to give it the master state. Either CU 11 having the master state is the only one which can change logical configuration of the subsystem; the master state being shifted between the control units as configuration changes dictate. Status stores 100 also communicate with the respective channel adapters in the control units 11 via cables 103. Such communciation includes the supplying of device busy status to the channel adapters from the status stores and the request for selection from the channel adpaters to the status stores; that is, if CAB 80 wants to select device D6 on behalf of a host request, CAB 80 communicates with its status store 100 of CU-0 requesting that the device D6 be selected. Status store 100 will supply the busy or not busy status of D6 to CAB. CAB then immediately responds to the host request with respect to device D6, thereby reducing selection and inquiry time between a host 12 and control units 11.

Control 33 can take different configurations. The configuration preferred for use in connection with the FIG. 2 illustrated storage subsystem is shown in FIG. 3. A programmed microprocessor 110 operates in accordance with microcode program stored in control store 111. Such microprograms enable microprocessor 110 to completely manage buffer 15, to provide supervised data flow circuit 83, to communicate with status store 100, and to supervise and enable selection of the channel adapters 80 and device adapters 85. Further communication between controls 33 in the two CU's 11 on a processor-to-processor basis is via cable 109 using known interprocessor communications techniques. Using known techniques, microprocessor 110 selects the microprograms of control store 111 via address bus 112. Control data is supplied from the control store 11, including microprogram instruction words, via bus 113. Of course, the usual idle scan loop for operating microprocessor 110 is resident in control store 111. Additionally, control 33 includes local store 114 which acts a working control store for microprocessor 110. The addressable registers of local store 114 are addressed via bus 115. Bus 116 transfers signals from local store 114 to control store 111 under control of microprocessor 110; that is, it is preferred that the data stored in control store 111 from microprocessor 110 be transferred via local store 114. Communications between control 33 and all of the items shown in the control units 11 is via sets of external registers 118 which are addressed by address signals supplied over bus 117 from local store 114, no limitation thereto intended. Communications from external registers 118 to the various elements of the control units 11 is via a pair of unidirectional busses 119 which are electrical connections made in the usual manner.

Microprocessor 110 includes the bus out BO 120 and a bus in BI 121 which are connected to local store 114, external registers 118 and other units as may be desired. Microprocessor 110 is interrupt driven through a plurality of interrupt levels. These interrupts are supplied by the various elements of the control unit 11 over bus 122 which carries interrupt signals having levels 0 through 6, the priority of which is preassigned in accordance with the functions to be performed in the storage subsystem. The electrical signal timing of control units 11 is by clock and sequencer 123. Not only does clock and sequencer 123 provide timing pulses, but sequences microprocessor 110 for initializing control 33 to properly operate the control unit 11. The connections 119 from external registers 118 are to all the other portions of control unit 11. FIG. 4 is a map of control store 111 showing control tables and microprogram groups. The tables, of course, contain those signals representing control information necessary for the successful operation of the storage subsystem. First, the tables are described. CUT 130 is a so-called control unit operation table which contains information-bearing signals pertaining to the entire control unit 11. This table relates to the operational status of the individual control unit CU-0 and CU-1 and which is not device 13 nor channel 14 related. CST 131 is a command status table which contains information-bearing signals describing the current command status which is being executed for an addressed device 13; that is, host 12 supplies channel commands over I/O channel 14 to the respective control units 11. CST 131 reflects the present status of the execution of those commands received by any of the channel adapters 80. SDT 132 contains information-bearing signals signifying the status of a selected device 13. This table enables the control units 11 to closely control and operate any of the devices 13. LDT 133 is a so-called logical device table which contains information-bearing signals signifying the status of each of the devices 13 as those devices are logically extended into the buffer 15 and the broad operational status of the respective devices which status information is more general in character than that appearing in SDT 132. PAT 134 is pending allocation table having information-bearing signals which queue devices 13 by their respective addresses which require buffer space when buffer space has not yet been allocated. The table is preferably a FIFO (first in, first out) table of the circular type. HID 135 is a table containing host identification signals for the hosts 12 communicating with the control units 11 via channel adapters 80. DOT 136 relates to device operations and contains information-bearing signals signifying schedule, active and completed device 13 operations. Such operations include tape transport, reading and writing and the like. BST 137 contains information-bearing signals relating to the status of the buffer 15. Such information-bearing signals relate to data transfers into and out of the buffer, allocation of buffer space and other buffer related functions. PDT 138 contains information-bearing signals signifying the buffers space of the buffer 15 which can be deallocated from device 13 as soon as the activity with respect to such buffer space ceases. Deallocation does not occur until such activity stops. DIA 139 contains information signals signifying device information, control data relating to devices 13 and concerned with input-output channel 14 as well as intercontrol unit communication over cable 109 is stored here. Such information may originate because of device 13 operations as well as channel 14 operations. DST 140 stores information-bearing signals relating to device status; that is, the last device status presented by the device 13 to control units 11 is stored in this area. BRT 141 relates to the operation of buffer 15. This table identifies the status of records in the buffer 15. Each record in the buffer will be entered into BRT 141 and may contain charcterizing signals showing the status of the record with respect to its storage in buffer 15.

DIAG 142 is a table used to control diagnostic functions executed in the control unit 11. CXT 143 contains information-bearing signals relating to transfer of signals between buffer 15 and any of the I/O channels 14 via the channel adapters 80. Such information includes direction of transfer and the address of the device 13 related to such transfer. SNS 144 holds information-bearing signals representing sense data to be reported to a host 12 as well as a socalled buffered log arranged by device 13 addresses. BCT 145 stores information-bearing signals relating to the dynamic logical address configuration of buffer 15. Such configuration will vary in accordance with the number of devices 13 connected to the control units, as well as whether there is one control unit 11 or two. PGM 146 is a so-called path group map which indicates which devices 13 may be logically connected to channel adapters 80 for logically partitioning the subsystem into one or more logical partitioning the subsystem into one or more logical storage units. Path group table PGT 147 complements PGM 146 in that it includes identification signals identifying the logical partition and which of the channel adapters 80 is resident within each of the logical partitions. SCT 148 is a table containing signals relating to the idle scan for determining if any activity is to occur with respect to a given device 13. A diversity of actions can be instituted via SCT 148.

Numeral 149 indicates other tables not specifically referred to herein but that could be found in a constructed embodiment of the FIG. 2 illustrated storage subsystem. Such entry may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem.

Various program groups include CUBM 150 which are the microcode programs relating to the management of a buffer 15. CUCB 151 identifies those microcode programs relating to the transfer of signals between an I/O channel 14 and buffer 15 via channel adapters 80. CUCE 152 relates to setting up the tables described above in preparation for executing a command received from a host 12 over input/output channel 14. CUCH 153 relates to the channel control aspects, such as device selection and the like. CUSV 154 relates to an interrupt supervisor as it uses scan vectors in determining priority of the interrupts. CUCS 155 is a command support set of microcode which executes the commands set up by CUCE 152. CUDB 156 relates to the control and supervision of signal transfers between devices 13 and buffer 15. CUDI 157 relates to the control of the device adapters 85. CUDM 158 relates to the management of devices 13 such as scheduling their operations, etc. CUER 159 relates to error detection and recovery microcode. CUMC 160 relates to diagnostic procedures executed by a control unit 11. CUSN 161 relates to handling sense data such as stores in SNS 144. Numeral 163 indicates that the above program groupings may be modified and extended as the need arises for a storage subsystem.

Figure 5:
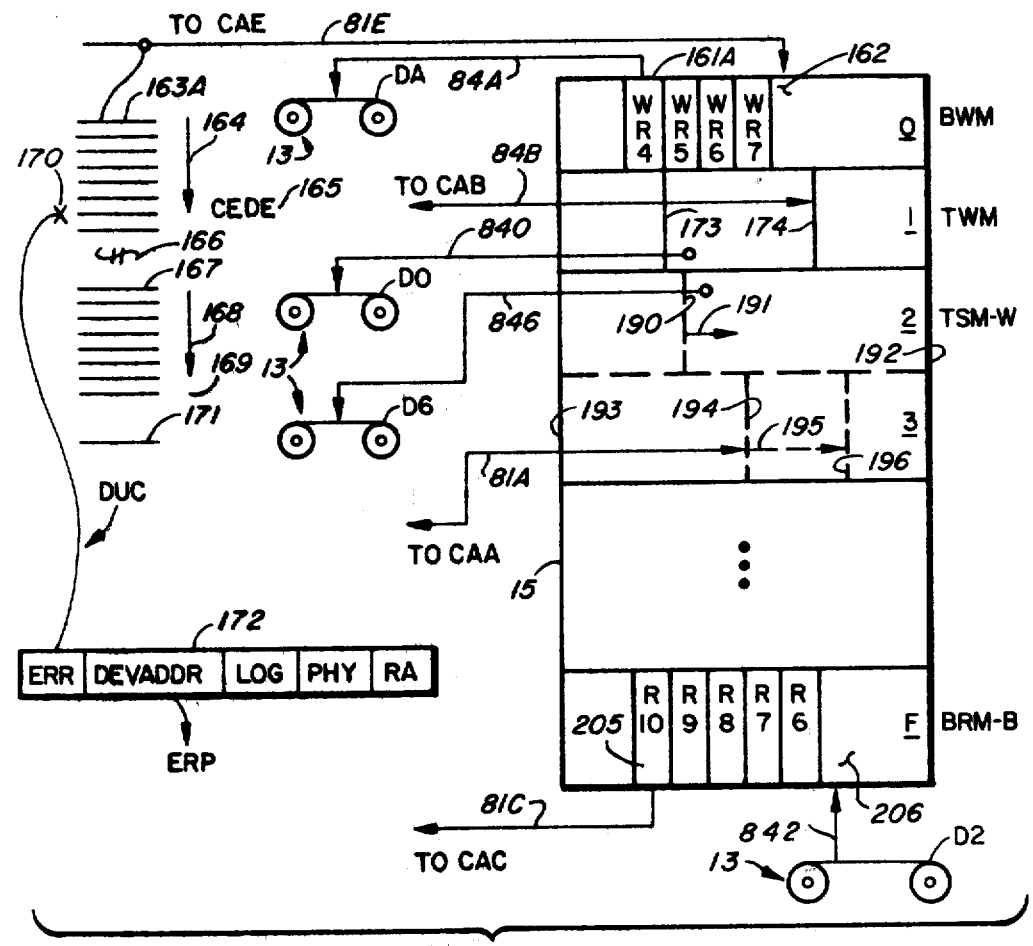
FIG. 5 is a diagrammatic showing of data transfer operations in the data buffer when practicing the present invention.

FIG. 5 illustrates data flow through buffer 15 for a plurality of devices; the illustration discloses buffer modes (read and write), tape write and mode and tape synchronous modes (read and write) and how such modes can be interleaved for a plurality of devices. Segments 0, 1, 2, 3 and F are shown as being allocated. Segment 0 is described as being in a bubber write mode, BWM; segment 1 is shown as being in tape write mode, TWM; segments 2 and 3 are shown as a pair of segments arranged in a single address space and operating in a tape synchronous mode-write, TSM-W; and segment F is shown as being in a buffer read mode in a backward direction, BRM-B. The tape synchronous mode for reading follows the same principle as the tape synchronous mode for writing; hence the disclosed description, except for direction of data flow, would be identical; accordingly, a description of the tape synchronous mode during readback is not described in detail. In a similar vein, the buffer read mode in the forward direction is the same as the buffer read mode in the backward direction. Accordingly, a detailed description of the buffer read mode in the forward direction is dispensed with.

The buffer write mode of segment 0 is shown as receiving data signals from channel adapter CAE over bus 81E and supplying such received data signals, after suitable buffering over bus 84A to the device 13 having address DA; hereinafter referred to as device DA. Segment 0 contains four records to be recorded on device DA. These records, separately identified as WR4 through WR7, were received by segment 0 serially beginning with WR4 as indicated by numeral 161A. Accordingly, when device DA is to receive a next record from segment 0, WR4 is the first record supplied followed by WR5, etc. A next record received from through CAE over bus 81E will be recorded in segment 0 at buffer area 162, the horizontal space of segment 0 indicates the address space increasing from WR4 to WR7. The records WR4 through WR7 are received by subsystem 10 via a chain of channel commands 163A which is indicated by the SUPPRESS OUT representing arrow 164. Depending upon the status of the storage subsystem 10, all of the records to be transferred in chain 163 may be recorded in segment 0 before any records are recorded on device DA. In the usual operational mode, one or more records may be recorded in segment 0 before device DA begins recording the received records. As additional records are received over bus 81E, they are deposited into segment 0 and taken out for device DA at the earliest opportunity. This is not to say that some of the records will reside in segment 0 while other devices are transferring data signals through buffer 15 with other channel adapters. When chain 163A is terminated by CHANNEL END and DEVICE END (CEDE) at 165, the sending host 12 has been notified that the recording operation has been completed. At this point in time several of the records may still reside in segment 0. This set of facts can give rise to a delayed error, as will be next described.

Following chain 163A, a plurality of intermeidate chains denominated by numeral 166 may be performed. These chains may include a chain 167 indicated by SUPPRESS OUT arrow 168. Chain 167 is terminated at 169 CHANNEL END DEVICE END (CEDE) signals. Intermediate the time of terminating chain 163A at 165 and starting a new chain 171, the transfer of data signals from segment 0 to device DA may have resulted in an error as indicated by "X" 170. The error at 170 corresponds to the penultimate record to be recorded from chain 163A. Subsystem 10 having detected the error represented by numeral 170, reports it at chain 171 by using a so-called DEFERRED UNIT CHECK. The DEFERRED UNIT CHECK is an error reporting signal which relates to a chain of commands other than the chain of commands in which the UNIT CHECK signal resides; that is, normally a UNIT CHECK signal would correspond to activities of subsystem 10 relating to chain of commands 171. However, in this case the error relates to the chain of commands 163A. In order to inform the host of where the error occurred, a DEFERRED UNIT CHECK (DUC) has to include index and other error identifying data so that the host can reconstruct the channel program which caused the chain of commands 163. Such sense data is represented by numeral 172 includes identification of the error ERR, the address of the device (DEVADDR); a logical position (LOG) and a physical position (PHY) of the record on the tape 54. The physical position can be indicated in centimeters from beginning of tape, relative codes on a machine or supply reel, and the like, while the logical position may be a serial number of the record block as it appears on tape. Using these two indices host 12 can determine where in chain 163A the error actually occurred, i.e., it can locate that error 170 occurred in the penultimate record. This can be achieved by the host reading the record immediately preceding the penultimate record and determining logical and physical numbers of that successfully recorded record. For further enhancing recovery, a recovery action RA code which informs the host of circumstances of processing implied in chain 163. The LOG and PHY can also be supplied with sense data for identifying the block in error. From this information the record in error at 170 is readily identified.

Segment 1 in the tape write mode receives data signals from channel adapter CAB over bus 84B to be recorded on a device 13 with address DO, hereinafter referred to as device DO. The single record to be recorded on device DO begins at a segment 1 address represented by vertical line 173 and extends to an ending address represented by vertical line 174. As soon as the signals are being recorded in segment 1, device DO is started. It may be that device DO has not accelerated to recording speed when the last signal is recorded at 174. In any event, as soon as device DO is up to recording speed, the record in segment 1 is transferred to device DO for recording. This action can be a record in chain 167. Since the tape write mode is an efficient mode the duration of a chain of commands 167 can be quite extensive. Accordingly, the records in segment 0 that were not yet recorded at the time 165 can reside in that segment for an extensive period of time before actually being recorded on its device DA. This indicates importance of the deferred UNIT CHECK and other control features described later.

Segments 2 and 3 are shown as being in the tape synchronous mode write. Two segments have been combined as a single address space within buffer 15 (no limitation thereto intended) for handling the rate changing function between a channel connected to channel adapter CAA as connected over bus 81A. The signals are transferred to device 13 having address D6, hereinafter referred to as device D6, over bus 846. The arrangement is such that CAA had supplied signals to segment 2 at beginning address 190 and continues on through the increasing addresses as represented by arrow 191. When the end of the segment 2 is reached, as at 192, the buffer addressing automatically goes to the beginning of segment 3 at 193. Such concatenated addressing is well known and not further described for that reason. The data signals received from bus 846 then are recorded in segment 3 up through address 194. At this point in time device D6 is up to recording speed and starts receiving signals from segment 2 beginning at address 190. Simultaneously therewith, the data signals from CAA continue to flow into segment 3 as indicated by arrow 195, at least to address 196. Signals can continue to flow through the last address of segment 3 where upon the data signals received from channel adapter CAA are then inserted in the lowest address of segment 2 and the cycle repeated until the end of the record. One and only one tape synchronous mode operation can be active (many device operations can be scheduled/interrupted) in a buffer 15 at any given instance. The tape synchronous modes (read or write) can be interleaved among buffer (read or write) and tape write modes.

The last illustrated mode is shown for segment F as the read backward mode. Data signals are transferred from device 13 having address D2, hereinafter referred to as device D2, through the segment F to channel adapter CAC over bus 81C. Since tape 54 is moving backwards, the first record transferred from device D2 segment F is the highest numbered record, i.e., the record closest to LET (logical end of tape) and indicated in segment F as R10 at 205. The last record read into segment F is R6. The next record R5 to be read into segment F will be recorded in area 206 and received over bus 842. The operation of segment F includes a request from a host 12 for the data on device D2. A CCR will be sent to the host by CU 11. Then device D2 will be activated to transfer data signals to segment F. As such records are deposited in segment F, and DEVICE END is sent to host 12 by subsystem 10 signifying that the reason for the CCR has been alleviated and data processing operations can ensue. Host 12 then responds by reading record R10 even while device D2 is supplying data signals to segment F. If host 12 fetches sufficient records from the segment F device, D2 can continue to transport tape at a constant speed and supply records to segment F. If for any reason segment F is full, then devic D2 is stopped and other segments of the buffer 15 are employed for other data processing operations. Using a data promotion algorithm, which analyzes activity of all devices 13 and the contents of the segments of buffer 15, device D2 may transfer data signals to segment F independent of activity by host 12 through channel adapter CAC.

From all of the above it can be seen that a diversity of operations can occur in an interleaved manner in storage subsystem 10 while still maintaining an apparent store having a short access time. The numerals 81A, 84A respectively correspond to the numerals 81 and 84 of FIG. 2 with the right-most digits of the FIG. 5 numerals corresponding to the device addresses (0–F) or the channel adapter 80 addresses (A–H). To further illustrate the interleaving table showing a possible sequence of operations is included in the description. In the following table, the mode of the various segments are identified, the time of occurrence of the event is listed in serial sequence from 31 to 39, the time elapsed between 31 and 32 is not scaled, i.e., can be longer than the elapsed time from 32 to 33 and so forth. A channel transfer, i.e., transfer from CNL 16 to a buffer 15 is indicated by CX while the transfer from CNL 16 to a buffer 15 is indicated by CX while the transfer between buffer 15 and a device 13 is indicated by DX. The direction of transfers indicated by the mode examination will illustrate the interleaving referred to above.

| BUFFER TRANSFERS | | | | | |
|---|---|---|---|---|---|
| SEGMENT | 0 | 1 | 2 | ... | F |
| MODE | BWM | TWM | TSWM | ... | BRM8 |
| ACTIVITY TIME | | | | | |
| 31 | CX | — | — | | — |
| 32 | — | CX | — | | — |

-continued

| | | BUFFER TRANSFERS | | |
|---|---|---|---|---|
| 33 | CX | — | — | CX |
| 34 | — | — | CX,DX ... | — |
| 35 | CX | DX | — | — |
| 36 | — | CX | — | DX |
| 37 | — | — | CX,DX | — |
| 38 | CX,DX | — | — | — |
| 39 | DX | — | — | — |

The preferred embodiment of the present invention involves a programmed microprocessor 110 with a plurality of microcode logic modules stored in control store 111. Additionally the tie-in for performing all the functions is achieved through the use of a plurality of registers, called tables, which contain signals representing various states of the storage subsystem. In order to facilitate the understanding of the preferred embodiment, all of the tables used in connection with describing the present invention are detailed first; then a general description of the logic modules and their interaction via microprocessor 110 with the tables will follow. Finally a detailed description of the logic modules is provided. The tables used in describing the present invention include BRT 141 of FIG. 6, BST 137 of FIG. 7, CST 131 of FIG. 8, CUT 130 of FIG. 9, CXT 143 of FIG. 10, DOT 136 of FIG. 11, LDT 133 of FIG. 12 and SDT 132 of FIG. 15. Other tables are referenced and not illustrated as the details of which are not pertinent to an understanding of the present invention.

Figure 6:
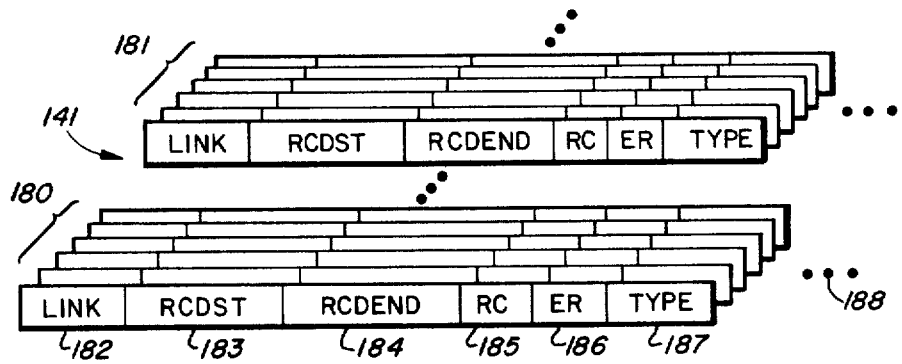

BRT 141 is first described with reference to FIG. 6. BRT 141 contains a plurality of registers arranged into plural sets of linked-list registers 180, 181 one set for each buffer 15 segment allocated to a device 13 that currently is storing at least one record. For example, if there are four allocated buffer segments in buffer 15, then there will be four sets of BRT 141 registers that form link-list registers. Every record stored within a given buffer segment sill have one assocaited entry in BRT 141 in a respective register in the associated sets of registers 180, 181. The linked-list registers link all entries together such that each and every record in the segment is linked to every other record in chronological sequency of receipt such that the buffer segment operates as a FIFO buffer. The linked-list BRT registers are logically associated and can be dispersed throughout control store 111 within a given address range; that is, each linked-list register is not necessarily adjacent to other registers in the same linked-list. Accordingly, the maximum number of entries into BRT 141 for all of the segments in buffer 15 is dependent upon the unused registers 180, 181. At a given instant, before a BRT 141 register is allocated to a record, a test is made by control 33 via microprocessor 100 to determine whether or not the respective buffer segment has more or less than one half of the available BRT 141 registers allocated to it. If more than one-half, then no more BRT entries will be allocated to that segment thereby indicating that the buffer segment is full because of limitations in BRT 141 entry storage capability. The linked lists of BRT 141 entries are addressed via BST 137; that is, each BST 137 register has an address pointing to the BRT 141 register that contains the first received record in the segment associated with the BST 137 register. As records leave buffer 15, this pointer is adjusted to dynamically point to the BRT 141 entry corresponding to the instant first-received record in the buffer segment.

For purposes of explaining the present invention, some sections of BRT 141 registers are described. A first section 182 contains the link to the next BRT 141 entry associated with that given segment. The register associated with the first record in any segment is pointed by BST 137. That first register has its section 182 with an address pointing to the next register associated with the second received record, etc. As records are removed from the buffer segment, the link lists are updated using known data processing techniques. Register section 183 contains the address in the associated buffer segment at which the indentified record stored in the buffer segment, has a starting address. In a similar manner register section 184 stores the ending address for this identified record. The second register in BRT 141 has a record starting address in section 183 which is one greater than the ending address stored in section 184 of the first BRT 141 register, etc. RC section 185 contains indicia indicating the completeness of the record; that is, whether or not a complete record is presently stored in the associated buffer segment. The same bit also indicates validity of subsequent linked entries in the BRT 141 registers. ER 186 denotes whether or not an error occurred. Section 187 indicates the type of record stored. That is, data, image, non-coded information, tape mark, erase gap information, density marks or other control or data types that may be used in connection with the operation of peripheral subsystems of diverse types. Ellipsis 188 indicates that a typical BRT 141 may have additional sections for the operation of a subsystem which are not pertinent to an understanding of the present invention.

Figure 7:
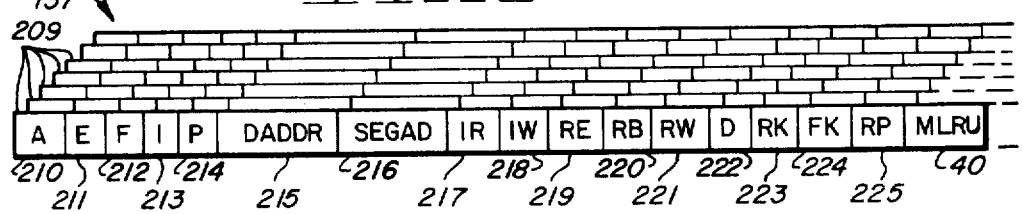

BST 137, shown in FIG. 7, has eight registers 209, each of which correspond to a segment of buffer 15. If there are ten segments of buffer 15 then there are ten registers 209. The information contained in BST 137 relates to data transfers, buffer 15 segment allocation and load balancing. Access to BST 137 is by indirect addressing through LDT 133, as later described. Each of the registers 209 include the following described signal areas or sections for controlling operations involving the respective buffer 15 segments. Section A 210 indicates whether or not the indicated buffer segment is allocated to a device 13. When allocated, the combination of the allocated segment and a device 13 constitutes a logical device. E section 211 indicates whether or not there is an outstanding or pending channel command involving the buffer segments. The term E means engaged in the execution of a channel command. F section 212 signifies whether or not the indicated segment has been scheduled for deallocation, i.e., freeing. Note the A section 210 indicates whether or not the representd segment is allocated or freed (deallocated). I section 213 indicates whether or not the segment is operative; when I is active then the segment is inoperative. P bit 214 indicates whether or not the segment is paired with another segment such as segments 2 and 3 were paired in FIG. 5. By arbitrary convention a lower numbered even segment is paired only with a next higher numbered odd segment. That is 0 and 1 can be paired but not 1 and 2. Similarly segments 2 and 3 can be paired but not 3 and 4. When segments 2and 3 are paired then the macro segment is referred to as section 2. DADDR section 215 contains the address of the device 13 to which the indicated segment is allocated. DADDR also becomes the address of the logical device formed by the combination of the allocated segment and device 13. SEGAD section 216 contains the beginning and ending address of the segment in buffer 15, in a paired segment the ending address is the ending address of the next higher numbered odd segment. IR bit 217 is active when a data transfer with a device is started and not yet completed. This is used in the read mode. IW bit 218 is set when the signals are being transferred from buffer 15 to a device 13 of a record to be recorded before the channel transfer has been completed. Bits 217 and 218 are used in device 13 control for keeping the tape moving once a data transfer has been initiated. RE bit 219 is active when a channel and device streaming data through a buffer segment simultaneously. This indicates that the device will be reconnected to the channel for streaming data transfer operations. Streaming data transfer operations indicate that an entire series of data records are being transferred as a series of bursts without substantial interruptions. RB bit 220 when active indicates READ DATA BUFFER command is being executed. The READ DATA BUFFER command is executed through microprocessor 110 using logic module CE RDB 338 shown in FIG. 36. RW bit 221 indicates the mode of the logical device i.e., read or write. D bit 222 indicates the direction of tape motion i.e., forward or backward. RK section 223 indicates the number of records contained in a buffer segment. This number of records will correspond to the number of BRT 141 entries currently active for the indicated buffer 15. FK section 224 indicates a number of free bits of data currently in a buffer 15 segment. The number of free bits indicates to microprocessor 110 the number of records that can be read ahead from a device 13 to a buffer segment in a read mode. RP section 225 contains record pointers, i.e., two addresses which point to the BRT 141 registers respectively for the first and last record stored in a buffer segment. The intermediate records are found through the linked lists of BRT 141. MLRU section 40 constitutes the most recently used and least recently used double-linked entry list used in connection with promoting data and demoting data between buffer 15 and devices 13. This section has been described with respect to FIG. 1 earlier. Ellipses 226 indicates that additional entries may be used in BST 137 for controlling a buffer segment in aspects not pertinent to an understanding of the present description.

Figure 8:
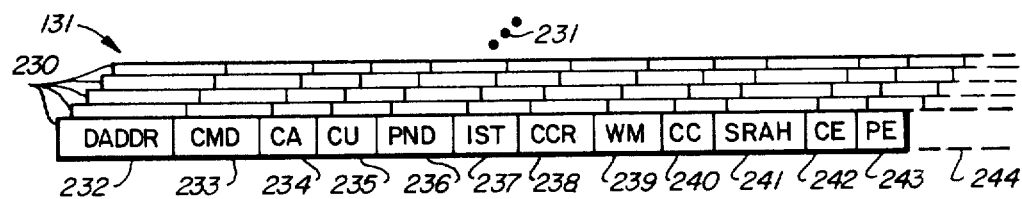

FIG. 8 shows CST 131 as having a plurality of registers 230. Some registers (not shown), as indicated by ellipsis 231, have a series of entries for containing information about a command received from a host 12 that is currently being executed with respect to an addressed device 13. The registers are arranged by device address. Generally CST 131 is controlled by the logic modules in groups CUCS 155 and CUCE 152. If there is no current command being executed then there is no entry in CST 131 for a given device 13. Section DADDR 232 holds the address of the device 13 for which a command was received. CMD contains the command code that specifies what channel command is being executed or is to be executed. CA section 234 identifies the channel adapter 80 over which the command was received. CU section 235 indicates which control unit 11 received the command. Because of the cross-connections between the channel adapters and the buffers 15, either control unit 11 can execute any command. That is, a command can be first received by CU-O and then later transferred to CU-1 using load balancing techniques beyond the scope of the present description. PND bit 236 indicates that a command is in progress for the device indicated by DADDR 232. 1st bit 237 indicates whether or not a first aspect of a received command has been completed. That is, each command execution can have preparatory and executory phases. When bit 237 is active the preparatory phase has been completed. CCR bit 238 indicates that a channel command retry has been reported to the host 12 and has been accepted by CNL 16 with respect to the addressed device. WM bit 239 indicates whether or not the corresponding device is operating in the buffer write mode or the tape write mode. LDT 133 handles the tape synchronous modes. CC bit 240 indicates that command execution has to continue. As an example, CNL 16 disconnects from CU-0, then CNL 16 has to be later notified that a particular device operation has been completed. CC 240 is set at time of disconnection from CNL 16. SRAH bit 241 suppresses read ahead of data from a device 13 to buffer 15. Read ahead is inhibited when a tape mark has been read or written or a command such as LOCATE BLOCK, REWIND, or REWIND UNLOAD has been initiated. That is, host 12 has indicated a major change in data processing operations. CE bit 242 indicates that a CHANNEL END has been sent and accepted by CNL 16; A DEVICE END is still owed by the addressed device. PE bit 243 indicates that a permanent error has occurred and data to be recorded still resides in the allocated buffer segment. When a tape motion command is received from host 12, all existing data in the buffer 15 segment will be deleted. Ellipsis 244 indicates that additional entries and information will be stored in CST 131, which information is not necessary for an understanding of the present description.

Figure 9:
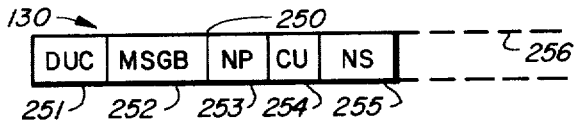
Figure 10:
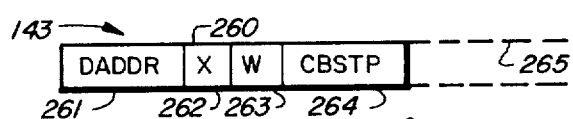

FIG. 9 shows that CUT 130 has but a single register with several sections. Those sections pertinent to an understanding of the present invention include DUC bit 251 which indicates that a DEFERRED UNIT CHECK will be presented to CNL 16 at the next received channel command. MSGB bit 252 indicates that a message buffer (not shown) of status store 100 is currently in use in transferring control data between CU-0 and CU-1. NP bit 253 indicates that no buffer segments are available for pairing. The reason for this is beyond the scope of the present description. CU bit 254 identifies whether the control unit is CU-0 or CU-1. In this manner both control units 11 can be constructed identically with the identification or address being determined by this single bit. NS segment 255 indicates the number of buffer segments that are currently installed in this control unit. Ellipsis 256 indicates that additional sections may be required for CUT 130, which sections are not pertinent to an understanding of the present invention.

Figures 27, 28:
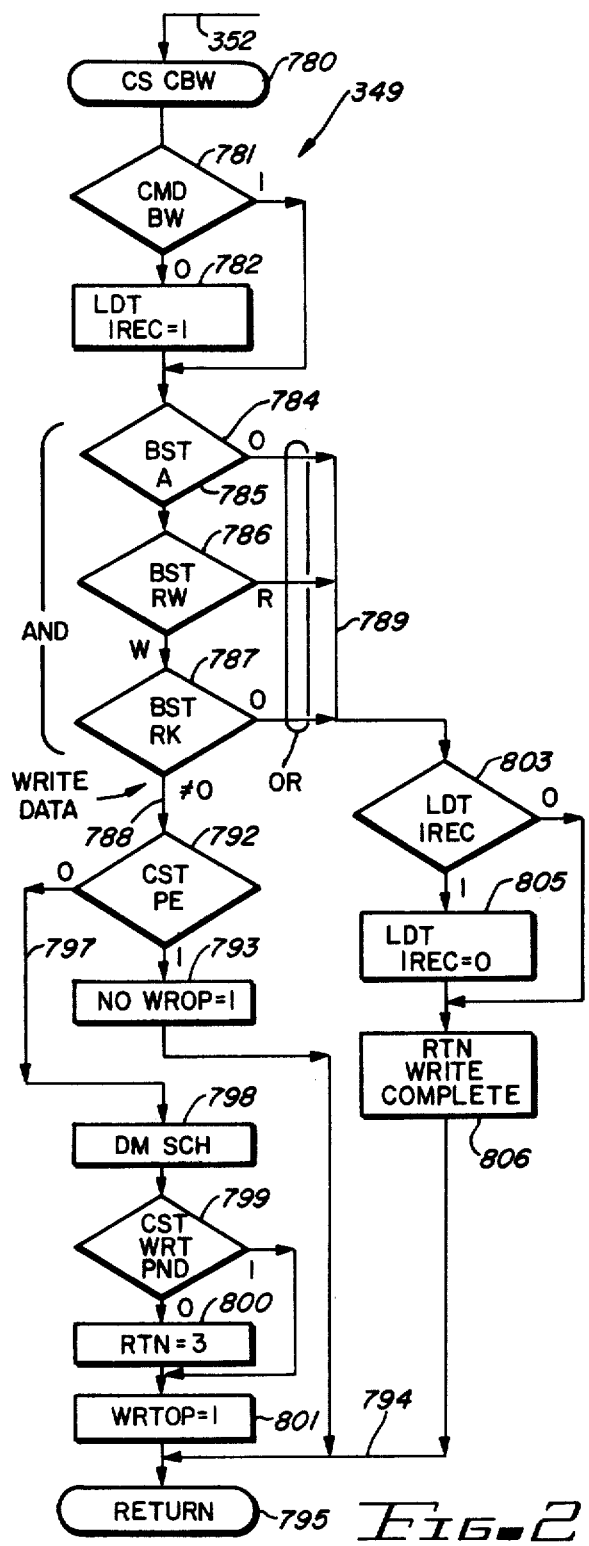
FIG. 27 illustrates logic module CS CBW, for starting a continued buffer write, which is a data transfer from a buffer to a recorder as a result of an operation reactivated incomplete.
FIG. 28 shows logic module CB EUW which relates to operations used to stop a data transfer between an input/output channel and the buffer in the control unit.

CXT 143 (FIG. 10) has a single register 260 for indicating the current transfer of data signals between buffer 15 and CNL 16. DADDR field 261 indicates the address of the device 13 for which the transfer is being conducted. X bit 262 indicates whether a channel transfer is currently in progress. W bit 263 indicates whether or not a channel data transfer is waiting for a device write operation to complete, i.e., for releasing buffer space for the channel transfer. Logic module CS CBW 349, shown in FIG. 27, is often used in connection with recording the data on the device 13 when the W bit 263 is active. CBSTP section 264 is an address of the BST 137 register associated with the current channel transfer. That is, the transfer goes to the one segment and the channel transfer table 143 identifies the segment in section CBSTP 264. Ellipsis 265 indicates that additional sections may be added to CXT 143, which sections are not pertinent to an understanding of the present invention.

Figure 11:
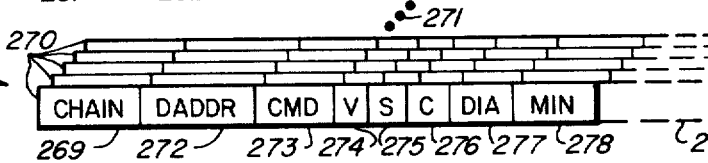

DOT 136 has one register 270 for each of the devices 13. FIG. 11 shows 5 of those registers with the other registers being indicated by ellipsis 271. Device operation table 136 contains information about schedules, active and completed device 13 operations. Queues 21, 22, 23 exist in DOT 136 in the section chain 269 which contains a pointer to the next DOT 137 register in the respective queue. Chain 269 is always the leftmost section of each of the registers 270. If chain 269 is empty then there are no further devices queued for such operations (end of the queue). In one constructed embodiment there are three such queues. These chains are respectively for obtaining sense data, from a device 13 (ICQ 22), controls device operations independent of data transfers (CCQ 21) and data transfers (XQ 23). Each chain is a FIFO schedule of the three different types of operations.

DADDR section 272 contains the address of a device 13 indicated by the corresponding register 270. CMD section 273 contains the command code for a device operation. The coding pattern of CMD section 273 will be different from the coding pattern of the input/output channel command in that CU 11 has a separate set of commands for operating each of the devices 13. These command permutations are not necessary for an understanding of the present invention. V bit 274, when active, indicates that the corresponding device 13 is waiting to execute an operation. If the V bit is inactive, then the other sections within the same register 270 are not valid. S bit 275 indicates that a device operation has started. C bit 276 indicates a completion of a device operation. DIA 277 gives the control store address of the data area for controlling information sequences concerning the address device 13. MIN 278 indicates the minimum number of records to process for each data transfer operation. When a space operation, i.e., skip some records, is being performed, then the number in MIN 278 indicates the number of records or files to skip over. Ellipsis 279 indicates that DOT 136 may have additional sections within each of the registers 270, which sections are not pertinent to an understanding of the present invention.

Figure 12:
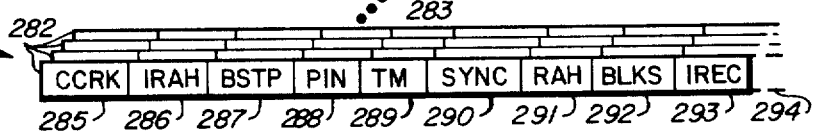
Figure 1S:
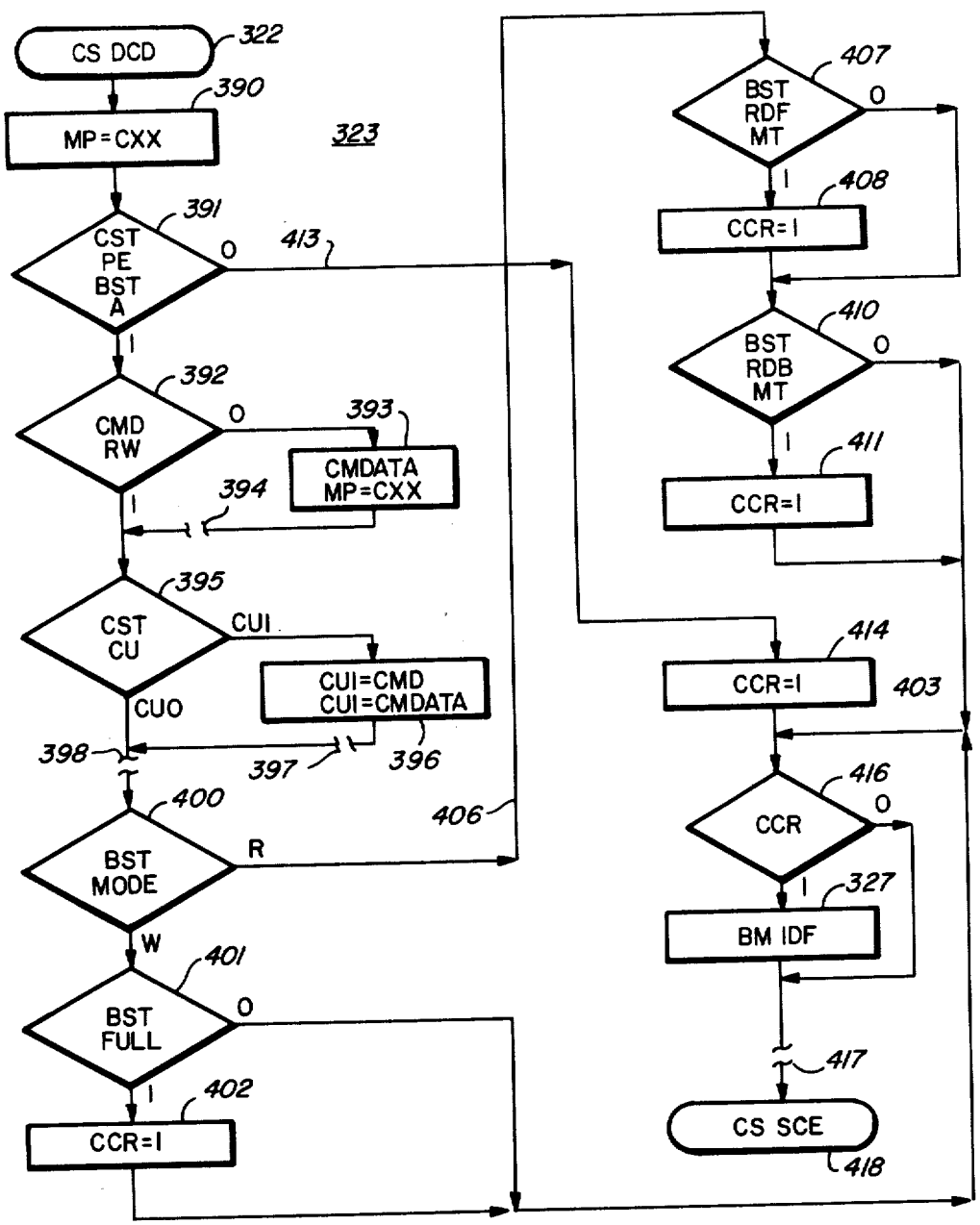

FIG. 12 shows that LDT 133 has a plurality of registers, four of which are enumerated collectively by 282 and ellipsis 283 indicating identical registers that are not shown. The LDT table contains current information about each logical device which is not directly related to a particular buffer 15 segment. The segment information is contained in BST 137. There is one register for each logical device; unallocated or inactive devices 13 have no assigned registers (entries) in LDT 133. CCRK section 285 indicates the number of CCRs to a host 12 for the addressed device. This count is reset during a load balancing operation, upon deallocation of a buffer segment or upon receiving a RESET command from host 12. IRAH section 286 inhibits read ahead operations for this particular logical device. BSTP section 287 contains the address of the register 209 of BST 137 for identifying the buffer 15 segment currently allocated to the device 13 for making up the logical device indicated in by LDT 133. PIN section 288 indicates that the buffer 15 segment allocated to the device 13 is pinned to this control unit. That is, it is exempt from load balancing activities. TM bit 289 indicates that the last record read was a tape mark. SYNC bit 290 indicates that this logical device currently is in a tape synchronous data transfer mode. Note that the read or write mode is indicated by RW bit 221 of BST 137. RAH bit 291 indicates that a current read operation is not scheduled, i.e., the data transfer is a read ahead operation. BLKS section 292 indicates the size of record or signal block of the largest block encountered during this file, i.e., the records between two successive tape marks on a tape 54. Remember that in tape recording, tape marks indicate file demarcation. Ellipsis 294 indicates that additional sections for each of the registers in LDT 133 may be employed for exercising control over the logical device beyond the scope of the present description.

Figure 13:
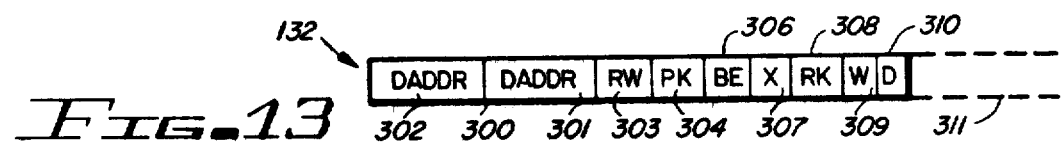
FIGS. 6 through 13 illustrate various tables used in connection with the FIG. 3 illustrated control with the showing of the tables accenting the practice of the present invention. In particular.

FIG. 13 shows SDT 132 as consisting of a single register 300 having a plurality of sections for identifying updated information relating to the presently selected device 13. Since each control unit 11 can select only one device at a time, there is only one register 300. This is not to say that the plurality of devices 13 are not performing a plurality of free standing functions while one device is selected. Information in SDT 132 includes information required for data transfers and for device 13 management. DADDR section 302 contains the address of the currently selected device; a no-device code is inserted into DADDR 302 when no device is selected. DADDR section 301 contains the address of a device 13 that has been prepared for selection and for device operation. RW bit 303 indicates the mode of operation, read or write. PK section 304 contains a number indicating the number of records processed so far during the current device selection. BE bit 306 indicates whether or not the records transferred from device 13 to buffer 15 are to be retained, i.e., is it data or a non-data operation? A non-data operation, such as space block, results in data signals being transferred from device 13 to buffer 15, but such data is not to be relayed to a host 12, hence it is not retained. X bit 307 indicates that a data transfer is active. RK section 308 specifies the number of records to process in the current device selection. This can be a minimum number of records as mentioned earlier with respect to section 278 of DOT 136. If PK section 304 contains a number greater than RK section 308 and W bit 309 is off, the device processing will discontinue. If W bit 309 is active then data transfer will continue. D bit 310 indicates the direction of tape motion. Numeral 311 indicates register 300 may have additional sections not pertinent to an understanding of the present invention.

FIG. 14 shows the microcode logic module interaction achieve via microprocessor 110 for implementing the present invention in a preferred mode. In particular, logic modules are those stored in control store 111 and are portions of the various logic module groups 150–161 identified in FIG. 4. The various logic modules illustrated in FIG. 14 can be identified with the module groups by the first two alphabetic characters, for example CS DCD logic module 323 is in group CDCS 155. The right-most two alphabetic digits of the FIG. 4 denomination CS correspond to the left-most alphabetic characters of the FIG. 14 denomination. In a similar manner CB UWO 381 is a logic module in the group CUCB 151. The various lines in FIG. 14 illustrate the interaction between the logic modules as those modules are executed by microprocessor 110. Some of the tables shown in FIGS. 6 through 13 are also indicated in FIG. 14. The cooperation between the various tables and the various logic modules is best understood by reference to FIGS. 15 et seq. The description of FIG. 14 will follow generally the receipt of a command, decoding of a command, a description of execution of some of the commands, the supplying of CCR's based upon buffer conditions, and continued execution of commands, including synchronous modes and preparatory actions. Such descriptions will be followed by activation of devices 13 which in turn are followed by a description of allocation and deallocation control of buffer 15. These descriptions are followed by description of the length detector which includes a circuit description of a measuring instrument for buffer 15 operations together with the logic modules that handle overrun measurement which constitutes a length measurement, the resultant control of the buffer 15 and institution of the tape synchronous mode of operation.

A command from host 12 is partially decoded by a channel adapter 80. This partial decoding results in an interruption signal being supplied to microprocessor 110 as indicated in FIG. 14 by numeral 320 indicating that a command has been received. Microprocessor 110 operating through its interrupt scans 321 senses the channel adapter 80 supplied interruption signal. As a result microprocessor 110 proceeds over path 322 (executing logic modules not pertinent to an understanding of the present invention, as used to handle interrupt signals, etc., as is known) to execute logic module CS DCD 323 as detailed in FIG. 15. For each functional command received from host 12, this command decode logic module puts the device address and channel adapter status code into internal registers (not shown) of microprocessor 110 for later use. Microprocessor 110 checks the received command code and control unit indication to correct any errors or unusual situations, if they exist. Microprocessor receives accessory data associated with a channel command, if there is any. In the commands described with respect to present invention only the MODESET command has such data. Microprocessor 110 determines which control unit the command will be executed by and will send the command message to the other control unit 11 if the device has been previously allocated to the other control unit 11. Microprocessor 110 increments the channel command retry count CCRK 285 if a channel command retry is initiated. This incrementation is effected over path 327 for activating logic module BM IDF 328, described in detail with respect to FIG. 16. From logic module CS DCD 323 microprocessor proceeds to start the command execution through logic module CS SCE 330. Microprocessor 110 in executing this module for each functional command received ensures that a buffer 15 segment for the addressed device 13 has been allocated for a buffer 15 using command, such as READ or WRITE. Microprocessor 110 initiates appropriate buffer and device preparation for the received command, as will be later explained. Microprocessor 110 also activates the appropriate microcode command execution logic modules for executing the command as will be described with respect to FIG. 14. Microprocessor 110 also uses logic module CS SCE 330 for presenting ending status to the channel adapter and adjusting the command status table 131, as appropriate. This logic module is not only activated from logic module CS DCD 323 but also from a received message CS MSG 331 and from CS LDC 348 as indicated by line 332.

In FIG. 14, line 335 represents the operative activation of the various command execution modules of CUCE 152 by microprocessor 110 executing logic module CS SCE 330. Included in these logic modules are CE RDC 336 which executes a first received READ command, as detailed in FIG. 18. Microcode logic module CE WRT 337 is activated to execute a WRITE command as detailed in FIG. 22. Logic module CE WRT 337 is used for activating the buffer write mode and the tape write mode, as well as any first received WRITE command independent of the tape synchronous mode. When a tape synchronous mode is set up, logic module CE SWR 340 starts WRITE command execution. Execution of the READ DATA BUFFER command is by logic module CE RDB 338, as detailed in FIG. 36.

When the tape synchronous mode has been instituted in the control unit, the sync bit 290 of LDT 133 (FIG. 12) is set to the active condition. Microprocessor 110 in executing logic module CS SCE 330 senses bit 290 to determine which command execution module to activate. When the synchronous mode is indicated, then microprocessor 110 in a read mode activates logic module CE SRD 339 for a tape synchronous read or CE SWR 340 for a tape synchronous write, as respectively detailed in FIGS. 33 and 34. Microprocessor 110 in executing modules 339 and 340 merely sets up the control unit for executing a READ or WRITE command in a tape synchronous mode. Accordingly, microprocessor 110 activates the channel adapters 80 to send a CCR to CNL 16. When the preparation of the buffers and the device have been completed, then microprocessor 110 activates the appropriate channel adapter 80 to send a DEVICE END signal to host 12 signifying preparation is complete. Subsequent to the DEVICE END, the READ or WRITE command is again sent by CNL 16 to storage subsystem 10. As a result, microprocessor 110 in executing module CS SCE 330 will activate logic module CE SSO 342 as detailed in FIG. 35. This logic module enables microprocessor 110 to start a synchronous operation that was set up by either CE SRD 339 or CE SWR 340.

Figure 19:
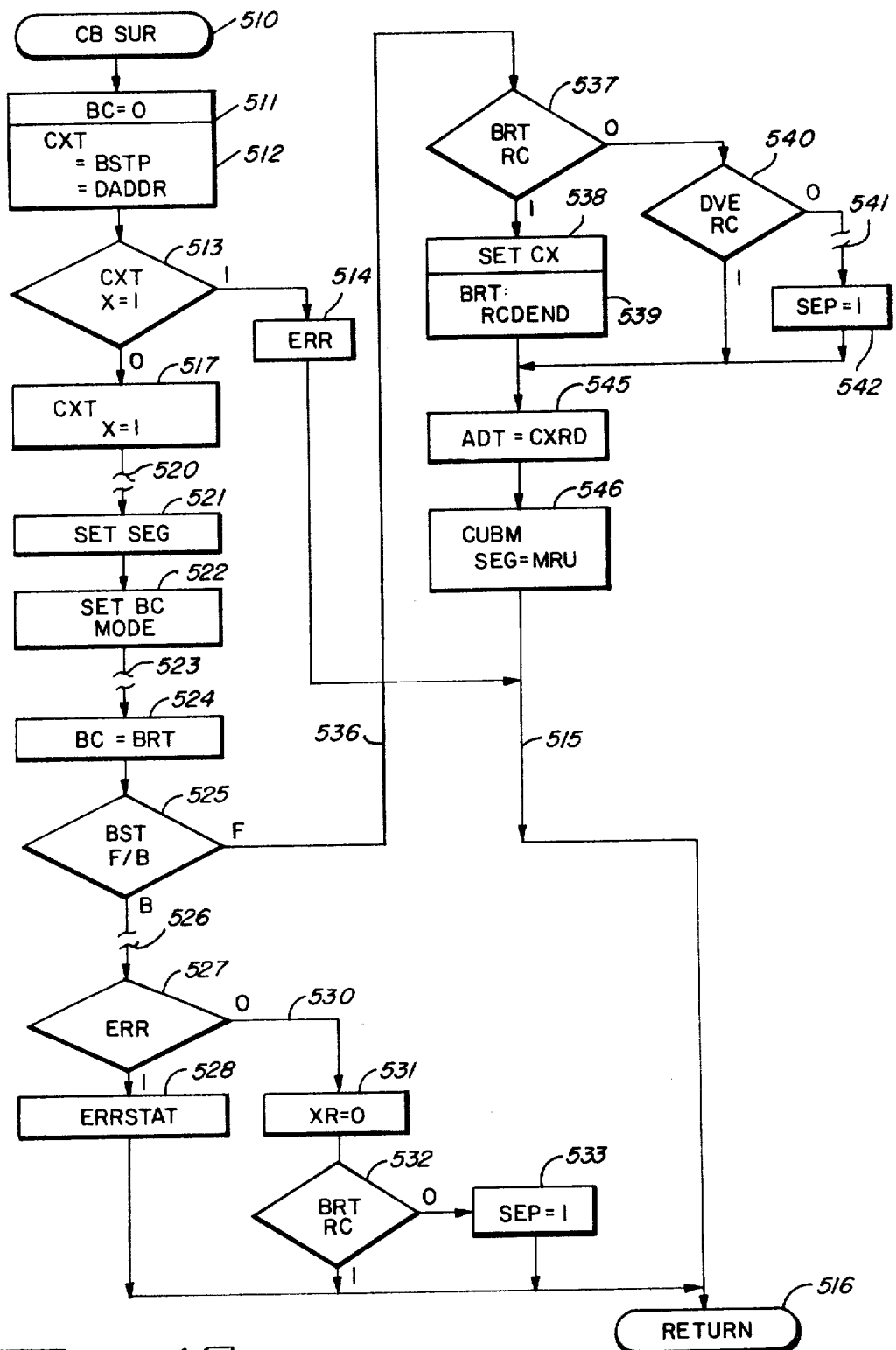
FIG. 19 illustrates logic module CB SUR which shows those operations for starting data transfer from the buffer of a control unit to an input/output channel.

In a read operation, the data transfer from buffer 15 to channel adapter 80 thence CNL 16 is started by microprocessor 110 executing logic module CB SUR 343, as detailed in FIG. 19. Activation of CB SUR 343 is from either CE RDC 336, CE RDB 338, or CE SSO 342. In a similar manner logic module CB SUW 344, shown in FIG. 23, enables microprocessor 110 to start the transfer of data from CNL 16 into buffer 15. This includes activation of CX 26. Logic module CB SUW 344 is activated from either logic module CE WRT 337 or logic module CE SSO 342.

Logic module CS SCE 330 enables microprocessor 110 to prepare the buffer, i.e., prepare the logical device for command execution. That is if a CCR is sent because the logical device is not constituted or other buffer conditions prevent command execution, then logical device preparation must be provided. Microprocessor 110 over path 335 activates logic module CS LDP 347 for logical device preparation. Microprocessor 110 in executing CS LDP 347, as detailed in FIG. 25, accesses status store 100 for determining buffer 15 conditions. If the received command is a WRITE command and the buffer 15 segment allocated to the addressed device 13 is full, a WRITE operation is initiated to clear out some buffer space for data expected via the just received WRITE command. This action is achieved by activating logic module CS CBW 349. CS CBW 349 enables microprocessor 110 to complete writing the data to be recorded that is still in buffer 15 segment of the addressed logical device. Returning to CS LDP 347, if the received command is a READ DATA BUFFER command, microprocessor 110 ensures that all buffer write operations have been completed before the READ DATA BUFFER command is executed. If the just received command is not a WRITE or a READ DATA BUFFER command and the buffer 15 segment is in a write mode, then microprocessor 110 ensures that all data to be recorded is actually recorded on tape 54. Read ahead control bits 286, 291 of LDT 133 are also updated. For a received READ command while a read operation is occurring between buffer 15 and a device 13, the read ahead operation bit 291 is reset in LDT 133. For a read operation from a device 13 to buffer 15 when a received command is not a READ command or a SPACE command that was accepted by a channel adapter 80, microprocessor 110 ensures that the read ahead operation is completed before the first received command is executed. On the other hand, if the received command is a READ DATA BUFFER command or a SYNCHRONIZE command and the buffer 15 segment, if there is one allocated, is in a read mode, then ending status is built immediately for the command. Remember the READ DATA BUFFER command and the SYNCHRONIZE command are for handling write data only. Therefore, if the buffer 15 segment is allocated or if there is no buffer segment allocated, then there is no action to occur on either the READ DATA BUFFER or the SYNCHRONIZE command, then CS LDP 347 is activated only after a CCR has been given due to these buffer conditions.

Additional logical device preparation is provided via logic module CS LDC 348 which corresponds favorably to CS LDP 347. Microprocessor 110 with regard to CS LDC 348 also can update the control unit read ahead control bits. In the event there is no data in buffer 15, status store 100 is informed that the buffer 15 segment related to the addressed device is empty. Read ahead operations are terminated for a buffer 15 segment using command which will not use the data to be or currently being read ahead. A repositioning operation of tape 54 is ordered as may be necessary. Record entries in BRT 141 for data records purged from the buffer are deleted. If an input/output command is pending and the command is not a REWIND, REWIND UNLOAD or LOCATE BLOCK command or a buffer deallocation is pending, microprocessor 110 via logic module CS RDA 351 determines how many data blocks were read ahead and will schedule a device 13 operation to reposition the tape 54 to a position just preceding the read ahead operation just nullified.

Many of the described operations require a device 13 activation. This activation is achieved via various described logic modules over line 352 which activates logic module DM SCH 353 which enables microprocessor 110 to schedule a device 13 operation as detailed in FIG. 24. Because scheduling device operations permeates subsystem 10 operations many, many logic modules can activate DM SCH 353. Included in these logic modules are CS CBW 349, read ahead operations by DM RAH 350, execution of a LOCATE command by logic module CE LOC 364, CE RDC 336, execution of a REWIND command by logic module CE REW 363, CE SRD 339, CE SWR 340, CE WRT 337, and others including diagnostic logic modules not shown. Microprocessor 110 in executing logic module DM SCH 353 loads XQ 23 in one of the three described queues by DOT 136. DOT 136 is scanned by microprocessor 110 for work to be done and activates logic modules in groups CUDM 158, among others, to activate device 13 and then track a selected device operation through SDT 132. In this regard a device 13 being selected for a start up operation will be selected only for the initial start up. The acceleration and other operations are free standing operations. When the device reaches operating speed, such device 13 signals control unit 11, using known techniques, that it is ready for a data processing operation. Similarly in a rewind, microprocessor 110 through CUDM 158 and other modules (not shown) activate a device 13 by selecting it and giving it a rewind order. Then the device is deselected while it performs the actual rewind function.

Allocation and deallocation of buffer 15 follows usual allocation and deallocation techniques for memories. This includes a pending allocation table PAT 134 and a pending deallocation table PDT 138. Allocation of a buffer segment to a device 13 to create a logical device is initiated through an interrupt scan following path 354 to logic module BM ABS 355. This allocate buffer segment logic module 355 enables microprocessor 110 to allocate a buffer 15 segment to a device 13 when the pending allocation table PAT 134 is not empty. If PAT 134 is not empty, then the first device address is obtained from that table. If the device 13 has a BST 137 entry, i.e., a segment is allocated and is listed in the pending deallocation table PDT 138, then the two entries, if identical, are cancelled. Microprocessor 110 also determines whether or not the logical device will need a pair of segments as opposed to a single segment. If the segments are allocated, then the device address is deleted from PAT 134. To implement such allocations, microprocessor 110 from BM ABS 355 activates logic module BM ASE 356 for allocating a single segment or logic module BM ASP 357 for allocating a pair of buffer 15 segments. Allocation of segments may require a deallocation. Accordingly BM DBS 359 is activated when a deallocation is required. BM DBS 359 can in turn activate logic module BM PDT 384 for making an entry into PDT 138. A deallocation buffer 15 segment is defined as becoming the least recently used segment. Accordingly microprocessor 110 activates logic module BM LRU 360 to update MLRU 40 in BST 137 for the addressed device. Deallocation of a buffer segment may also require device operations. Accordingly microprocessor 110 from logic module BM DBS 359 can follow path 368 to activate logic module DM SCH 353. When BM DBS 359 deallocates a buffer 15 segment having data read from a device 13 via logic module DM RAH 350, logic module CS RDA 351 is activated to clear data from buffer 15 as later described.

Figure 20:
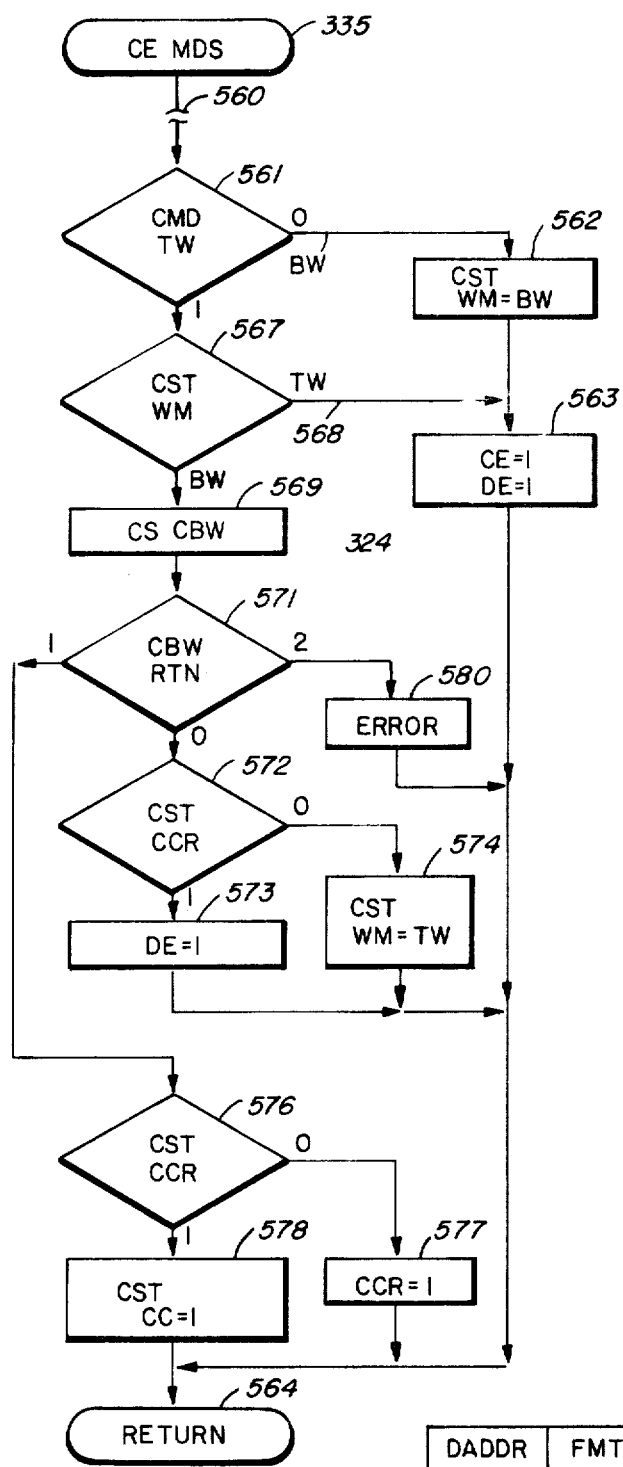
FIG. 20 illustrates operations for executing a MODE SET command in logic module CE MDS.

The beginning at each chain of channel commands can include a MODESET command. Logic module CS SCE 330 upon detecting a MODESET command activates logic module CE MDS 324 over line 335. As a result of executing logic module 324, microprocessor 110 sets CST 131 via line 326, WM field 239 as well as activate data flow 83 to accommodate recording densities as may be commanded in such a command. The details of logic module CS MDS 324 are shown in FIG. 20. In some embodiments of the control unit, a channel adapter 80 may perform many of the functions of mode setting. Length detectors LD 30 and 48 operate based upon certain buffer 15 segments addresses, as will be explained later. In any event circuits 372 detect so-called overrun conditions; when data coming into the buffer is to be stored in a record limiting or stop address, an overrun is signaled. An overrun from CNL 16 to buffer 15 is indicated by an interruption signal on line 373. This interruption signal activates interrupt scan 321 as indicated by line 380 to activate logic module CB UWO 381. Microprocessor 110 in executing logic module CB UWO 381 determines whether or not more buffer space can be given to a record that overran its presently allocated space. If more than one record is currently stored in the buffer 15 segment of the addressed logical device and if this device is currently writing data onto tape 54, then action is deferred until the signal transfer from buffer 15 to device 13 is completed. Otherwise, the BRT 141 register associated with the record is erased and all of the other records stored in the buffer 15 segment are written on the tape via logic module CS CBW 349. This activation is not shown in FIG. 14. Other activations by microprocessor 110 are indicated by line 382 extending to logic module BM DIS 383 which disables operation of the buffer 15 segment involved. Details of this logic module are shown in FIG. 31. Also logic module BM PDT 384 and BM PAT 358 are actuated for deallocating a single segment and allocating a segment pair for the logical device. In the event that a segment pair has already been allocated, then the tape synchronous mode is set.

Figure 40:
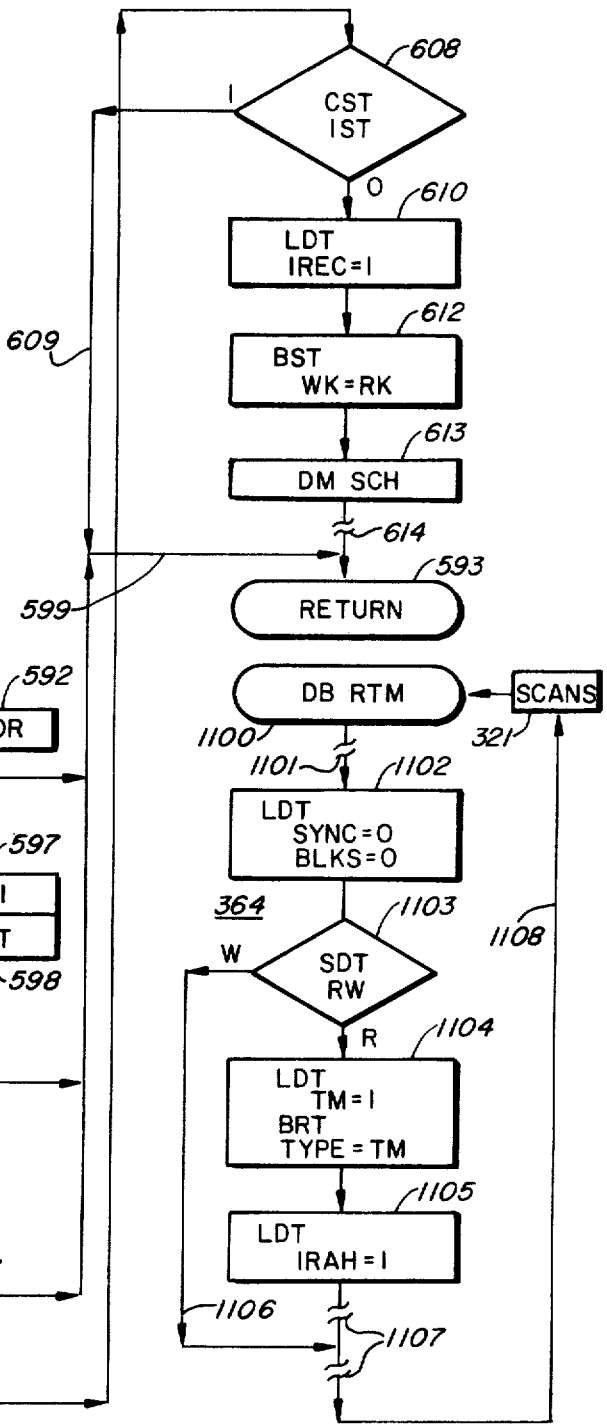
FIG. 40 shows logic module DB RTM relating to tape mark handling as a tape mark is employed with respect to the present invention.

Rewinding tape 54 to BOT is achieved by CU-O responding to a REWIND UNLOAD command executed via logic module CE REW 363 shown in FIG. 41. Rapidly positioning tape 54 to an addressable location is handled via logic module CE LOC 364 for the LOCATE BLOCK command. These three commands from a host 12 signify to subsystem 10 that host 12 is undergoing a major change in data processing. Accordingly, subsystem 12 for the addressed device terminates any tape synchronous mode and institutes read ahead (no prefetching of data to buffer 15 from the addressed device 13) or writes data from buffer 15 into the addressed device 15 so that the buffer 15 segment is empty. In addition to these commands, a tape mark (write or read mode) is interpreted as a possible major change in data processing. Accordingly, microprocessor 110 via logic module DB RTM 364A reached from scans 321 upon detection of a tape mark from tape 54 or by a command WRITE TAPE MARK received from host 12 resets the subsystem 10 control relating to the addressed device 13. Such resetting includes resetting the mode to the buffer mode, inhibiting read ahead, resetting BLKS 292 of LDT 133 to zero all as shown in FIG. 40.

For an overrun during a data transfer from a device 13 to an allocated buffer 15 segment, circuits 372 provide an interruption signal over line 374 to activate logic module DB DBO 385. Operation of DB DBO 385 is similar to that for CB UWO 381. The third interruption signal on line 375 relates to buffer 15 segment being empty or full and is not fully described in this description. Lines 373, 374 and 375 are all a portion of interruption lines 122 shown in FIG. 3 for the interruption of microprocessor 110.

Termination of a data transfer operation as well as other operations of storage subsystem 10 can be achieved by a host 12 sending a CMDO (COMMAND OUT) signal as represented in FIG. 14 by line 386. The COMMAND OUT signal is part of the interface connection 14 protocol. Such a signal can cause, during a write operation, activation of logic module CB EUW 387 shown in FIG. 28 for the termination of the data transfer currently in progress between a host 12 and a buffer 15. From logic module CB EUW 387 microprocessor 110, over line 832, activates logic module CS CTC 388 for handling control data changes as described with respect to FIG. 39. These actions are a normal ending of a data write operation. It is to be understood that read operations and other operations are similarly terminated by other logic modules, not shown. All of the above description assumes that the microprocessor 110 and all of the other elements of storage subsystem 10 have been suitably initialized using known data processing techniques.

FIG. 15 illustrates the microcode logic module CS DCD 323. This logic module is activated at 322 by receiving a command or alternatively by activation internally by microprocessor 110. The first actions at 390 analyze the source of the activation, i.e., whether or not a command was received from an adapter 80 or a message received from the other control unit $\Pi$ (OCU), the address of the device 13 being addressed (this address is saved in a work register of microprocessor 110) and the command code (MP=CXX) indicating what is to be performed by storage subsystem 10. After the above described housekeeping operations have been completed, microprocessor 110 at 391 senses the contents of CST 131 (FIG. 7) to determine whether or not the addressed device 13 has any identified errors or unusual conditions such as indicated in PE section 243 and whether the A bit 211 of BST 137 is active such that some activity for the addressed device 13 can occur. If the above-listed criteria are met, then at 392, microprocessor 110 examines CMD 233 of FIG. 8 to determine whether or not the command is a READ or WRITE command. If not a READ or WRITE, then at 393 and 394, auxiliary functions not pertinent to an understanding of the present invention are performed; these include receiving command data (CMDATA) from the channel adapter 80, such as parameters modifying a logical control command, and the like. Numeral 394 indicates that the character of the command and the like has to be analyzed. Upon completion of such ancillary operations or when the command detected at 392 is a READ or a WRITE command, microprocessor 110 at 395 determines from CST 131 which control unit 11 is to execute the command stored in CMD 233. If the control unit is the other control unit, such as CU-1, then a message concerning the command is transferred to CU-1 via cable 109. Such message is transferred at 396 which includes the command data and the command itself. At 397, additional housekeeping functions are performed not pertinent to an understanding of the present invention. If the command is to be executed by the local control unit, i.e., CU-0, then no action need be taken. Additional nonpertinent logic steps are performed at 398. Finally at 400, microprocessor 110 reads BST 137 to determine the mode of operation of the buffer 15 segment allocated to the addressed device 13, i.e., is it a read or write mode.

All of the remaining steps shown in FIG. 15 relate to detection of a delay in command execution. For example, at 401, microprocessor 110 determines whether or not a buffer 15 segment allocated to the addressed device 13 is full. BST 137 in a section represented by ellipsis 226 indicates whether the buffer 15 represented by the entry of BST 137 corresponding to the DADDR 215 is full or empty. If the identified buffer 15 segment is not full, then there is no delay in a write mode. If the identified buffer 15 segment is full in the write mode, then at 402 microprocessor 110 sets channel command retry and reports this delay to channel adapter 80 for relaying to host 12. From steps 401 and 402 the CCR check exit routine having steps 416-418 is entered through point 403, as later described.

If, at logic step 400, BST 137 indicates the addressed device 13 is in the read mode, microprocessor 110 follows logic path 406 to check whether or not the buffer 15 segment allocated to the addressed device 13 is empty. This check is achieved in four steps 407-411. First at 407, microprocessor 110 determines whether or not the addressed logical device is in the forward or backward mode as indicated by direction section D 222 of BST 137 and examines the buffer segment full or empty section (not shown) indicated by ellipsis 226. If the logical device is in the read forward mode and the buffer 15 segment is empty, then a delay is indicated by microprocessor 110 at 408 by setting CCR to unity and reporting a channel command retry to host 12 via a channel adapter 80. In a similar manner at 410, microprocessor 110 examines BST 137 entry associated with the addressed device 13 to determine whether or not the addressed device is in the read backward mode (section D 222) and empty. If the buffer 15 segment is empty, then at 411 a channel command retry is initiated. Returning momentarily to 391, if the addressed device does not have an allocated buffer 15 segment as indicated by BST 137 section A 210, then microprocessor 110 follows path 413 to set channel command retry at 414. Microprocessor 110 has now checked all possible conditions in the decoding of commands and receipt of messages from the other control unit 11 which may relate to a command that would cause a buffer-causing delay indicated by a channel command retry.

The CCR checking routine having steps 416-418 is entered through point 403. At 416, microprocessor 110 checks whether or not a channel command retry has been instituted by any of the previously described operations. If not, then some "housekeeping" steps are performed at 417, which steps are not pertinent to an understanding of the present invention. If a delay is instituted, then CCRK in LDT 133 for the addressed device must be incremented. This action is achieved by activating logic module BM IDF 328 at step 327, which in FIG. 14 is shown as a line from CS DCD 323 to BM IDF 328. The last step at 418 activates logic module CS SCE 330, shown in FIG. 17. Each time microcode logic module CS DCD 323 is activated, CS SCE 330 is also activated.

Figures 16, 18:
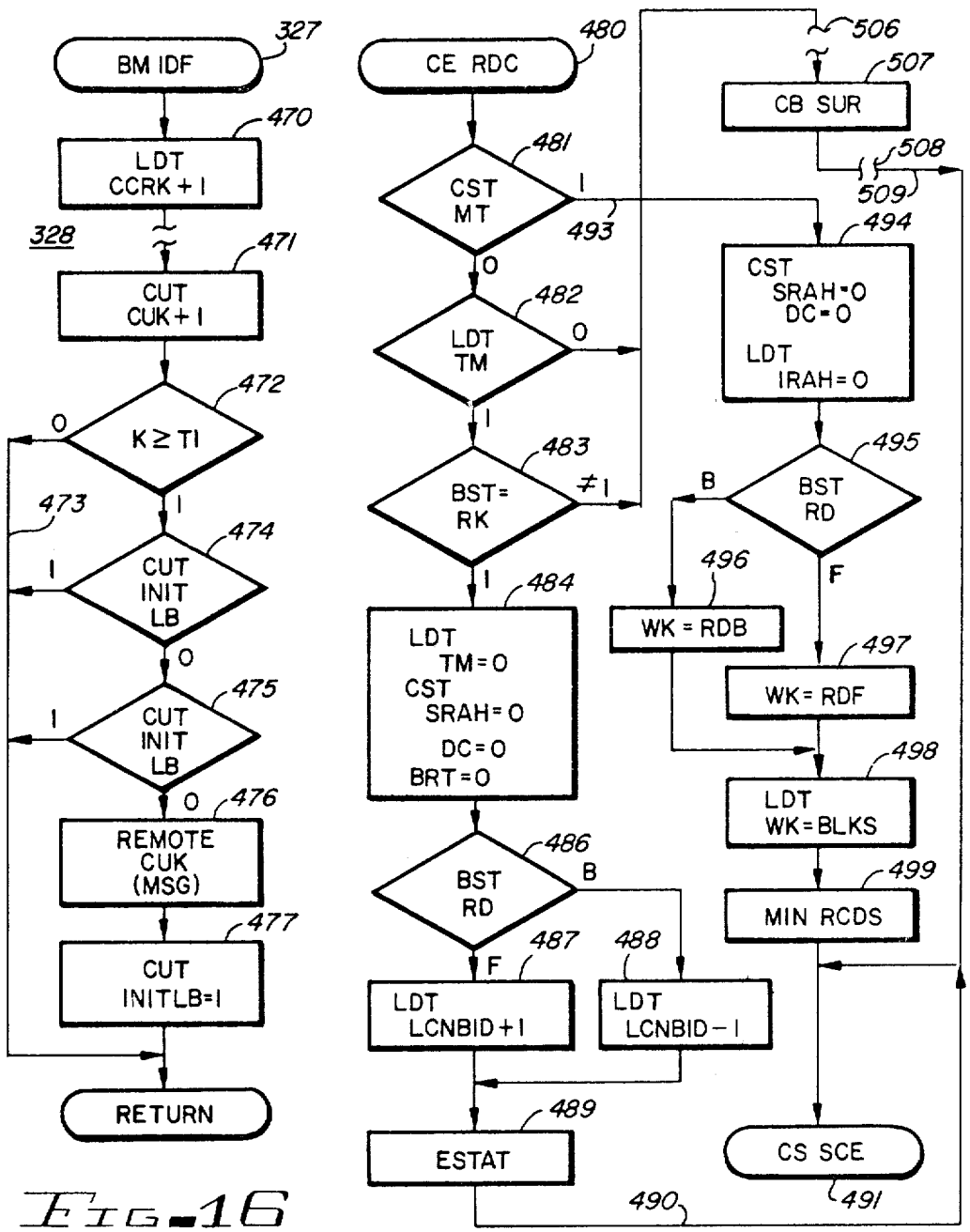
FIG. 16 illustrates logic module BM IDF which enables the microprocessor of the FIG. 3 to control counting the number of host accesses which are delayed due to buffer status.
FIG. 18 illustrates logic module CE RDC which shows the operation for executing a READ input/output command, i.e., a command for transferring signals from a peripheral device or recorder to a host.

Referring next to FIG. 16, BM IDF 328 is activated by microprocessor 110 at 327. Since a delay has already been determined to occur via CS DCD 323, microprocessor 110 at 470 increments CCRK 285 (FIG. 12) for the addressed device 13. At 471, microprocessor 110 updates a total control unit count CUK CCR's for CU-0 contained in CUT 130; CUK in CUT 130 is represented by ellipsis 256; this count is used in connection with load balancing subsystem 10 load between CU-0 and CU-1 based on CCR counts. At 472, microprocessor 110 determines whether or not CUK exceeds a CCR count threshold T1. If the threshold is not exceeded, no load balancing activity need be initiated; accordingly, microprocessor 110 returns to CS DCD 323 via line 473. If the threshold T1 is exceeded at 472, microprocessor 110 at 474 determines whether or not load balancing activity is inhibited. Inhibition of load balancing in a constructed embodiment was for maintenance purposes only. Accordingly, the portion of CUT 130 relating to a load balance inhibition control field is in a register segment (not shown) also represented by ellipsis 256. For ensuring independent paths, the addressed logical device may be pinned (LDT 133, section PIN 288) to a particular control unit such that it is exempt from load balancing activity. On the other hand, if there is no load balancing inhibit, microprocessor 110 at 475 senses a LBINIT section (not shown) of CUT 130. If load balancing has already been initiated, then no further activities for initiating load balancing need occur. Load balancing could have been initiated by the other control unit CU-1. If load balancing is to be initiated, then at 476, CUK of CU-1 is read via cable 109 and stored for later use via a load balancing logic module (not shown). At 477 microprocessor 110 sets the above-mentioned and not shown LBINIT field to unity and returns to logic module CS DCD 323.

Implementation of step 476 in BM IDF 328 requires action by CU-1 to send the fault count via a logic module BM SFC (not shown). At 477 the LB section of CUT 130 is set to indicate a load balance activity in CUBM 150 has started. Action is then taken to balance the control unit loads, the details of which are not pertinent to an understanding of this insertion.

Figure 17:
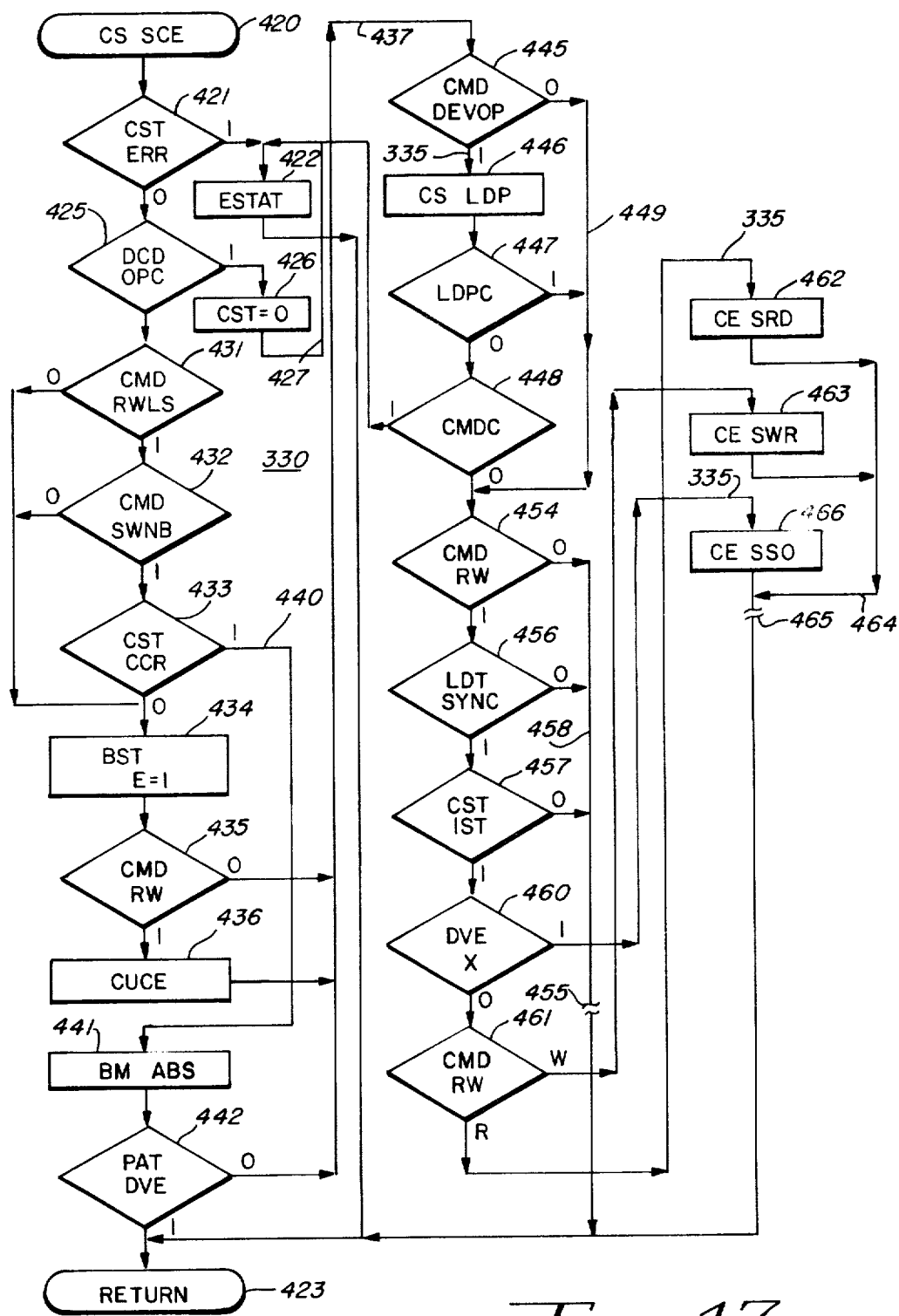
FIG. 17 illustrates logic module CS SCE which enables the microprocessor of the FIG. 3 illustrated control to perform certain functions with respect to decoding commands and completion of command execution.

FIG. 17 illustrates logic module CS SCE 330. This module for each command received a required device function ensures that a buffer 15 segment for the addressed device has been allocated. If the command is a buffer using command, it also initiates buffer and device (logical device) preparation for the command as appropriate. It also calls the proper command execution logic module of CUCE 152 to execute the command as will become apparent. This logic module also enables microprocessor 110 to present ending status to the channel 16 via a channel adapter 80 and adjust the command status table 131 as appropriate, hence this logic module is the initiator and the finisher for each functional command execution. Logic module CS SCE 330 is only entered after microprocessor 110 has executed logic module CS DCD 323 or later described CS LDC 348. The logic module begins at 420 whereupon at 421 microprocessor 110 first checks for an error condition in CST 131 such as indicated by PE section 243. If an error is indicated, then ending status (ESTAT) is reported to the CNL 16 via a channel adapter 80 at 422. Then microprocessor 110 returns to a activating logic module at 423.

Generally an error condition has not occurred, so microprocessor 110 at 425 determines whether or not the operation has been completed (OPC=1) as indicated by logic module CS DCD 323. When the operation has been completed as indicated by logic module CS DCD 323, the register 230 (FIG. 8) containing the information for the current command in CST 131 is erased at 426. Then microprocessor 110 follows path 427 to report ending status at 422 and return to the calling module at 423. When the operation is not complete (OPC=0), microprocessor 110 at 431 and 432 analyzes the command. At 431 microprocessor 110 determines whether or not the received command is a READ (either forward or backward direction), WRITE, LOCATE BLOCK, READ DATA BUFFER, SENSE or a SYNCHRONIZE command. If the command is any one of the above, then at 432, microprocessor 110 determines that the command is not one of the following commands: REWIND, READ DATA BUFFER, a SYNCHRONIZE, a SPACE BLOCK command. The effect of analysis of steps 431 and 432 identifies those commands that will have to use buffer 15. For these commands, microprocessor 110 will verify whether or not a buffer 15 segment has been allocated. But first, at 433 microprocessor 110 checks CST 131 section 238 to determine whether or not a CCR has been sent to a host 12 for this specific command as such as would be required by buffer conditions. If the received command identified in steps 431 and 432 is not CCRed or the command is other than those identified in the logic of 431 and 432, then at 434 microprocessor 110 examines the BST 137 E section 211 and sets the E field to unity to indicate that the buffer 15 segment for the addressed device is engaged, i.e., the command is about to be executed and therefore the buffer 15 segment is busy. Then microprocessor 110 at 435 determines whether the command is either a READ or a WRITE. For a READ or WRITE command, microprocessor 110 at 436 activates a command execution logic module within group CUCE 152 as indicated by line 335 of FIG. 14. The logic module activated is a function of the command identified in section 233 of CST 131. From steps 435 and 436 microprocessor 110 follows line 437 to execute a series of steps, as will be later described.

Returning to 433, if CST 131 had indicated a CCR had been given for the instant command, microprocessor 110 follows line 440 to allocate a buffer 15 segment by activating logic module BM ABS 355 (FIG. 14) at 441. Microprocessor 110 in following logic module BM ABS 355 will attempt to allocate a buffer 15 segment to the addressed logical device for performing the instant command. Following a return from that logic module, microprocessor 110 at 442 determines from PAT 134 whether or not a buffer 15 segment has been scheduled for allocation to the addressed device. This information can also be provided by a so-called "return code" stored in a predetermined work register (not shown) of microprocessor 110 developed by BM ABS 355 which indicates that PAT 134 has received a request for allocation for the addressed device. If all of this activity is successful, microprocessor 110 returns at 423 awaiting the actual allocation and other activities that must occur before the command execution can proceed. On the other hand, if there was an allocation already in hand, then the command execution can proceed. Therefore microprocessor 110 from 442 will proceed along line 437 to execute the above referred to steps, as will now be described.

At 445 microprocessor 110 determines whether or not a device 13 operation will be required to execute the instant command. If this is the case, a logical device must be prepared via line 335 (corresponding to line 335 of FIG. 14) to activate logic module CS LDP 347 at 446 as briefly described with respect to FIG. 14 and as detailed in FIG. 25. Following microprocessor 110 executing CS LDP 347, microprocessor 110 at 447 checks whether or not the logical device preparation has been complete (LDPC).

If preparation was not completed, microprocessor 110 at 448 checks to see whether or not the command execution is complete (CMDC). If CMDC=1, ending status is reported at 422, as previously described. On the other hand, at 447 if preparation of the logical device is complete (LDPC=1) or at 448 the command execution is incomplete (CMDC=0) or at 445 it is not a device operation (DEVOP=0), microprocessor 110 proceeds over line 449 to 454 to see if the command is a READ or a WRITE command. If it is not either of those two commands, then some nonpertinent logic functions are performed at 455 and microprocessor 110 will then return to the activating logic module at 423. If the received command is a READ or WRITE command, microprocessor 110 at 456 checks to see whether or not the tape synchronous mode (read or write) of operation is indicated in LDT 133 section 290. If the mode is not the tape synchronous mode, then nonpertinent logic steps 455 are executed; otherwise microprocessor 110 proceeds to 457 to examine CST 131 for a first pass indication of execution of the received command by examining section 237. If it is not the first pass, then nonpertinent logic steps 455 are performed, otherwise microprocessor 110 goes to logic step 460 to determine if the addressed device has been held for the instant command (DVE X). If the addressed device has been held (DVE X=1) then, remembering that the tape synchronous mode as indicated at 456, a tape synchronous operation can ensue, as will be later described. However, if the addressed device is not being held for the instant command (DVE X=0), then the tape synchronous operation mode must be set up as between the control unit 11 and the addressed device 13. To do this, microprocessor 110 at 461 determines whether the command is a READ or a WRITE. If it is a READ command, then at 462 microprocessor 110 goes to logic module CE SRD 339 for setting up the tape synchronous mode (read) within subsystem 10 for the addressed device. In FIG. 14 this is reached over line 335, which is also indicated in FIG. 17. In the write mode, microprocessor 110 proceeds from 461 via 335 to logic module CE SWR 340 at 463. After executing either one of these logic modules, microprocessor 110 follows path 464 to perform some nonpertinent logic functions at 465 and then goes to return 423.

On the other hand, if the addressed device has been held (DVE X=1), then steps 462 and 463 will have already been completed. The tape synchronous mode then can be initiated for executing the received instant command. Accordingly, microprocessor 110 from 460 then proceeds via 335 to 466 which activates logic module CE SSO 342 which actually initiates transfer of data signals between a device 13 and a control unit 11 set up by either of logic modules CE SRD 339 or CE SWR 340.

At this point in the processing of a received command, microprocessor 110 of control unit 11 has decoded the command, determined the status of the subsystem and either is in the process of preparing the subsystem to actually execute the command or has initiated execution via one of the command execution modules, such as at 436, and as described elsewhere with respect to FIGS. 15 and 17.

FIG. 18 illustrates logic module CE RDC 336 which enables microprocessor to control the execution of the READ FORWARD and READ BACKWARD commands received CNL 16. Microprocessor 110 in responding to logic module CE RDC 336, activates other logic modules as shown in FIG. 14. To initiate data transfers to buffer 15 and transfers to CNL 16, and the received command has not been responded to by a UNIT CHECK or a CCR caused by path unavailability, i.e., buffer 15 was not available or the addressed device 13 was not available, this logic module is activated by microprocessor 110 in response to logic module CS SCE 330 of FIG. 17. Whenever a READ command has a CCR, and CNL 16 returns the READ command a second time, other logic modules described elsewhere execute the second received READ command.

From logic module CE SCE 330 microprocessor begins the logic functions of CE RDC 336 at 480. The first logic function at 481 examines CST 131 section 237 to determine if this is a first pass or not. If it is a first pass, then the buffer 15 segment allocated to the addressed logical device is empty (MT). If the first pass section 237 is not unity, the allocated buffer 15 segment is not empty; then and at 482 microprocessor 110 examines LDT 133 section 289 to determine if the sole record in the buffer 15 segment allocated to the logical device is a tape mark (TM). In this regard, steps 483 through 489 are those functions performed by a control unit 11 under control of microprocessor 110 when a tape mark is the only record in the allocated buffer 15 segment. Before proceeding with this description the status of the buffer 15 segment will be reviewed. It can be assumed that read ahead has occurred from a device 13 to the allocated buffer 15 segment. The last record read would be a tape mark. At this time read ahead is suppressed in the subsystem for the addressed device B by setting SRAH bit 241 of CST 131 associated with the particular data transfer. Subsequent READ commands received from CNL 16 cause the previously read record to be transferred to a host 12. Finally a READ command is received for the tape mark that was previously read by device 13. When this occurs, microprocessor 110 at 482 proceeds to perform the logic functions for subsystem 10 indicated in steps 483 through 489. If it is not a tape mark, or not the last record in the buffer 15 segment, then other steps are performed as later described.

In processing the sole remaining tape mark record in the buffer 15 segment, microprocessor 110 at 483 first verifies that the tape mark is the last record in the allocated buffer 15 segment. This is done by examining BST 137 section 223 to determine the record count (RK). If the record count is greater than 1 then other records have to be transferred to host 12 before the tape mark can be handled. Since it is desired not to transmit the tape mark information to host 12 except for the fact that a tape mark has been encountered, microprocessor 110 upon detecting that the last record in the buffer 15 segment is a tape mark (steps 482, 483 determine this), microprocessor 110 at 484 accesses LDT 133 section 289 for resetting the tape mark to zero. CST 131 is entered to reset SRAH section 241 to zero and all direction change bits (not shown in FIG. 8 but represented by ellipsis 244) are reset to zero. Finally the BRT 141 register corresponding to the record in buffer 15 segment containing the tape mark is cleared to zero and the entry in the corresponding BRT 141 register is erased.

In processing the tape mark record steps 486 to 488 relate to logical count control mentioned earlier with respect to a DEFERRED UNIT CHECK. At 486, microprocessor 110 examines BST 137 section 222 to determine if the buffer 15 segment is in a read forward or read backward mode. If it is in a read forward mode (F), then an LDT 133 section (not shown) containing the logical address (LOG) of the tape mark is incremented by 1 to indicate the next record to be read and still residing on tape 54. This logical number LOG has been identified in FIG. 18 by LCNBID. On the other hand if the direction of tape motion is in the backward direction, B, then at 488 microprocessor 110 decrements the logical number LCNBID. Decrementing LCNBID identifies the record on tape 54 next closest to BOT, then ending status is selected at 489 for reporting via logic module CS SCE 330. Return to CS SCE 330 is via line 490 and exit point 491. Returning to function 481, if the examination of CST 131 indicates that the buffer 15 allocated segment is empty (MT=1), microprocessor 110 proceeds over path 493 to control function 494. There microprocessor 110 alters the contents of CST 131 for the instant command by resetting bit SRAH 241 to zero and resetting the above mentioned direction change bits (see step 484). Also, in LDT 133 bit IRAH 286 is reset to zero for deleting any read ahead inhibit. Then at 495, microprocessor 110, depending upon the direct bit D 222, will indicate in a work register (not shown) within microprocessor 110 that it is a read forward F or read backward B operation as respectively indicated at 497 and 496. At 498, the block size (BLKS) of the record to be transferred from the address device 13 to buffer 15 is transferred from LDT 133 section 292 to a work register (WK) (not shown) in microprocessor 110 for the purpose of determining a minimum of records to be transferred in the next read ahead operation. Block size (BLKS) is determined by microprocessor 110 in previous READ commands by counting the number of byte transfers; for the first received READ command; any arbitrary or capricious block size may be used. Then, the first READ command will transfer a predetermined number of bytes. This predetermined number of bytes bits will then be used as the next block size. As block size change, an algorithm may be implemented for tracking the dynamic changes in block size of the data as it flows between device 13 and host 12.

At 499, microprocessor 110 executes an algorithm for calculating a minimum number of records to be transferred on the next read ahead operation. This is indicated in FIG. 18 by MIN RCDS. While many algorithms may be employed, a good algorithm is to divide the number of free bytes in the allocated buffer 15 segment indicated by BST 137, FK section 224 for the allocated buffer 15 segment, to be divided by the number in LDT 133, BLKS section 292. This in effect divides the number of free bytes of the allocated segment by the number of bytes expected in a block of records. In other words, the minimum number of records are those records that should fill the allocated buffer 15 segment.

It will be remembered that as a read ahead is instituted and the first record is lodged into the allocated buffer 15 segment, a DEVICE END is sent by control unit 11 to CNL 16 indicating that the previously CCRed READ command can now be performed. Host 12 may immediately fetch the first read record from the allocated buffer 15 segment. If this is the case, then as host 12 fetches the record, the device 13 which is now transporting tape 54 during the read ahead operation will continue to transport tape and transfer records beyond the minimum number of records into the allocated buffer 15 segment for satisfying the host 12 desires for additional data. Further algorithms can be employed for limiting the time of transfer such that one process within a host 12 will not overly dominate operation of storage subsystem 10. For example, a time slot of 500 milliseconds may be employed as a maximum time for transferring data from any device 13 to any allocated buffer 15 segment. After this time out, other processes will be allowed access to subsystem 10. Since this time out is known, devices 13 can accelerate during the last portion of the data transfer time such that no tape acceleration time is lost in data transferring for maximizing subsystem 10 performance.

Returning now to logic steps 482, 483, if there is more than one record in the allocated buffer 15 segment or there is no tape mark record in the allocated buffer 15 segment, then microprocessor 110 performs some nonpertinent logic functions at 506 which, by way of example, may relate to diagnostic checking to see if a diagnostic mode has been imposed upon storage subsystem 10. Then microprocessor 110 at 507 activates logic module CB SUR 343, detailed in FIG. 19, for initiating a transfer of data signals from the allocated buffer 15 segment to CNL 16. Then at 508 some non-pertinent functions are performed, such as checking for errors to build in an ending status if a data transfer cannot be effected and also to indicate in CST 131 that the command will be continuing, i.e., there are more functions to be performed, by setting CC bit 240. Then microprocessor 110 follows path 509 to return to logic module CS SCE 330 at 491.

FIG. 19 details logic module CB SUR 343 which control initiation of a buffer 15 to CNL 16 data transfer. Among the functions performed is a determination of whether the device 13 operation has been completed. If the device 13 is still reading data into the buffer 15 segment allocated to the logical device, then certain amounts of data have to be in buffer 15 at all times, which is determined by a function called separation. The buffer to channel data transfer hardware or circuits CX 26 is activated and preset for an automatic data transfer (ADT). In a read backward mode, some control information such as error correction coding, logical and physical numbers of the block and so forth are first transferred to microprocessor 110 for later use rather than being transferred to the host. Then host data transfer can ensue. The buffer 15 segment is made the MRU segment in MLRU list 40 of BST 137. For this logic module to be executed by microprocessor 110, control unit 11 must be already connected to a channel 16 such that data transfer can ensue immediately. The logic module can be entered by microprocessor 110 from several logic modules as explained with respect to FIG. 14. In any event, at 510 logic module 343 is entered. All of the buffer controls (BCC) on the channel side are cleared at 511, this includes CX 26 and a circuit shown in FIG. 29, later described. At 512, CXT 143 is updated for the ensuing data transfer by inserting a device address into DADDR 261 and the BSTP into section 264. These values are in work registers for the addressed device from previous operations. This information has been previously available from LDT 133 which contains BSTP in section 287 and from BST 137 which contains DADDR in section 215. At 513, the CXT 143 X bit 262 is sensed. If X = 1, a data transfer is already occurring. This state, of course, is an error condition. The error is reported to host 12 at 514 by microprocessor 110; then microprocessor 110 follows path 515 to return at 516 to the activating logic module as set forth in FIG. 14. Normally no error will occur, then at 517 microprocessor 110 sets X bit 262 to unity to indicate an active data transfer between buffer 15 and a CNL 16. At 520 certain non-pertinent functions are performed which by way of example may have an effect with respect to PGT 147 of FIG. 4. At 521 SET SEG transfers the segment size from BST 137 to CX 26 and the FIG. 29 circuits. At 522, in microprocessor 110 continues to set up the automatic data transfer by setting the read mode for the channel into CX 26 which includes known buffer access circuits. At 523, certain non-pertinent functions occur while at 524 the contents of BRT 141 register relating to the data block to be transferred by this READ command is set into the buffer control (BC) such as CX 26 and the FIG. 29 circuits. This transfer includes the record start and ending addresses from sections 183 and 184. At 525, microprocessor 110 examines BST 137 to determine the direction of tape motion for ascertaining the orientation of the data record within buffer 15. In some tape subsystems, the last or trailing edge portion of a record on tape i.e., the last portion to be recorded in a forward direction of motion, contains control information, as set forth above. Accordingly, when microprocessor 110 determines the read operation in the backward direction, based upon sensing D bit 222 of BST 137, the non-host data is transferred to microprocessor 110 as indicated by non-pertinent code 526. This transferred data can include error detection and correction bits, and other control data pertinent to subsystem 10 operations. At 527, microprocessor 110 determines whether or not an error was detected during such non-host data transfer; for an error, error status is generated at 528. Then microprocessor 110 returns at 516 to the activating logic module. Usually there is no error and microprocessor 110 follows path 530 to 531 for clearing the external registers 118 connecting microprocessor 110 to CX 26. Then, at 532 microprocessor determines from the appropriate BRT 141 register whether or not the record is complete by sensing bit RC 185. If the entire record is in the buffer 15 segment, then no action need be taken and the activating logic module is returned to. However, if the record is not complete, microprocessor 110 at 533 sets a so-called separation mode wherein the automatic data transfer circuits (not shown) for maintaining separation ensure that a minimum amount of data always resides within the allocated buffer 15 segment. This action prevents an overrun condition.

Returning to step 525, when microprocessor 110 determines the read operation is in the forward direction F, path 536 is followed to check at 537 the record complete bit 185 of BRT 141 in the same manner as was done in step 532. If the record is complete, then at 538, CX 26 is set to accommodate any control data that is appended to the end of the host 12 data record. Then record end (RCDEND) is set at 539 in CX 26 from BRT 141. If BRT 141 indicates record incomplete (RC=0), then at 540 microprocessor determines whether or not during the set up of the READ command that the addressed device 13 has completed reading a record. If the record is now complete, even though the BRT 141 did not indicate a record complete, it is assumed to be complete and step 545, later described, is entered. Otherwise, the record is truly incomplete and will be treated as incomplete during the entire data transfer. Then, at 541 certain non-pertinent functions are performed and data separation is set at 542, as described for step 533.

Figure 29:
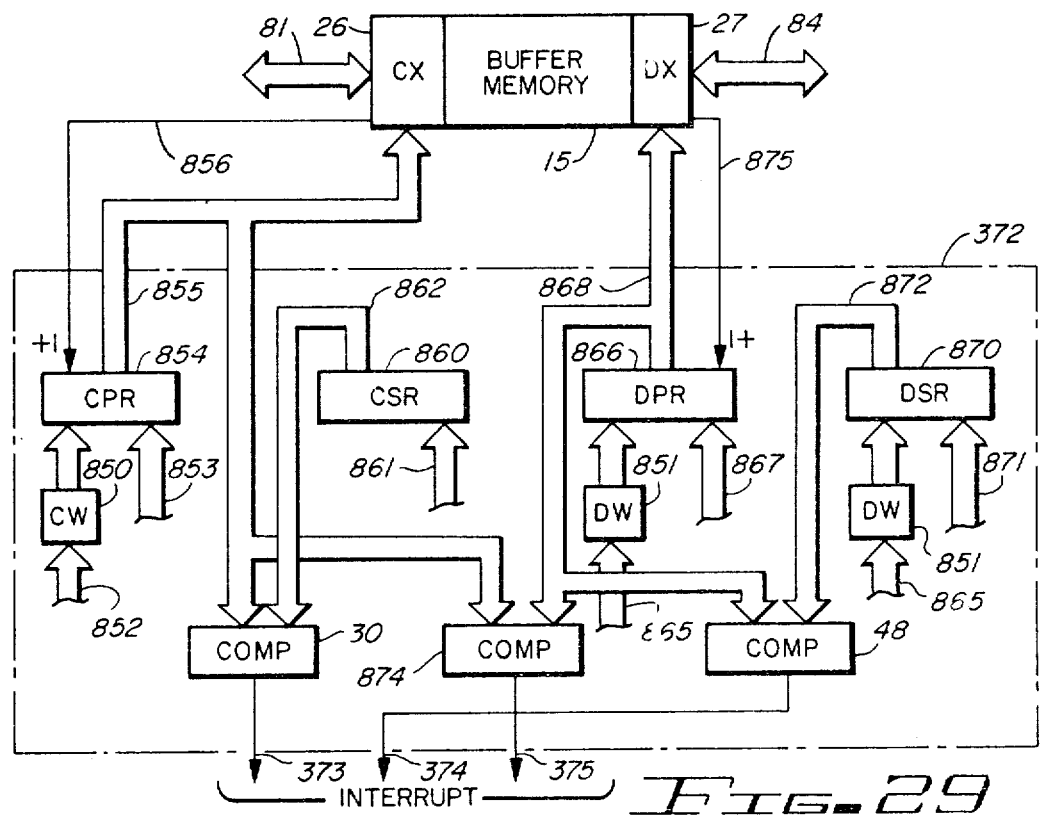
FIG. 29 illustrates buffer overrun circuits which perform the functions of length detection in the illustrated embodiment.

At 545, microprocessor 110 sets all the automatic data transfer circuits for the read mode including CX 26 and the FIG. 29 illustrated circuits. At 546 the buffer 15 segment associated with the data transfer from buffer 15 to CNL 16 is made the most recently used segment in MLRU 40 of BST 137. Following step 546, microprocessor 110 returns to the logic module activating CB SUR 343.

Figure 21:
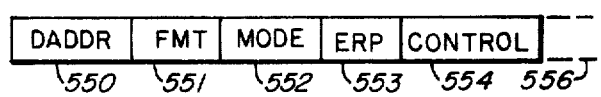
FIG. 21 illustrates the arrangement of a MODESET command.

The above description has shown a start of a READ command execution. The following description describes the onset of a write operation. To begin a write operation, storage subsystem 10 must first receive a MODESET command. Such a command, shown in FIG. 21, and logic module CE MDS 324 (FIG. 20) which executes the MODESET command within microprocessor 110 are first detailed. Some of the execution of a MODESET command can be in channel adapter 80. Such operation is beyond the scope of the present description. Logic module CE MDS 324 is always activated from logic module CS SCE 330 as shown by line 335 of FIG. 14 and as indicated in FIG. 20 by numeral 335. The MODESET command includes a DADDR field 550 for indicating a device 13 being addressed and which will have a MODESET in accordance with the other fields in the command. FMT field 551 is a format field which in a write mode select the density to be written on tape 54 and other format controls as may be desired. The write mode is indicated in field 552, this mode is decoded by microprocessor 110 in executing logic module CE MDS 324. Other controls include ERP (error recovery procedure) 553 which details to storage subsystem 10 the reportability of recoverable errors and the extent to which subsystem 10 can perform its own internal error recovery procedures. Other controls are indicated at 554 which can have an effect on tables PGM 146 and PGT 147 with regard to alternate pathing and other logical control functions beyond the scope of the present description. Ellipsis 556 indicates that other control features may be included in such a command.

In executing logic module CE MDS 324, microprocessor 110 first performs non-pertinent functions at 560. Then at 561 mode field 552 is examined. In the present embodiment, mode field 552 will select either the tape write mode (TW) or the buffer write mode (BW). Since the buffer write mode is preferred, it can be assumed that microprocessor will most likely go to 562 to access CST 131 bit WM 239 to set it to the buffer write mode. This setting can be a value of binary 0. Then at 563 CHANNEL END (CE=1) and DEVICE END (DE=1) are set up to be sent to host 12. Logic module CS SCE 330 is returned to at 564.

In the event a tape write mode is indicated in mode field 552, microprocessor 110 from step 561 performs step 567 for accessing CST 131 WM bit 239. If the WM bit already indicates the tape write mode (has a value of binary 1) then step 563 is executed. On the other hand, if there is a switch from the buffer write mode to the tape write mode at 567, there may be records in buffer 15 to be written onto a device 13. That is, the MODESET command may have been received in the middle of a chain of such commands or a series of chains of commands. The previous WRITE commands could have been all executed in the buffer write mode. Then for some reason the host 12 wants to switch to the tape write mode. Accordingly, microprocessor 110 must check to see whether or not there is residual data in buffer 15 before signaling host 12 that storage subsystem 10 for the addressed device is in the tape write; then recording the data on tape 54. These actions are achieved by activating logic module CS CBW 349 at 569 and as detailed in FIG. 27. Microprocessor 110 after executing logic module CS CBW 349 will have one of three possible return (RTN) codes which are examined at 571. The return code of zero indicates there is no data resident in the allocated buffer 15 segment. Then microprocessor 110 at 572 examines CST 131 CCR bit 238. If there is no channel command retry outstanding, then at 574 microprocessor 110 accesses CST 131 to set WM bit 239 to the tape write mode. However, if there is an outstanding CCR, then the tape write cannot be entered yet. However, since there is no data in the buffer there is no apparent reason for maintaining a CCR status to host 12; accordingly, at 573 a DEVICE END (DE=1) is set up to be sent to CNL 16 indicating that the conditions for the CCR have been alleviated. Then logic module CS SCE 330 is returned to at 564.

A return code of 1 indicates there is data residing in the allocated buffer segment 15 to be written onto device 13. Such recording was initiated by microprocessor 110 through executing CS CBW at 569 however, the actual recording has not yet occurred. Therefore, microprocessor 110 at 576 examines CST 131 CCR bit 238 to see whether or not a CCR is outstanding to CNL 16. If it is not outstanding, then at 577 a CCR is sent because the recording operation has not yet completed. The CCR bit 238 of CST 131 is also set to unity. On the other hand if there already is a CCR outstanding, microprocessor 110 at 578 indicates to itself that the MODESET command has yet to be completed; therefore, CC bit 240 of CST 131 is set to the active condition at 578. Then CS SCE 330 is returned to at 564. A return code of two indicates an error condition. The error status is set up for reporting at 580; the actual reporting occurs at the next received command by UNIT CHECK. The MODESET can last for many chains of command.

Figure 22:
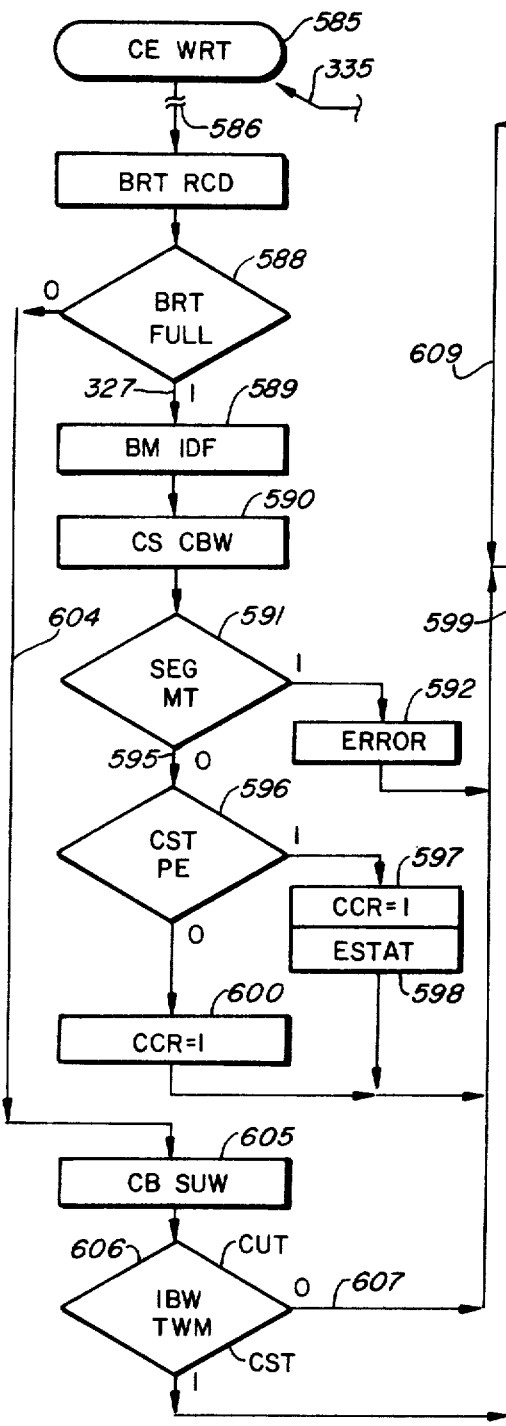
FIG. 22 illustrates logic module CE WRT relating to steps in executing a WRITE command i.e., a command for transferring signals from a host to a recorder.

Once a MODESET command has been successfully executed, then storage subsystem 10 is ready to receive WRITE commands. The decoding of each WRITE command includes requesting allocation of a buffer segment in logic module CS SCE 330 at 441. Accordingly, when logic module CE WRT 337 of FIG. 22 is activated via CS SCE 330, microprocessor 110 can then begin execution of the received WRITE command. Logic module CE WRT 337 includes creation of an entry in BRT 141 by reserving a BRT register for the block of data expected to be received from host 12 and then starts the data transfer from CNL 16 to buffer 15 segment that was allocated to the addressed device 13. When a tape write mode has been set or "inhibit buffer write" (IBW) is active, then data that is currently in the allocated buffer 15 segment is first transferred to a device 13 before data can be received from host 12 under the currently received WRITE command. Logic module CE WRT 337 is entered at 585 which corresponds to line 335 of FIG. 14. At 586 certain maintenance procedures are checked in a similar manner to that described for logic module CE RDC 336. At 587 microprocessor 110 creates a record entry in BRT 141 by reserving a register 180, for example, for the record that is incoming. This includes writing a link address in link section 182 and other signals as will become apparent. The actual reserving of a BRT 141 register is executed in CUBM 150 by a logic module BM CRE (not shown) which creates a record entry by reserving a register. Microprocessor 110, in executing BM CRE (not shown), may find that all of the registers 180 have already been assigned. In other words, BRT 141 is full. At 588 microprocessor 110 checks the return code from BM CRE (not shown) to determine whether or not BRT 141 is full. If BRT 141 is full, then a channel command retry must be instituted, the data already resident in the allocated buffer 15 segment or other segments must be written to tape 54 such that BRT 141 registers associated with those records can be freed and the CCR count must be incremented. Accordingly, microprocessor 110 at 589 activates logic module BM IDF 328 as described with respect to FIG. 19 and as represented in FIG. 14 by line 327. Following this activity, microprocessor 110 at 590 activates logic module CS CBW 349, as later described with respect to FIG. 27. This logic module activates the storage subsystem 10 to transfer the contents of the allocated buffer 15 segment to a device 13 for freeing BRT 141 registers for the data records next to be received. Following this action, microprocessor 110 analyzes the results of attempting to schedule the necessary recording operations on device 13. At 591 microprocessor 110 checks to see whether or not the allocated segment was empty (MT). If it was empty (MT=1), an error condition has occurred and accordingly, at 592 microprocessor 110 gathers error data for reporting and returns to the activating logic module via 593. Generally, the segment will not have been emptied; then at 595, which represents that microprocessor 110 has scheduled a write operation to the addressed device 13 via logic module CS CBW 349, it will check 596 whether or not a permanent error has occurred. Microprocessor 110 accesses CST 131 PE bit 243. If that bit is active, then a permanent error has occurred. Accordingly, microprocessor 110 at 597 sends a CCR to host 12 along with ending status generated at 598. Microprocessor 110 then follows path 599 to return 593. Without a permanent error (PE=0), which is the usual case, microprocessor 110 sends the CCR to host 12 at 600. This CCR is necessary to allow the subsystem 10 time to execute the write operations scheduled via logic module CS CBW 349. After step 600, the activating logic module is returned to via return 593.

Returning now to step 588, if BRT 141 has registers 180, 181 available for identifying the record to be received; then microprocessor 110 following path 604 activates logic module CB SUW 344 at 605. Logic module CB SUW 344 activates a channel transfer from host 12 to buffer 15 in the same way that logic module CB SUR 343 started a data transfer from buffer 15 to CNL 16. Logic module CB SUW 344 is described later with respect to FIG. 23. Continuing on, at 606 microprocessor 110 examines CUT 130 for an inhibit buffer write (IBW) represented by ellipsis 256 and CST 131 section WM 239 to see if the tape write mode is indicated. If neither of the conditions are met, then microprocessor 110 follows path 607 to return to the activating logic module. If, on the other hand, either one of the conditions are met at step 606, microprocessor 110 at 608 examines CST 131 first pass bit 237. If it is the first pass, then no more activity can be presently achieved. Accordingly, microprocessor 110 follows paths 609 and 599 to return 593. If it is not the first pass, then some preparatory work has already been done and accordingly, reconnection to the host is inhibited at 610 by setting LDT 133 IREC bit 293 to the active condition. Then following path 611, microprocessor 110 performs the function at 612 of transferring the contents of BST 137 RK section 223 to work registers (not shown) within the microprocessor. The RK value indicates to microprocessor 110 the number of records in the allocated buffer 15 segment such that this number of records can be transferred to a device 13. Such a transfer is scheduled at 613 by activating logic module DM SCH 353 (FIG. 24) to schedule the number of records equal to the contents of RK 223 for recording. At 614, non-pertinent functions are performed and finally at 593 the activating logic module is returned to.

Figure 23:
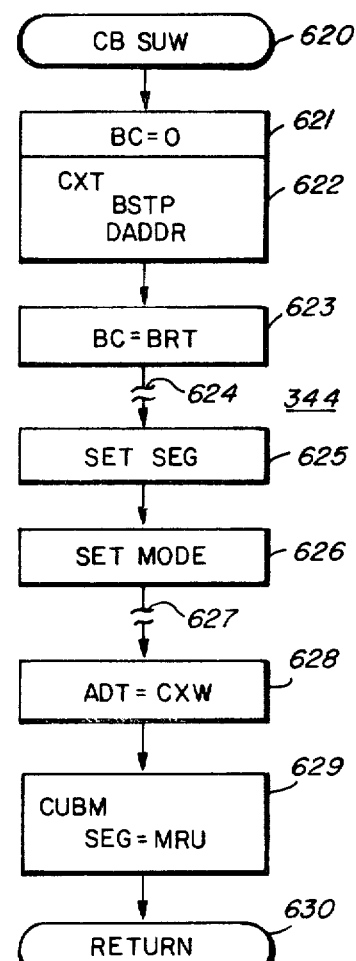
FIG. 23 illustrates logic module CB SUW relating to operations for starting a data transfer from an input/output channel to a buffer in a control unit.

Logic module CB SUW 344 is detailed in FIG. 23 and activated at 605 in logic module CE WRT 337 of FIG. 22 to start the actual data transfer from CNL 16 to buffer 15 segment allocated to the addressed device. By logic module CB SUW 344, microprocessor 110 preconditions all of the automatic data transfer circuits including CX 26 and the FIG. 29 illustrated circuit for the data transfer. The functions are very similar to those described for logic module CB SUR 343. It should be borne in mind that CB SUW 344 can be activated by either CE WRT 337 or later described logic module CE SSO 342 for a write in a tape synchronous mode. Logic module CB SUW 344 is entered at 620 with the first function being resetting the buffer controls at 621, similar to the described step 511 of logic module CB SUR 343. A second identical function is performed at 622 for CXT 143 which receives BSTP and DADDR for the addressed device in a manner identical to set 512. At 623 the contents of the BRT 141 register to be associated with the incoming record is set to the buffer controls as described for step 524. At 624 some non-pertinent functions are performed. Then at 625 SET SEG results in the same functions as described for step 521. In a similar vein, step 626 performs the same function as step 522. Then at 627, non-pertinent functions are performed. At 628 all of the automatic data transfer circuits on the "channel side" of buffer 15 are set for write mode in CX 26. At 629 the addressed buffer 15 segment is made most recently used, as described for step 546. At 630 the activating logic module is returned to.

Figure 24:
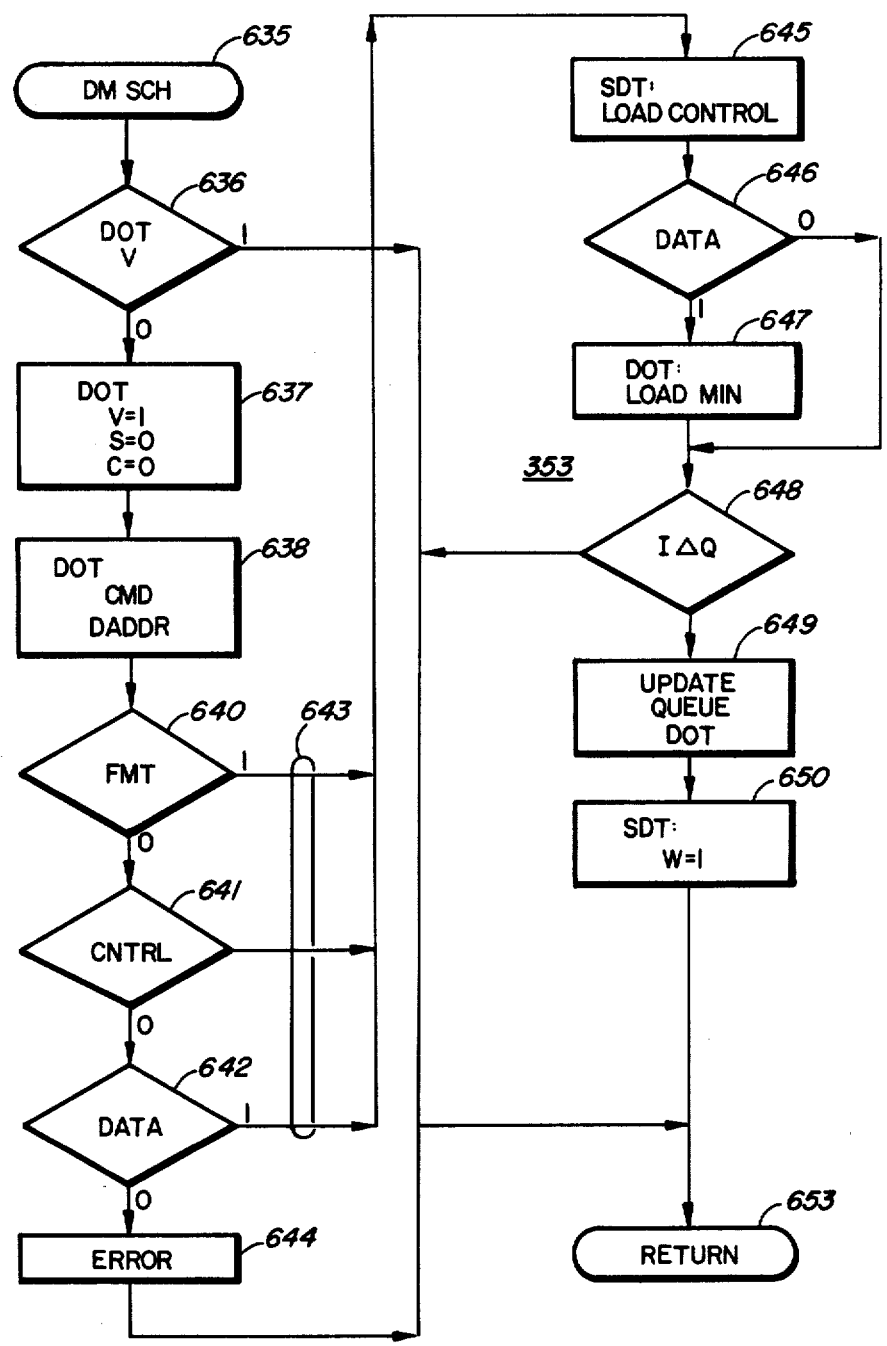
FIG. 24 illustrates logic module DM SCH and which shows a logic of operation for scheduling a device operation such as for interaction between a buffer of a control unit and a recording device.

FIG. 24 details logic module DM SCH 353. This logic module enables microprocessor 110 to schedule a device operation by inserting suitable signals into XQ 23 of DOT 136. It is remembered that the priority classes for device operation are set forth in the three queues--CCQ 21, ICQ 22, and XQ 23. Priority in the present embodiment are for the device information operation of ICU 22 followed by the device control operation in CCQ 21 and finally data transfer operations listed in XQ 23. The three queues are established via the chain section 269 of the registers in 270 in DOT 136. All of these functions are performed by microprocessor 110 when it enters DM SCH 353 at 635. The first step is to examine DOT 136 V bit 274 at 636 to determine whether or not a device operation has already been scheduled for the addressed device 13. If a device operation has already been scheduled, then a return is made at 653. If no operation has been scheduled (V=0), then at 637 DOT 136 registers associated with the addressed device 13 as indicated in section 272 is altered by setting V bit 274 to 1, S bit 275 to 0, and C bit 276 to 0. S and C bits respectively represent a device operation having been started and completed.

At 638, the DOT 136 register 270 is updated with the new command in section 273 and new DADDR, if necessary. At this point in time, which queue 21-23 is to receive the entry has not been determined. Accordingly, steps 640, 641, 642 are executed respectively to select queue ICQ 22, CCQ 21, or XQ 23. ICQ 22 will handle format type of operations for device 13 as may be required for generating an interblock gap (IBG). If none of the functions are indicated, then an error has occurred which is identified at 644 and reported to host 12 later after returning to the activating logic module at 653. On the other hand, one of the three queues 21-23 can be updated as indicated at 643. Then at 645, control information is loaded into SDT 132 (FIG. 13). All of this information will be in sections of SDT 132 represent by ellipsis 311. For example, for format control, there will be no pointers (addresses to control store) relating to pattern sequences establishing an interblock gap and the like in ICQ 22. For a control sequence a similar pointer is loaded into its own pointer field (not shown) in SDT 132 for the first entry of CCQ 21. For a data transfer operation as detected at 642, a pointer to XQ 23's first entry is loaded into SDT for pointing to a minimum number of records to be transferred as was calculated via a logic module leading into DM SCH 353. Then, at 646 microprocessor 110 determines whether or not the device operation is a data operation as detected at 642. For a data transfer with a device 13, DOT 132 has its section RK 308 filled with MIN for indicating the number of records to process in the current device 13 selection. The situation is such that when the number of processed records set forth in PK 304 of SDT 132 exceeds the number in RK 308, the operation proceeds only when W bit 309 is turned off.

Next, microprocessor 110 at 648 determines whether or not incrementing any of the respective queues 21–23 is inhibited. If the queue incrementing is inhibited, then a return is made. If the queue 21–23 can be incremented, then the queue in DOT 136 is updated at 649. Then at 650, the W bit 309 of SDT 132 is set to unity. At this point in time, a device 13 has been scheduled by inserting an appropriate entry into one of the three queues 21–23. Microprocessor 110 will scan those queues and then activate CUDM 158 and other groups of logic modules for actually activating device 13 to transfer data or perform other functions as identified in respective queues.

Figure 25:
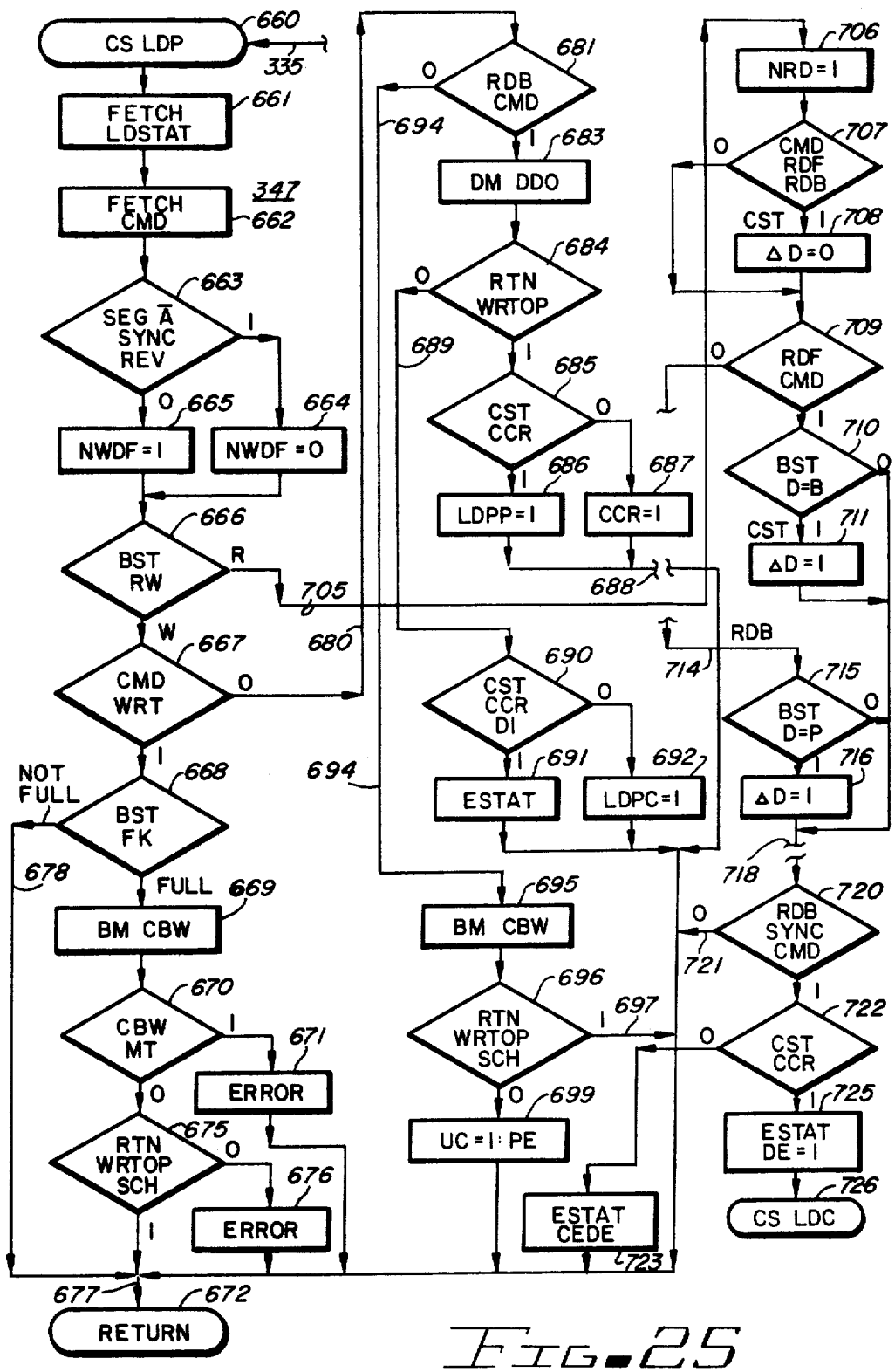
FIG. 25 illustrates logic module CS LDP relating to the preparation of the logical device for a data processing operation such as a read or write operation.

Once a CCR has been sent by storage subsystem 10 to a host 12, subsystem 10 signifies to host 12 by a DEVICE END signal that preparatory steps necessary for executing the CCR'd command have been met. Then the host 12 will reissue the input/output command to the storage subsystem. Accordingly, when a command has been received by the storage subsystem 10 and is being analyzed by CS DCD 323 and CS SCE 330 in preparation for execution of a READ, READ BACKWARD, or WRITE command and was previously CCR'd due to improper buffer 15 conditions (empty or full), then microprocessor 110 executes logic module CS LDP 347 and CS LDC 348 to prepare the logical device for the operation. FIG. 25 details logic module CS LDP 347 which fetches present buffer condition status from status store 100 and can initiate a write to device 13 operation to make some buffer 15 space in an allocated segment available for the newly received WRITE command. For a READ BUFFER command to ensure that all writing operations to a device have been completed before the command is executed, all data to be written on a device 13 is first written to tape 54. When a newly received command is not a WRITE or READ BUFFER command, microprocessor 110 performs other operations, as will become apparent from the description of FIG. 25. Logic module CS LDP 347 is activated as indicated in FIG. 14 via line 335. In FIG. 25, activation occurs at 660, then, microprocessor 110 at 661 fetches the logical device (LD) status from status store 100. This information includes a so-called device status byte which includes indications of whether or not the addressed device 13 is repositioning, rewinding at end of tape, at beginning of tape, unit check conditions, device end conditions, file protect and other operational details. All of these signals are stored in work registers (not shown) of microprocessor 110 for execution of this logic module. Further, at 662 microprocessor 110 accesses CST 131 to transfer the received command code in section 233 to a work register (not shown) of microprocessor 110. Now microprocessor 110 has all of the necessary data plus the data in the tables of control store 111 to execute this logic module.

At 663 microprocessor 110 examines whether or not a buffer 15 segment is allocated to the addressed logical device and whether the command is a SYNCHRONIZE, READ DATA BUFFER, REWIND, or a REWIND UNLOAD command. If the above multitude of conditions are met, then a so-called no write data flag (NWDF) is set at 664. If the conditions are not met then the NWDF flag is reset at 665. This flag is in a work register (not shown) of microprocessor 110. Then at 666, if a buffer 15 segment is allocated to the addressed logical device represented by the addressed device 13, then that allocated buffer 15 segment can be in the write mode resulting in the fact there may be write data residual in that allocated buffer 15 segment. Then at 667 if the command code fetched at 662 is a WRITE command, microprocessor 110 at 668 determines whether or not the buffer is full. This determination is achieved by accessing BST 137 and examining section FK 224 to determine the count of free bytes in the allocated buffer 15 segment. If the free bytes are less than the block size of LDT 133 section 292, then the buffer is full. Following that determination, microprocessor 110 at 669 activates logic module CS CBW 349 (FIG. 27) for recording the data resident in the allocated buffer 15 segment onto the addressed device 13 such that the WRITE command can be executed. Logic module CS CBW 349 then schedules a write operation to the addressed device 13. Returning from logic module CS CBW 349, microprocessor 110 at 670 looks at the return code to see if the execution of CS CBW 349 resulted in an indication that the allocated buffer 15 segment was empty (MT=1). If the return code indicated empty, then an error condition has occurred. The error data is assembled at 671 and the microprocessor 110 returns to the activating logic module at 672. Generally the write operation will have been scheduled by microprocessor 110 through logic module CS CBW 349. Then from 670, microprocessor 110 proceeds to 675 to see if a write operation actually had been scheduled. If not, an error has occurred and that error data is assembled at 676 with return via 672. Without an error, microprocessor returns directly to the activating logic module. On the other hand at 668 if BST 137 indicated that the allocated buffer 15 segment was not full, then microprocessor 110 follows path 678 directly to return 672.

Returning to 667, when the command fetched at 662 is not a WRITE command, microprocessor 110 follows path 680 to determine at 681 whether or not the command is a READ DATA BUFFER command (RDB). If it is a READ DATA BUFFER command, this means that host 12 wants to retrieve the data originally intended to be recorded on a device 13 and a write operation should not continue. Accordingly, at 683 microprocessor 110 activates logic module DM DDO (not shown) which enables microprocessor 110 to delete scheduled device operations from any of the three queues 21–23 in DOT 136. If the addressed device is currently in a data transfer mode, the transfer is stopped. Logic module DM DDO enables microprocessor 110 to provide four return codes. The first code indicates that no device operation was scheduled in DOT 136 or was actually in progress for the addressed device 13. A second return code indicates that the operation was deleted from the queues in DOT 136. A third code indicates that a data transfer operation was occurring and it was terminated. The last code indicates that the addressed device is selected. Following execution of logic module DM DDO, microprocessor 110 at 684 checks a return code for the third return code which indicates that a write operation (WRTOP=1) was terminated. If this is the case, then at 685 microprocessor 110 examines CST 131 CCR bit 238 to see if a CCR had been sent to host 12. If a CCR actually had been sent, then microprocessor 110 at 686 sets a microprocessor flag in a work register (not shown) indicating that logical device preparation is proceeding (LDPP) to unity. Otherwise a CCR is sent at 687 for the existing write operation to the addressed device 13. Following these steps, microprocessor 110 at 688 performs some nonpertinent functions and then returns to the activating module via point 672.

Returning to step 684, if the return code from DM DDO of step 683 is not the third return code, then microprocessor 110 follows path 689 to step 690. At 690, CST 131 is examined at CCR bit 238 together with an indication, in a section represented by ellipsis 244, that the CCR was given because the command had been retried due to data being processed on the device interconnection. Such a set of affairs indicates that the device operation had been completed before logic module CS LDT 347 was currently being executed. When these conditions are met, microprocessor at 691 sends ending status of DEVICE END to host 12 indicating that the reason for the CCR has been satisfied. Following 691, microprocessor 110 returns to the activating logic module via 672. If the CCR bit was not active at 690, then at 692 microprocessor sets an internal flag in a work register (not shown) that logical device preparation has been completed (LDPC=1) then microprocessor 110 returns to the activating module. Now returning to step 681, if the command is not a READ DATA BUFFER command, then microprocessor 110 follows path 694 to ensure that the data that may be in the allocated buffer 15 segment is written into the addressed device 13. This action is achieved at 695 by activating logic module CS CBW 349 as explained earlier with respect to step 669. Returning from logic module CS CBW 349, microprocessor 110 at 696 checks the return code (RTN) to determine whether or not a write operation had been scheduled. If a write operation had been scheduled to the addressed device 13, microprocessor 110 follows path 697 to return 672. If a write operation had not been scheduled at 696, then at 699 microprocessor 110 indicates an error by setting up a UNIT CHECK (UC=1) indicating a permanent error (PE) and then return to the activating logic module via 672.

All of the above occurs when the allocated buffer 15 segment is in the write mode. When the allocated buffer 15 segment is indicated as being in the read mode at step 666, microprocessor 110 follows path 705 to set a nonread command flag at 706. This means the received command may or may not be a READ command. Then at 707 the command fetched at 662 is examined to determine if the received command is a READ FORWARD or READ BACKWARD command. If the received command is a READ type of command, then at 708 the direction change flag of CST 131 in the one of the sections represented by ellipsis 244 is reset. If the received command is not a READ command, then step 708 is omitted. At 709, microprocessor 110 determines if the received command is for read forward (RDF) which is a read in the forward direction of tape motion. Then at 710 microprocessor 110 examines BST 137 D bit 222 to see if the direction indicated is in a forward or backward direction. If the indicated direction is in the backward direction, then at 711 the change direction bit (not shown) of CST 131 is set to unity. On the other hand if a READ forward command was not sensed at 709, then the received command must be a READ backward command; microprocessor 110 follows path 714 to examine the BST 137 direction field at 715. If D bit 222 indicates a forward direction of tape motion, then at 716 the change of direction bit of BST 137 is set to unity, otherwise step 716 is omitted.

Following the direction change determinations, microprocessor 110 at 718 performs some nonpertinent functions. Then, at 720 microprocessor 110 determines from the received command at 662 whether the received command is a READ DATA BUFFER or a SYNCHRONIZE command. If the command is neither, then microprocessor follows 721 to return at 672. If it is either of the latter two commands, microprocessor 110 at 722 examines CST 131 CCR bit 238. If the bit is off, then the command has been completed and ending status of CHANNEL END and DEVICE END (CEDE) is established at 723, then the activating logic module is returned to at 672. Otherwise, at 725 the conditions for the CCR have been satisfied by storage subsystem 10 and ending status is DEVICE END (DE=1). From 725 microprocessor 110 proceeds to logic module CS LDC 348 via exit point 726.

Figure 26:
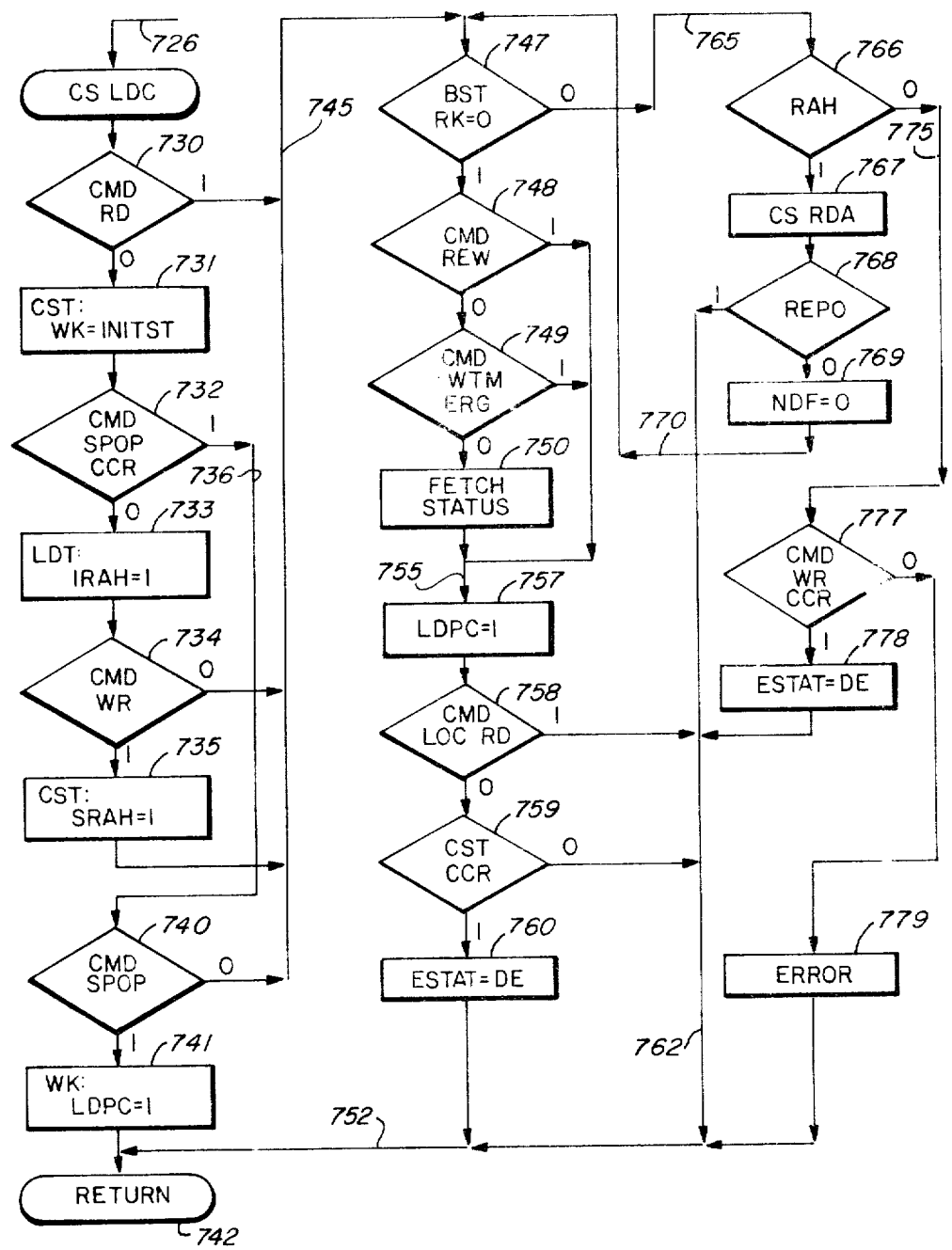
FIG. 26 illustrates logic module CS LDC which relates to logic operations for preparing a logical device as a continuation of logic module CS LDP.

FIG. 26 illustrates logic module CS LDC 348. If the received command fetched at 662 (FIG. 25) was not a READ command, then from 730 microprocessor at 731 accesses CST 131 to place the status store 100 reported initial status into work registers (not shown) of microprocessor 110. Initial status is also that status initially supplied to CNL 16 for each received command by a channel adapter 80. At 732, the received command fetched at 662 is analyzed for a space operation (SPOP); if the received command was not a space operation or was CCR'd by a channel adapter 80, then the inhibit read ahead bit IRAH 286 of LDT 133 is set to the active condition at 733. At 734, if the command fetched at 662 is a WRITE command (WR=1), then at 735 SRAH bit 241 of CST 131 is set to the active condition. This suppresses all read ahead. Returning to step 732, if the operation was a space operation or was not CCR'd by a channel adapter 80, then microprocessor 110 follows path 736 to step 740 to examine the received command to determine if it is a space operation type command. For a space operation type command, at 741 LDPC is set to the active condition. LDPC is previously described with respect to step 692 of FIG. 25. Then at 742 microprocessor 110 returns to the logic module that activated CS LDP 347.

If the received command was not a space operation type command, then microprocesor follows path 745 which also can be followed from step 735, step 734 when the command is not a WRITE command or from step 730 when the command is a READ command. From path 745, microprocessor 110 executes step 747 by fetching the contents of RK section 223 of BST 137 for the addressed device 13 and testing it for zero. When RK is zero there are no records in the buffer 15 allocated segment. Accordingly, at 748 microprocessor 110 examines the command fetched at 662 to determine if it is a REWIND command. If the command is not REWIND or a REWIND UNLOAD; then at 749, if the command is not a WRITE TAPE MARK (WTM) or an ERASE GAP command with the allocated buffer 15 segment in the read mode, then at 750 the present status of the allocated buffer 15 segment is fetched from status store 100. In this regard, status store 100 maintains the operational state of both control units 11. The fetched status includes whether or not the buffer 15 segment has been deallocated with respect to the addressed device. Status will also include direction of motion of tape 54. The status store 100 is accessed by microprocessor 110 executing logic module CS SPS (not shown). From steps 748, 749 or 750 path 755 is followed to set a work register (not shown) flag LDPC to unity at 757. Then at 758 if the command is not a LOCATE BLOCK (LOC) or a READ or a READ BACKWARD command, then at 759 CST 137 CCR bit 238 is examined. If a CCR is indicated, microprocessor 110 at 760 generates ending status of DEVICE END (DE=1). From steps 758, 759 or 760, microprocessor 110 follows path 762 to path 752 and return 742.

Returning to step 747, if the record count RK 223 of the BST 137 register 209 representing the allocated buffer 15 segment is not zero, i.e., there are records in the allocated buffer 15 segment; then microprocessor 110 follows path 765 to perform the following described steps. At 766, if the data in the allocated buffer 15 segment is read data, then at 767 the logic module CS RDA (not shown) is activated. This logic module is activated whenever read ahead data in the buffer is to be deleted. Deletion is achieved by erasing the BRT 141 entry from the BRT registers allocated to the records by erasing these BRT 141 registers. The addressability to the data in the buffer 15 allocated segment is destroyed thereby effectively erasing the data from the buffer. Then, microprocessor 110 determines at 768 whether or not the addressed device 13 is repositioning based upon the execution of module CS RDA of step 767. If no repositioning is occurring, no data was in the allocated buffer 15 segment. Accordingly, a no data flag (NDF) is reset to zero at 769; NDF is in a work register (not shown) of microprocessor 110. Following 769, microprocessor 110 follows path 770 to re-execute step 747 until the logical device preparation can be completed. On the other hand at 768 if repositioning is occurring, a return is made immediately to the original activating logic module. Returning momentarily to step 769, if there was no data in the buffer 15 allocated segment, there is an apparent inconsistency between steps 747 and 769. This inconsistency is then checked out by returning to step 747. Path 775 leads from step 766 to branch step 777 for examining the received command and CCR status. When the command is a write and CCR is active ending status is made device end at 778 with return to the calling module at 742. Else an error is indicated at 779.

FIG. 27 illustrates logic module CS CBW 349 in detail. CS CBW 349 is entered from several other logic modules, all as represented by line 352. Entry at 780 results in step 781 first being executed by microprocessor 110. If a WRITE command is not in progress for the addressed device, reconnection to the channel should be inhibited. Accordingly at 782, microprocessor 110 accesses LDT 133 IREC bit 293 and sets it to 1. If there is no writing to the allocated buffer segment, then step 782 is omitted. At 784 an AND/OR function is performed by microprocessor 110. The AND function consists of steps 785, 786, and 787 all meeting conditions to result in microprocessor 110 following path 788 indicating write data is in buffer 15 segment. The OR path from steps 785–787 is over 789 which means that any one of the conditions of the steps is not met. At 785, BST 135 A bit 210 is examined. If A is equal to a 1, a portion of the AND condition is satisfied. Otherwise the OR condition is satisfied. At 786 BST 137 RW bit 221 being equal to a write satisfies another portion of the AND condition. A read status for RW bit 221 satisfies the OR function. At 787 BST 137 RK section 223 not being equal to 0 (there are data records in the buffer) completes the satisfaction of the AND function while no data in the buffer satisfies the OR condition.

The AND condition of 785–787 leads to step 792 wherein microprocessor 110 examines CST 131 PE bit 243 to determine if a permanent error has occurred in the addressed device 13. Since there is write data in the buffer segment, a permanent error would frustrate the recording of that data onto the addressed device 13. Accordingly, at 793 a no write operation (WROP) is set in a work register (not shown). Then microprocessor 110 returns to a calling module via path 794 and return point 795. Without a permanent error at 792, microprocessor 110 follows path 797 to schedule a device operation for writing the data onto the addressed device 13 by activating logic module DM SCH 353 (FIG. 24). Returning from logic module DM SCH 353, microprocessor 110 at 799 examines CST 131 to see if a WRITE command (section 233) is pending as indicated by bit 236. A write not pending means that a write operation to the addressed device 13 was scheduled. Therefore, the return parameter is set to 3. If at 800 a write operation is already pending with the addressed device 13, then the data records to be written to device 13 must wait until the present write operation to the addressed device is completed; step 800 is omitted. Then at 801 an additional return code is set up to indicate that a write operation will ensue for the addressed device 13. From 801 microprocessor 110 returns via 795.

From the OR function 784, microprocessor 110 at 803 examines LDT 133 inhibit reconnect bit 293. When reconnection is inhibited, microprocessor 110 at 805 resets bit 293 thereby permitting reconnection to the channel. At 806 a return code indicates that all writing to addressed device 13 has been completed. This indication results from the OR function 784. Microprocessor 110 then proceeds over path 794 to return to the activating logic module.

Most terminations of channel and buffer activities results are normal. To illustrate a normal termination, FIG. 28 illustrates logic module CB EUW 387 which is a portion of the termination procedure for terminating a channel to buffer data transfer. CB EUW 387 is entered at 810 from a scan resulting from a COMMAND OUT signal from host 12 via CNL 16. At 820 several non-pertinent steps to this disclosure are performed. At 821, the CST 143 X bit 262 is reset. Now CXT 143 indicates there is no current active data transfer between CNL 16 buffer 15. At 822 additional non-pertinent functions are performed. At 823, microprocessor 110 enters the end address of the record into BRT 141 section 184. This indicates to microprocessor 110 the end of the record as it performs subsequent data processing operations with respect to the just received record. It is remembered that section 183 of BRT 141 contains the record start address. Then at 824, additional non-pertinent functions are performed. At 825 BST 131 section 240 is examined to determine whether or not a write operation to device 13 is occurring. If such a write operation is occurring, then the present record may be partially written on to device 13. Accordingly, at 826 DX 27 receives the end address stored in BRT 141. This enables DX 27 to terminate the recording operation on the addressed device 13 as soon as the end address is reached in buffer 15. If there is no current writing operation on a device 13, step 826 is omitted. Then at 827 a logic module from CUBM 150, named BM SRC, sets bit 185 of BRT 141 to 1 to indicate that the record transfer to buffer 15 has been completed. Then at 828 microprocessor 110 is compared to the FK section 224 contents of BST 137 with the LDT 133 contents of BLKS section 292. If FK is less than BLKS, no more records can be received by buffer 15 until additional data signals are recorded on a device 13, i.e., the allocated buffer 15 segment is full. At 829 microprocessor 110 examines LDT 133 IREC bit 293 to see if reconnection to CNL 16 has been inhibited. If reconnection has been inhibited at 829, no more action need be taken and path 831 is followed to step 832; otherwise, at 830 status store 100 receives a buffer full signal to indicate that a channel command retry should be sent to the next received WRITE command rather than reconnecting the storage subsystem 10 to the channel for another write data transfer. CB EUW 387 is terminated at 832 by activating a logic module in CUCS 155 to indicate that the data transfer from CNL 16 to buffer 15 has been completed. At this time CUCS 155 will perform functions necessary to handle the just received record of data signals but which are not pertinent to an understanding of the present invention. At 833, microprocessor 110 returns to the activating logic module.

FIG. 29 shows length detectors 30 and 48 embodied in overrun circuits 372 as being comparators between a pair of buffer address registers, later described. The circuits within overrun circuits 372 also provide buffer memory addressing through CX 26 and DX 27. The size of buffer segments shown in FIG. 1 are determined by so-called "wrap bits" contained in a pair of registers CW 850 and DW 851 respectively for channel segment wrap and device segment wrap. In other words two independent data transfers can occur simultaneously with buffer 15; one with the channel and one with the device. Accordingly, two independent addressing schemes are provided within circuits 372 for accomplishing this arrangement. All of the registers within circuits 372 are loaded from microprocessor 110 via the external registers 118 of FIG. 3. Registers 118 are loaded for each and every data transfer, i.e., for each record. Busses 852 and 853 respectively supply initializing signals to CW 850 and to channel pointer register CPR 854. CPR 854 supplies its address signals over bus 855 to CX 26 for accessing an appropriate data register in buffer memory 15. CX 26 supplies an increment signal over line 856 to CPR 854 for incrementing same, as is well known. The end of the record or the record area of the expected record, is set forth in channel stop register CSR 860 which is initialized via bus 861. In a write mode, i.e., transfer of data signals from CNL 16 to buffer 15, CPR 854 is continually incremented each time a byte is automatically transferred into buffer memory 15. Comparator 30, which is the length detector 30, receives the contents of CSR 860 over bus 862 and the contents of CPR 854 over bus 855. As soon as comparator 30 detects a predetermined relationship between CPR 854 contents and CSR 860 contents, then an interrupt signal is supplied over line 373 as explained with respect to FIG. 14. In a similar manner, DW 851 receives its signals over bus 865 while DPR 866, a device pointer register corresponding to CPR 854, receives its initializing address signals over bus 867. DPR 866 supplies its address signals over bus 868 to DX 27 for enabling DX 27 to access the appropriate data register in buffer memory 15. Bus 868 also extends to length detector comparator 48 for comparing the contents of DPR 866 with device stop register DSR 870. DSR 870 is initialized by signals received from an external register 118 via bus 871. DSR 870 supplies its stop address over bus 872 to length detector comparator 48. When a predetermined relationship between the contents of DPR 866 and DSR 870 are detected, an interrupt signal is supplied over line 374 as explained with respect to FIG. 14. In a similar manner signals on busses 855 from CPR 854 and 868 from DPR 866 are supplied to a comparator 874 for indicating over line 375 that the address buffer 15 segment is either empty or full depending upon whether it is a read or write operation. The DX 27 increments DPR 866 by sending an increment signal over line 875.

The segments within buffer memory 15 are identified by the wrap bits of CW 850 and DW 851. These wrap bits are applied to intermediate bit positions of CPR 854 and DSR 870, respectively. The effect is to make a different modulo counter out of the lower bit positions of the two registers CPR and DSR. The bit positions more significant than the bit positions receiving the wrap bits select which segment is to be addressed. Such bits are initialized by the signals from busses 853 and 871, respectively, for CPR 854 and DSR 870.

FIG. 30 details logic module CB UWO 381. Line 380 represents the interruption line of FIG. 14 which enables microprocessor 110 to activate this logic module at 880. Microprocessor 110 at 881 determines the number of BRT 141 registers having entries for the addressed device 13. If the entries are greater than one, then there is more than one record residing within the allocated buffer 15 segment of the logical device that was subject to the overrun condition represented by the line 380 interruption. Accordingly, for more than one record the microprocessor 110 at 882 determines if the addressed device is presently selected, i.e., DADDR section 302 of selected device table 132 has the device address. If device is selected and it is not subject to an ERP, then at 883 microprocessor 110 resets the error in status registers of the channel adapter 80 and CX 26 involved in the data transfer resulting in the overrun. Then microprocessor 110 follows path 884 to exit 885 which enables microprocessor 110 to return to a scan. Remember the present logic module is activated in response to circuit generated interruption signal on line 373 (FIG. 14). On the other hand, if there is only a single record in the allocated buffer 15 segment as detected at 881, the device is not selected or there is an ERP; then microprocessor 110 follows path 887 to reset CX 26 at 888. This action enables CX 26 to be initialized for another data transfer from another channel adapter 80. Then at 889, microprocessor 110 activates the CUBM 150 logic module BM DRE (not shown) which erases a register of BRT 141 that was assigned to represent the record being received resulting in the overrun condition. This erasure destroys the addressability of the data of that record which is incomplete and could cause problems of data integrity if not erased. Then at 890, microprocessor 110 determines if the number of BRT 141 registers (BRTK) assigned to the allocated buffer 15 segment is equal to zero or not. When BRTK is not equal to zero, then at 892 (line 352, FIG. 14) logic module CS CBW 349 is activated to record those records in buffer 15 to be written onto tape before storage subsystem 10 proceeds. That is, the overrun was caused by insufficient buffer space. Therefore, the complete record still in the allocated buffer 15 segment must be written onto device 13. Then, at 893 microprocessor 110 checks the return code to see if a write operation to device 13 was scheduled. If not, a UNIT CHECK (UC=1) is scheduled to be reported to host 12 at 894 via a channel adapter 80. If the write operation was scheduled, normal processing can continue subject to the CCR being sent at 895 to allow writing of the data onto the device 13.

Returning to 890 if the number of records in the allocated buffer 15 segment is zero, then microprocessor 110 follows path 897 to 898. There microprocessor 110 determines whether or not the addressed device 13 is selected by control unit 11. If it is currently selected, then it must be deselected and the scheduled data transfer aborted because the only record (record overrun buffer 15) that was in the allocated buffer 15 segment during overrun is now being recorded onto the addressed device 13. Accordingly, microprocessor 110 at 899 activates logic module BM DIS 383 to disable the addressed logical device. Logic module BM DIS 383 is illustrated in FIG. 31. If the addressed device is not selected by control unit 11, of course no action need be taken in these regards. At 900, microprocessor 110 examines BST 137 to see if the buffer segment is paired by examining P bit 214. If the segment is paired, then at 901 the tape synchronous mode is automatically imposed upon storage subsystem 10 by setting SYNC bit 290 to the active condition of LDT 133 register corresponding to the addressed logical device. Then at 903 microprocessor 110 again accesses LDT 133 to increase the count in BLKS 292 to indicate a larger data block has been encountered, i.e., the overrun indicates that a larger block than one anticipated has been received and that the allocated buffer 15 segment cannot handle the data properly with the present allocation. If the tape synchronous mode was not imposed on subsystem 10 at 901, then a single buffer segment is involved in the overrun and a paired segment must be provided. On the other hand if the tape synchronous mode is imposed at 901, then the paired segments must be reduced to a single segment for use in the tape synchronous mode. This action is achieved by steps 904 and 905 respectively activating logic modules BM PDT 384 for deallocating from either a single segment or a paired segment and then activating logic module BM PAT 358 at 905 for reallocating either a paired segment or a single segment respectively for the conditions discussed above. Then microprocessor 110 follows path 884 to return to scan at 885.

FIG. 31 illustrates logic module DB DIS 383 which is entered in FIG. 14 by line 382. Entry in FIG. 31 is shown at 910. At 911 microprocessor 110 compares the DADDR section 261 of CXT 143 with the DADDR section 302 of SDT 132 to ensure that the addressed device 13 for transferring signals from CNL 16 to buffer 15 is the same device 13 that is currently transferring signals to a buffer 15. If the same device is addressed for both channel and device data transfers, then at 912 microprocessor 110 examines CXT 143 to see if the channel is waiting by sensing W bit 263. If the channel is waiting, then at 913 microprocessor 110 accesses CXT 143 to reset the X and W bits 262 and 263. Then at 914, a channel command retry is sent to the host via channel adapter 80 to free the channel for other operations until the situation in storage subsystem 10 is changed to handle the larger data block. At 915 microprocessor 110 resets circuit CX 26. At 916 microprocessor 110 resets the BRT 141 register associated with the record that was being received from CNL 16. If either of the conditions in steps 911 or 912 were not met, then microprocessor 110 follows path 917 to execute step 920 without executing intermediate steps 913-916. At 920, data flow circuits 83 are all reset such that another device-buffer data transfer operation can ensue. At 921 DX 27 is reset, then at 922 microprocessor performs some non-pertinent functions. At 923 SDT 132 is accessed to reset X bit 307 to indicate that there is no current data transfer from a device 13. The device interconnection circuits (not detailed but indicated by line 84) connecting DX 27 to the device 13 are reset at 924. At 925 microprocessor 110 returns to the calling logic module which is either logic module CB UWO 381 or DB DBO 385.

Referring next to FIG. 32, a buffer overrun from a data transfer between device 13 and buffer 15 is described. Logic module DB DBO 385 is activated by an interruption received on line 374. At 930 microprocessor 110 enters the logic module and performs some non-pertinent functions at 931. Then at 932, microprocessor 110 examines BST 137 RW bit 221 to determine whether the overrun related logical device is in the read or write mode. For the write mode, the allocated buffer 15 segment is empty. In the read mode the buffer 15 segment is full and the entire record has not yet been received from device 13. In the write mode, microprocessor 110 activates logic module BM DIS 383. At 933 the functions performed are those described with respect to FIG. 31. Next at 934, DOT 136 is accessed to the register having a DADDR 272 section matching that of the overrun related device. V bit 274 is reset to indicate that no data transfer is occurring between a device 13 and its allocated buffer 15 segment. This action also invalidates all of the signals in the addressed register of DOT 136. Since the overrun related device 13 has moved its tape 54 out of position, tape 54 has to be repositioned to the beginning of the block that resulted in the overrun condition. Therefore microprocessor 110 at 935 activates logic module DM SCH 353 as shown in FIG. 24. Then microprocessor 110 follows path 936 to return to scans at 937.

When the overrun results from a read operation (device 13 to buffer 15 data transfer), microprocessor 110 follows path 940 from step 932 to activate logic module BM DIS 383 at 941. Then at 942 microprocessor 110 erases the BRT 141 register assigned to the record being read. This is achieved by activating logic module BM DRE (not shown) at 942. This logic module has been described previously. Then at 943, LDT 133 is examined at RAH bit 291 to determine whether or not the data in buffer segment has read ahead data. Assume that it is read ahead data, then at 944 LDT 133 is accessed to reset RAH 291 to 0 and inhibits further read ahead by setting IRAH 286 to the active or 1 condition. When there is no read ahead data in the buffer segment having the overrun, microprocessor 110 at 946 accesses BST 137 to examine P bit 214 for determining whether or not the segment that was overrun is paired or a single segment. If it is paired then the tape synchronous mode is activated at 947 by accessing LDT 133 and setting sync bit 290 to the active condition. All of these actions concern the register in LDT 133 associated with the addressed logical device. From path 948, microprocessor 110 at 950 accesses LDT 133 to increase the indication of BLKS 292 for indicating a larger block size being processed by storage subsystem 10 from the addressed device. Then at 951 and 952 the buffer 15 is reallocated by activating logic module BM PDT 384 and BM PAT 358; the functions of these two successively activated logic modules is described with respect to FIG. 30 items 904 and 905. Then microprocessor 110 returns to scan at 937.

The above description has shown detection of overrun, i.e., operation of length detectors 30 and 48 such that tape synchronous mode has been imposed on tape subsystem 10 in the read and write modes. Now storage subsystem can receive the command that could not be performed and that command will be executed in the tape synchronous mode because the record length is in excess of the buffer 15 segment capacity. That is, the mode of operation of the subsystem has changed from the buffer mode to the less efficient tape synchronous mode because of record length considerations.

Response of storage subsystem 10 to a received READ command when in the tape synchronous mode results in logic module CS SCE 330 activating logic module CE SRD 339 via line 335 of FIG. 14. FIG. 33 shows activation of logic module CE SRD 339 from line 335 at 960. At 961 CST 131 is accessed for setting CC 240 bit to 1. This setting indicates that command execution is continuing and that further action by control unit 11 is required. At 962 CST 131 is again accessed for examining the status of CCR bit 238. If it is 0 at 964, logic modules of CUCS 155 are activated to send a CCR signal to channel adapter 80 such that device 13 can be activated to reach operational speed before the channel is reconnected to the storage subsystem 10 for the data transfer. CCR bit 238 is also set to unity. At 965 microprocessor 110 determines whether or not a channel adapter 80 error was detected. Generally there will be no error such that at 966 the CCR=1 exit from 962 is joined. At 967 BST 137 has its D bit 222 examined to determine whether tape 54 is going to be in the forward or backward direction of motion. For the forward direction at 969, logic module CB SUR 343 is activated with a notation that tape motion is in the forward direction F. For the backward direction, at 970 logic module CB SUR 343 is activated with the notation that tape motion is in the backward direction B. Then at 971 logic module DM SCH 353 is activated to start the device 13 moving the tape in anticipation of transferring data to the host from device 13. At 972 microprocessor 110 returns to the calling module. In the event that a channel adapter 80 error was indicated at 965, microprocessor 110 follows path 963 to return to the calling logic module. The error had been logged elsewhere therefore it is not necessary to log the error by this logic module. At this time, no data is being transferred; the addressed device 13 is getting ready to transfer data.

The WRITE command received first in the tape synchronous mode results in logic module CS SCE 330 activating logic module CE SWR 340 via line 335 (FIG. 14) to prepare the addressed device 13 for operation in the tape synchronous mode. In FIG. 34 entry of the logic module CE SWR 340 from line 335 is at 980. At 981 CST 131 is accessed to set CC bit 240 to unity. At 982 CST 131 is accessed to examine the value of CCR bit 238. If it is 0 at 983, the CCR bit is set to 1 and the CCR is sent through a channel adapter 80 to host 12 for the addressed device. At 984 microprocessor 110 checks to see if a channel adapter 80 error was reported,
if not, the action from step 982 when CCR equals 1 and from a no error condition of step 984 is joined at 985 to activate logic module BM DRE (not shown) of CUBM 150 at 986. The logic module BM DRE has been previously described. Then at 987 logic module DM SCH 353 (FIG. 24) is activated such that device 13 can start tape 54 moving to operating speed. At 988 microprocessor 110 returns to the activating logic module CS SCE 330. In the event there is a CA error at 984, microprocessor 110 omits steps 986-987 and returns immediately to the activating logic module.

From both logic modules CE SRD 339 and CE SWR 340 a CCR has been sent to host 12. This CCR will cause a channel to disconnect until the device 13 is approaching operating speed. At that time a DEVICE END is sent to the host to signify that storage subsystem 10 can now perform the READ or WRITE command in the tape synchronous mode. Accordingly, the host will again send the READ or WRITE command which will be decoded by CS DCD 323 and CS SCE 330. This time logic module CE SSO 342 (FIG. 35) is activated via line 335 (FIG. 14). In FIG. 35 the activation of this logic module via line 335 is indicated at 990. At 991 CST 131 is accessed with respect to the incoming commands and the first pass bit 237 is reset to 0. It will be remembered that this bit was set to unity to show that a first portion of the command execution had been completed. Now the second portion i.e., that portion that will actually effect data transfer is being entered. At 992 the channel adapter 80 denominated CXX receives a signal ICCR=0 which means that the inhibit CCR signal previously sent to the channel adapter by another logic module (not described) is removed. At this time if the device 13 is not synchronized to the receipt of the command, another CCR will be sent, then device 13 will reposition tape 54 again; another try will be made at activating the tape synchronous mode. At 993 CUT 130 is accessed and the inhibit selection signal bit (ISEL) is reset. This bit is represented in FIG. 9 by ellipsis 256. ISEL prevents the selection of the addressed device until all of the preparatory actions for the tape synchronous mode were completed. At 994 BST 137 RW bit 221 is examined to determine whether the tape synchronous mode is to be executed with a WRITE or READ command. If it is a WRITE command, at 995 logic module CB SUW 344 (FIG. 23) is activated and operates as previously described. For the read mode, at 996 BST 137 bit D 222 is examined to determine the direction of tape motion. For the forward direction, logic module CB SUR is activated at 997 with the notation that tape is moving in the forward direction. In the backward direction, logic module CB SUR 343 is activated at 998 with the notation that tape motion is in the backward direction. From the above steps via line 1000, microprocessor 110 at 1001 accesses the CST 131 register associated the instant command and addressed device to set CC bit 240 to the active or 1 condition. Then at 1002 logic module DI XFR (not shown) of CUDI 157 is activated to tell device 13 that a data transfer is to ensue. Of course the read or write indication of BST 137 indicates the direction of data transfer. Initiating data transfers from a device such as a tape unit to a control unit is so well known that the details of this operation are not described. At 1003 microprocessor 110 returns to the activating logic module CS SCE 330. The data transfer in the tape synchronous mode now occurs.

FIG. 36 details the execution of the channel command READ DATA BUFFER. Logic module CE RDB 338 is activated via line 335 from activating logic module CS SCE 330. In FIG. 36 entry of the logic module is shown at 1010. At 1011 some non-pertinent functions are performed by microprocessor 110. At 1012 BST 137 RK section 223 is examined. RK=0 means that the buffer 15 segment associated with the addressed logical device is empty. If RK section 223 is not zero, then some data records can be read. One data record is transferred to host 12 from buffer 15 for each received READ DATA BUFFER command.

When the buffer 15 allocated segment is empty, then there are very few things for the control unit 11 to do. At 1014 LDT 133 is accessed for resetting the inhibit write operation bit (IWROP) not shown in FIG. 12 but represented by ellipsis 294. At 1015 CST 131 is accessed for resetting the permanent error bit PE 243. Then at 1016 ending status CHANNEL END DEVICE END (CEDE) is activated and sent to channel adapter 80 for forwarding to host 12. The activating logic module CS SCE 330 is then returned to at 1022.

In the event there is a data record residing in the allocated buffer 15 segment, at 1018 LDT 133 is accessed for setting IWROP (inhibits writing to the addressed device 13) to the active or 1 condition. Remember IWROP is represented by ellipsis 294. Then at 1019 BST 137 is accessed at the register associated with the allocated buffer 15 segment for setting RB bit 220 to the active condition. This signifies that the command being executed is a READ DATA BUFFER command. At 1020 logic module CB SUR 343 (FIG. 19) is activated such that transfer of one data record block is initiated from buffer 15 to CNL 16. Then at 1021 CST 131 is accessed for setting CC bit 240 to the active or 1 condition. This indicates that more activity in responding to the command is required at the completion of the data transfer initiated through step 1020. Then at 1022, microprocessor 110 returns to activating logic module CS SCE 330.

Figure 37:
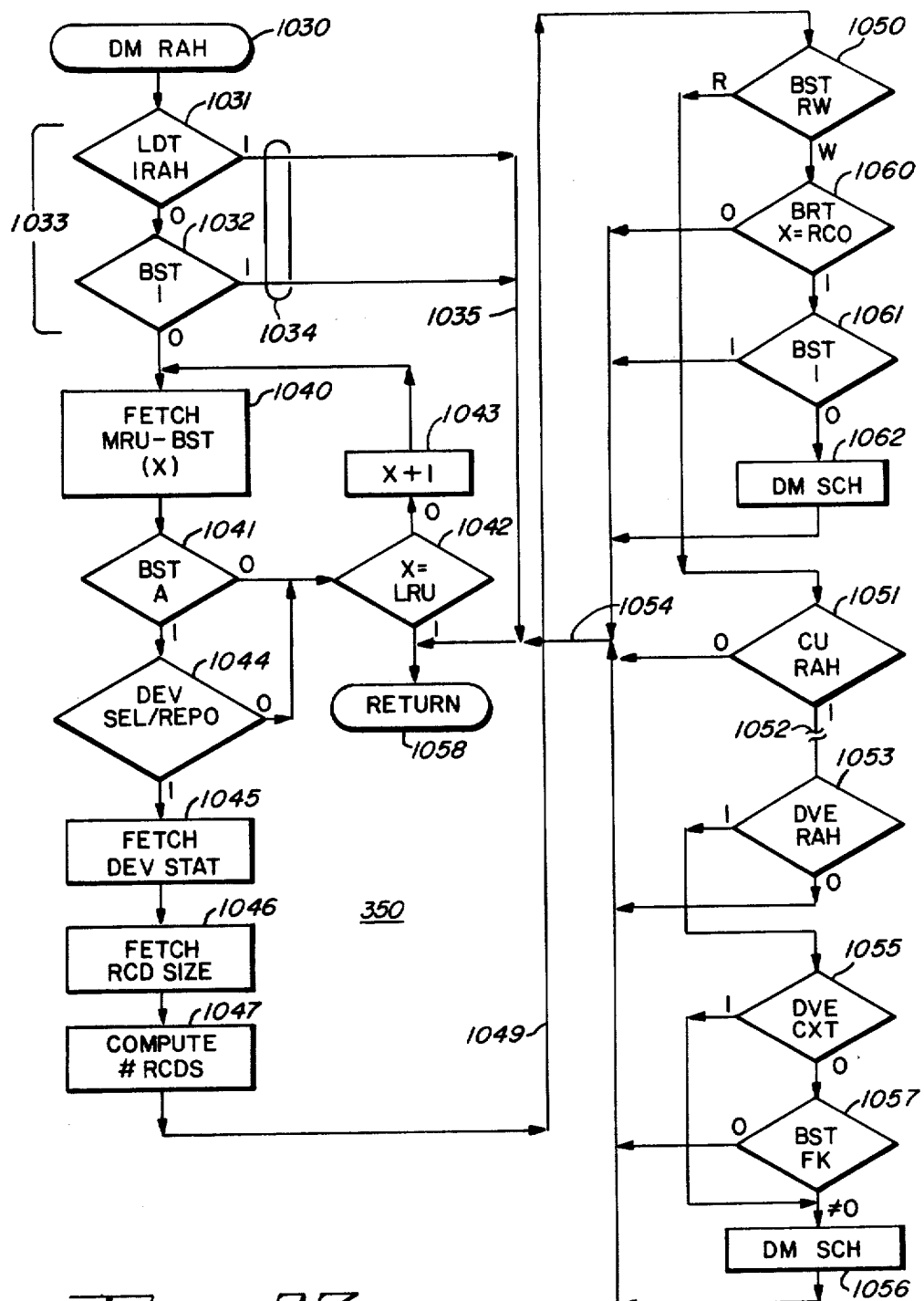
FIG. 37 illustrates logic module CS RAH for illustrating read ahead operations conducted from the recorders to the buffer in anticipation of a host READ command.

Data records are transferred between devices 13 and the respective segments of buffer 15 in accordance with a priority of most recent usage of the respective segments as identified in MLRU 40 of BST 137. The recording operations are scheduled in the same manner, reads and writes from and to devices 13 are interleaved in accordance with most recent segment usage. FIG. 37 shows logic module DM RAH 350. The purpose of DM RAH 350 is to enable microprocessor 110 to create device 13 activity in anticipation of host system 12 requests such that performance enhancement of subsystem 10 can be maximized. Activation of DM RAH 350 occurs at 1030 with and AND/OR logic function consisting of steps 1031 an 1032 being first executed. If either read ahead is inhibited for a control unit 11 (LDT 133, IRAH=1) or buffer 15 asynchronous operations are inhibited (BST 137, I=1), then as indicated by logic OR function 1034 logic path 1035 leads microprocessor 110 to return 1058. On the other hand, if the AND condition represented by numeral 1033, is satisfied, i.e., neither read ahead nor asynchronous buffered writes are inhibited; then at 1040, the BST 137 segment entry which is MRU (indicated in MRLU 40) is fetched and stored in microprocessor 110 work registers (not shown). At 1041, microprocessor 110 examines the fetched entry to see whether or not the identified segment is allocated (BST 137, A=1). If the segment is not allocated, then a scan is instituted which includes steps 1042 and 1043. At 1042, the microprocessor 110 determines whether or not the addressed segment "X" for a BST 137 entry is the LRU segment of MLRU 40. If it is the LRU segment, then return 1058 is made since no device 13 activity is to be scheduled. If it is not the LRU segment, steps 1040 and 1041 are repeated for the next less "most recently used" segment of buffer 15. The next segment is identified by incrementing X by unity in step 1043. As soon as an allocated segment is found, i.e., a logical device is active in that a device 13 has an allocated segment from buffer 15; then at step 1044, microprocessor 110 determines whether or not the corresponding device 13 is busy. If the device is busy, no asynchronous operation can be instituted. Accordingly, the just described scan 1040, 1041, 1042 and 1043 is re-entered via path 1048 at step 1042. On the other hand, if the device 13 associated with the logical device is not selected, i.e., not busy or is not repositioning (REPO) i.e., not performing a stand-alone operation, then the logical device is eligible for asynchronous read or write operations. AT 1045, microprocessor 110 fetches device status from device status table, DST 140. DST 140 contains the last reported status for the device associated with the logical device being considered for asynchronous operation. Then at 1046, the record size indicator BLKS from LDT 133 section BLKS 292 for the identified logical device is fetched for the purpose of determining the number of records that can be transferred in the ensuing asynchronous data processing operation. At 1047, the number of records (RCDS) that are expected to be transferred is computed. This number is a function of the number of records that can be transferred between buffer 15 and the device 13 in a preset time period based upon record length BLKS. Then, following path 1049, microprocessor 110 at 1050 reads BST 137 RW bit 221 to determine the mode of operation, i.e., is the data processing operation a read from device 13 or a write to device 13.

For a read operation, microprocessor 110 at 1051 determines from CUT 130 whether or not read ahead is permitted for the control unit 11. The section of CUT 130 containing this inhibit bit is represented by ellipsis 256. Read ahead could be inhibited for error control purposes during an error recovery procedure or during diagnostic procedures. If read ahead is inhibited as indicated in CUT 130, then microprocessor 110 follows path 1054 to return 1058. If read ahead is permitted, then at 1052, microprocessor 110 fetches the direction of tape motion from BST 137 D bit 222 for the data processing operation, i.e., either forward or backward, and places the direction indicator in a work register (not shown) within microprocessor 110. Then at 1053, microprocessor 110 determines whether or not read ahead is permitted for the logical device being considered for the asynchronous read operation (indicated in LDT 133 section). If RAH=0, return to the activating logic module is made at 1058 via path 1054. If read ahead is permitted at 1053, then at 1055 microprocessor 110 examines CXT 143 DADDR 261 and X 262 to see if a channel-buffer data transfer is presently occurring for the device being considered for asynchronous read. If there is a transfer to channel occurring, then because of the channel rates, buffer overrun cannot occur, and a device operation is instituted at 1056 by activating logic module DM SCH 353 (FIG. 24). If a channel transfer is not occurring for the addressed logical device, then the number of free bytes of buffer space is read at 1057 from BST 137, FK 223 for determining whether or not sufficient buffer space within the segment of interest is available to justify a read ahead operation. If yes, then a device operation is instituted at 1056 by activating logic module DM SCH 353. It should be noted that the computation at step 1047 designates a minimum number of records. If that minimum number is not met, then microprocessor 110 returns to the activating logic module via 1058.

On the other hand, if a write operation is detected at 1050 in BST 137, then at 1060, BRT 141 is examined for the eligible device "X" to see if there is a complete record in the buffer segment of logical device (RC=1 in section 185 of BRT 141). If there is not a complete record in buffer 15, an asynchronous write cannot occur. Accordingly, microprocessor 110 returns via path 1054. If there is a complete record for asynchronous writing, then at 1061, microprocessor 110 determines whether or not such asynchronous writes are inhibited. Such inhibition may be caused by error recovery procedures for error control purposes. If so, then return 1058 occurs as previously described. Otherwise, a device operation is initiated at 1062 by activating DM SCH 353 (FIG. 24) for causing an asynchronous recording operation (write) to occur.

Figure 38:
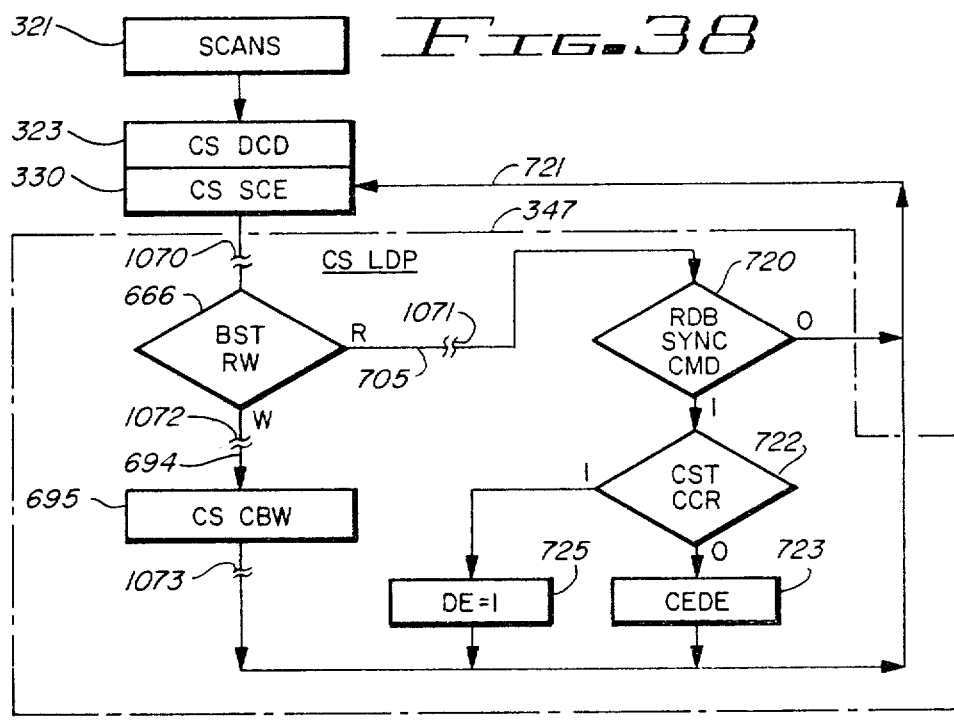
FIG. 38 illustrates the operation of control of FIG. 3 during the execution of a SYNCHRONIZE command as implemented by various logic modules.

Referring next to FIG. 38, a brief synopsis of the execution of the SYNCHRONIZE command is shown. From scan 321 (FIG. 14) a received SYNCHRONIZE command activates logic module CS DCD 323 and CS SCE 330 the details of which are shown in FIGS. 15 and 17. From logic module CS SCE 330, logic module CS LDP 347 is activated. Numeral 1070 denotes logic steps shown in FIG. 25 but omitted in FIG. 38. Finally at step 666 BST 137 is examined at its RW bit 221 to determine whether the segment allocated to the address device is in the read mode or write mode. If it is the read mode then an immediate response to the SYNCHRONIZE command can be made by supplying CHANNEL END and DEVICE END. This is achieved by following path 705 then performing the omitted steps 1071 to step 720. Here microprocessor 110 determines whether the received command is a READ DATA BUFFER or a SYNCHRONIZE command. If it is not either one, of course, then CS SCE 330 is returned to over path 721. If it is a SYNCHRONIZE command, then at 722 microprocessor 110 examines CST 131 to determine whether or not a CCR was sent, by examining bit 238. If no CCR was sent, then at 723 both CHANNEL END and DEVICE END are set up to be forwarded to the host 12. On the other hand, if a CCR was sent then a DEVICE END is sent at 725. In response to the DEVICE END the host 12 will send SYNCHRONIZE command again. At this time the CCR will be removed and step 723 will be performed for completing of the SYNCHRONIZE command.

In the write mode, at step 666, omitted logic steps at 1072 are followed to path 694 which leads to step 695 for activating logic module CS CBW 349 for recording all of the data records in the allocated buffer 15 segment to the addressed device 13. Logic module CS CBW 349 of course activates DM SCH 353 for scheduling the write operations. At this point in time, a CCR is sent to the sending host 12 to indicate that the subsystem 10 has to do its own independent actions before the command that was received can be executed. Then at 1073 microprocessor 110 performs the omitted logic steps and returns to logic module CS SCE 330.

Upon completion of the write to device 13, CS SCE 330 will send a DEVICE END signal to host 12. Host 12 will then reissue the SYNCHRONIZE command resulting in a CHANNEL END DEVICE END being sent at that time to signify that all of the data that was in the buffer to be written to device 13 has been actually recorded on the addressed device 13.

The write buffer mode is employed by storage subsystem 10 in recording data between beginning of tape (BOT) and logical end of tape (LET). LET is denominated as being a predetermined distance from the physical end of tape (EOT) affixed to the hub of (not shown) the spool on which the tape 54 is mounted. It is desired to closely control recording operations write between LET and EOT. To do this, the tape write or tape synchronous mode is imposed by storage subsystem 10 irrespective of the mode set command from host 12. When the tape is returned toward BOT from the area between LET and EOT (FIG. 1), then the buffer write mode can be reinstituted. The controls within control 33 for implementing the above described functions are performed by microprocessor 110 by activating logic module CS CTC 388 as detailed in FIG. 39. Logic module CS CTC 388 is activated from logic module CB EUW 387 via activating step 832 shown in FIG. 28 and as represented in FIG. 14 by line 832. It is to be understood that other logic modules, not shown in the present description but associated with termination of data transfers between CNL 16 and buffer 15, also may enable microprocessor 110 to activate logic module CS CTC 388. Also it is to be understood that microprocessor 110 in executing logic module CS CTC 388 will perform other functions incident to the termination of a data transfer between CNL 16 and buffer 15 which is not necessary for an understanding of the present invention and are functions that are readily ascertainable from the prior art.

At 1080 microprocessor 110 activates logic module CS CTC 388. Firstly, at 1081 a series of non-pertinent logic functions are performed by microprocessor 110 incident to the termination of a data transfer from buffer 15 to CNL 16 (read operation); these functions can include building ending status, error status and the like. Following these read related functions it is determined that a write operation has been performed, i.e., transfer from host 12 towards device 13. At 1082, microprocessor 110 examines DST 140 (FIG. 4) to determine whether or not logical end of tape LET was reported by the addressed device 13. LET can be detected several ways. A first way is to provide an optical marker, such as a reflective patch or a transparent area, on tape 54 at LET. A photosensor (not shown) in the device 13 detects the optical pattern and reports LET to microprocessor 110 using known status reporting techniques. Microprocessor 110 receives that information and stores the LET indication in DST 140. An alternate technique, which is a preferred technique, is to count rotations of the machine reel on tape drive 18 of device 13 using algorithms that relate lineal displacement of tape onto machine reel from a supply reel that indicates to device 13 control 19 that a predetermined length of tape now is stored on the machine reel; hence LET is at the transducer of the tape drive 18. Other techniques may be employed such as recording special magnetic marks in predetermined portions of the tape, having a linear tape displacement measurement mechanism as well as other techniques any of which can be satisfactory. In any event LET is indicated in DST 140.

Once LET is detected and sensed through DST 140, microprocessor 110 at 1083 activates logic module CS CBW 349 (FIG. 27) which determines whether or not there is any data in the allocated buffer 15 segment of the addressed device 13 associated with the terminating data transfer that is yet to be written onto the addressed device 13. If there is any such data to be recorded, then microprocessor 110 via logic module CS CBW 349 schedules a write operation as has been described.

At this point in time, any received WRITE command will cause microprocessor 110 to send a channel command retry to CNL 16. This CCR wait state will be kept until all of the data in the allocated buffer 15 segment has been successfully written onto the tape 54 of the addressed device 13 or until a permanent error has been detected.

Returning to FIG. 39, after activating CS CBW 349, some additional non-pertinent logic functions are performed at 1084 by microprocessor 110. These functions can include error detection and logging functions not pertinent to an understanding of the present invention. Then at 1085, microprocessor indicates that the command is continuing and a notification should be made by the microprocessor 110 executing a logic module associated with terminating a write operation to the addressed device 13 that a DEVICE END should be sent to CNL 16 when a CCR was sent to the received WRITE command, otherwise no further action need be taken. It should be noted that microprocessor 110 in executing CS CTC 388 does not send a CCR since no WRITE command has been received.

Following the continuing command notation at 1085 which sets CC bit 240 of CST 131 associated with addressed device, microprocessor 110 performs further non-pertinent logic functions at 1086. Then at 1087 microprocessor 110 examines BST 137 D bit 222 to determine direction of tape 54 motion. If the motion had been in the forward direction, then the tape 54 is moving such that EOT will approach the transducer of tape drive 18. Then at 1090 microprocessor 110 accesses LDT 133 to determine whether or not the recording operation was in the tape synchronous mode write by examining sync bit 290. If the addressed device is not in the synchronous mode, then it must be either in the tape buffer write mode or the tape write mode. Then at 1091 microprocessor 110 stores the fact of the LET indication and the present write mode indicated in WM 239 of CST 131 in device information area DIA 139. This control data is stored such that when the tape is rewound that the original mode can be restored, microprocessor 110 also accesses CST 131 to set WM 239 into the tape write mode. Accordingly, all subsequently received WRITE commands from host 12 will be executed in the tape write mode unless the synchronous mode had been active.

Returning to 1087, if direction of tape motion was in the backward direction, i.e., BOT was approaching the transducer of the tape drive 18, then microprocessor 110 follows path 1093 to execute logic determination step 1094, the LET and WM stored in DIA 139 are fetched. If there is information stored there, i.e., the synchronous mode was not detected at 1090; at 1096 the microprocessor 110 transfers the contents of the DIA 239 WM indication to CST 131 WM bit 239. This action restores the tape buffer mode or the tape write mode into CST 131. At the same time DIA is reset to zero in this area.

If most of the conditions set forth above were not met; at 1082 LET was detected or 1090 LDT 133 indicated the synchronous mode, or at 1094 WM indicated the tape write mode, or step 1091 was executed; microprocessor 110 follows path 1097 to perform some non-pertinent functions at 1098 relating to write operation terminations and then returns to the activating logic module via 1099. Such non-pertinent functions again relate to error status building, generating CEDE for transmittal to channel adapter 80 and other miscellaneous functions not pertinent to an understanding of the present invention.

As mentioned earlier, when host 12 or the signals being read from tape 54 indicate a possible major change in data processing operation as it could effect subsystem 10 operation, then the tape buffer mode is returned to. FIGS. 40 through 42 illustrate three control mechanisms of storage subsystem 10 for switching from the tape synchronous mode, in either the write or read modes, to the buffer mode for the respective write or read modes. Tape write mode can be reset in the same manner. Briefly, the change in operations can be a REWIND command, REWIND UNLOAD command, LOCATE command or the detection of a tape mark from tape 54 or the receipt of a WRITE TAPE MARK command. While all conditions could result in the tape write mode being switched to the buffer write mode, for purposes of illustration only FIGS. 41 and 42 show eliminating both the synchronous and the tape write modes upon detection of a major change in data processing operation, no limitation thereto intended.

FIG. 40 illustrates logic module DB RTM 364A which handles the receipt of a WRITE TAPE MARK command or the detection of a tape mark on tape 54; detection of a tape mark on tape 54 results in an interruption indication such that scans 321 cause microprocessor 110 to activate logic module DB RTM at 1100. Execution of the WRITE TAPE MARK command (WTM) results in LS SCE 330 activating DB RTM 364A via line 335 for the logic functions performed at 1101. At 1102 LDT 133 is accessed to reset sync 290 bit to zero and to reset BLKS section 292 to zero. This action recalibrates BLKS to the initial state such as if the tape 54 were just loaded onto tape drive 18. Then at 1103, SDT 132 is accessed to sense READ-WRITE bit 303 to determine whether the addressed device 13 is in the read or write mode. When in the read mode R, microprocessor 110 at 1104 accesses LDT 133 to set TM bit 289 to unity and accesses BRT 141 to enter into TYPE section 187 that a tape mark has been encountered. At 1105, microprocessor 110 again accesses LDT 133 to inhibit read ahead by setting IRAH bit 286 to unity. In the write mode, steps 1104 and 1105 are bypassed by microprocessor 110 following path 1106. From path 1106 or step 1105 non-pertinent functions are performed at 1107 such as resetting buffer-device controls DX 27, collecting sense data and the like. Microprocessor 110 follows path 1108 returning to scans 321.

FIG. 41 shows the execution of the REWIND and REWIND UNLOAD commands. It is remembered that microprocessor activates CE REW 363 from executing logic module CS SCE 330 via line 335. From the entry 1110 microprocessor 110 at 1111 accesses CST 131 to convert the received command code to a device order code. For a REWIND command the order is set up to be a REWIND for the addressed device 13 while for a REWIND UNLOAD command the order REU for rewind unload is set up for the addressed device 13. Then at 1112, microprocessor 110 activates DM SCH 353 (FIG. 24) for entering the device order, either rewind or rewind unload, in CCQ 21 of DOT 136. Then at 1113 microprocessor 110 accesses LDT 133 to set a bit PCUD represented by ellipsis 294 indicating that the control unit can be deallocated. Deallocation of a control unit indicates that the allocated buffer 15 segment can be reallocated to another device. Then at 1114, microprocessor 110 accesses LDT 133 to inhibit read ahead by setting IRAH to unity and resets the synchronous mode by resetting SYNC 290. Then microprocessor 110 accesses CST 131 for setting WM 239 to the buffer write mode (BM). Then some nonpertinent logic steps are performed at 1115 before returning to the activating logic module CS SCE 330 at 1116.

FIG. 42 illustrates execution of a LOCATE BLOCK command which is activated via logic module CS SCE 330 as indicated in FIG. 14 by line 335. First at 1121, microprocessor 110 performs certain logic functions activating the addressed device 13 to move tape to an addressed block already recorded on tape. Following such tape searching motions, which are well known in the art, microprocessor 110 at 1122 accesses CST 131 for removing the suppression of read ahead by resetting SRAH 241 to zero. Microprocessor 110 also resets the change of direction bit to zero (that bit is not shown in CST 131). Then at 1123, microprocessor 110 accesses LDT 133 for resetting SYNC 290 to zero and accesses CST 131 for setting the write mode section 239 to the buffer write mode (represented in FIG. 42 by BM). Then at 1124, additional housekeeping logic functions are performed by microprocessor 110 incident to the locating function but not pertinent to an understanding of the present invention. The activating module CS SCE 330 is returned to at 1125.

From all of the above, it is seen that the automatic mode changing and other control features set forth herein provide a buffered storage subsystem having high data integrity with a low performance tape recorder while simultaneously providing high performance. Variations of the design can be implemented within the scope of the invention.

To assist analysis of the written, a glossary of selected acronyms is included in the description.

| GLOSSARY OF SELECTED ACRONYMS | |
|---|---|
| A | Allocated (BST) |
| ADDR | Address |
| BC | Buffer control circuits, viz automatic data transfer controls |
| BCT | Buffer control table |
| BI | Bus in |
| BO | Bus out |
| BLKS | Block size |
| BM ABS | Logic module allocate buffer segment |
| BM CRE | Logic module create record entry |
| BM DRE | Logic module delete record entry |
| BM IDF | Logic module increment device fault |
| BM PAT | Logic module pending allocation |
| BM PDT | Logic module pending deallocated |
| BM SFC | Logic module send fault count |
| BRM-B | Buffer read mode-backwards |
| BRT | Buffer record table |
| BST | Buffer status table |
| BSTP | Pointer to BST entry (LDT) |
| BTS | Buffer mode control-buffer mode, tape mode or synchronous mode |
| BWM | Buffer write mode |
| C | Device operation has completed (DOT) |
| CB EUW | Logic module end upper (channel) write |
| CB SUR | Logic module start upper (channel) read |
| CB SUW | Logic module start upper (channel) |

-continued

| GLOSSARY OF SELECTED ACRONYMS | |
|---|---|
| | write |
| CS | Channel adapters A-H |
| CBSTP | Pointer to channel BST entry (CXT) |
| CCR | Channel command retry |
| CCRK | Channel command retry count |
| CCQ | Queue in CUT |
| CE | CHANNEL END signal |
| CE RDC | Logic module read command execution |
| CE SRD | Logic module tape synchronous read set-up |
| CE SSO | Logic module start tape synchronous operation |
| CE SWR | Logic module tape synchronous write set-up |
| CE WRT | Logic module WRITE command execution |
| CMD | Command |
| CMDC | Command execution is completed |
| CMDO | COMMAND OUT signal |
| CNL | Input/output channel |
| COMP | Comparator circuit |
| CPR | Channel pointer register |
| CS CBW | Logic module continue buffer write to device |
| CS DCD | Logic module decode |
| CS LDC | Logic module logical device preparation continuation |
| CS LDP | Logic module logical device preparation |
| CS RDA | Logic module read ahead handler |
| CS SCE | Logic module start command execution |
| CS SPS | Logic module sense present status |
| CSR | Channel stop register |
| CST | Command status table |
| CU | Control unit |
| CUBM | Buffer management group |
| CUCB | Channel-buffer data transfer group |
| CUCE | Command execution group |
| CUCH | Channel adapter control group |
| CUSV | Sequence vector group |
| CUCS | Command support group |
| CUDB | Device-buffer data transfer group |
| CUDI | Device interface control group |
| CUDM | Device management group |
| CUER | Error modules |
| CUMD | Maintenance modules |
| CUSN | Sense modules |
| CUT | Control unit table 130 |
| CW | Channel wrap register |
| CX | Buffer-channel automatic data transfer |
| CXT | Channel transfer table |
| CXX | Any channel adapter |
| D | Direction |
| DA-DG | Individual device 13 addresses |
| DAA-DAB | Device adapters A and B |
| DADDR | Device address |
| DE | DEVICE END signal |
| DI | Device interconnection |
| DIA | Device information area |
| DIAG | Diagnostic data area |
| DM DDO | Logic module disable device operation |
| DOT | Device operation table |
| DPR | Device pointer register |
| DSR | Device stop register |
| DST | Device status table |
| DUC | DEFERRED UNIT CHECK |
| DVE | Device |
| DW | Device wrap register |
| DX | Buffer-device automatic data transfer |
| DI-D9, DA-DF | Individual devices |
| E | Engaged (BRT) |
| ER | Error flag in BRT |
| ERP | Error recovery procedure |
| ERR | Error code in sense status signals |
| ESTAT | Ending status |
| F | Free (BRT) |
| FK | Free byte count (BST) |
| FMT | Format signal density, etc. |
| HID | Host identification table |
| I | Inhibit |

-continued
GLOSSARY OF SELECTED ACRONYMS

| | |
|---|---|
| IBW | Inhibit buffer writes |
| ICQ | Queue in DOT |
| INT | Interrupt |
| IR | Incomplete read from a device |
| IRAH | Inhibit read ahead |
| IREC | Inhibit reconnect |
| IW | Incomplete write to a device (BST) |
| LD | Record length detector |
| LDPC | Logical device preparation complete |
| LDPP | Logical device preparation proceeding |
| LDT | Logical device table |
| LOG | Logical |
| MIN | Minimum number of records |
| MLRU | MRU-LRU list; most recently used; least recently used buffer segments (BST) |
| MT | Empty |
| MP | Microprocessor |
| NP | Number of segments available for pairing (CUT) |
| NS | Number of segments installed in a control unit |
| NWDF | No write data flag |
| OC | Other circuits |
| OPC | Operation complete |
| OTU | Other tape units or drives |
| P | Paired segment (BST) |
| PCUD | Permit control unit deallocation |
| PND | Command is pending (CST) |
| PAT | Pending allocation table |
| PDT | Pending deallocation table |
| PET | Physical end of tape |
| PHY | Physical |
| PGM | Path group map |
| PGT | Path group table |
| RAH | Read ahead |
| RB | READ DATA BUFFER command is being executed (BST) |
| RC | Record complete flag of BRT |
| RCD END | Record ending address of buffer in BRT |
| RCD ST | Record starting address of buffer in BRT |
| RDB | Read backward |
| RE | Reconnect flag (BST) |
| REGS | Registers |
| RK | Record count in one segment |
| RP | Pointers to the BRT register identifying a first and last record in a segment |
| RTN | Return code |
| RW | Read or write mode flag (BST) |
| S | Device operation has started (DOT) |
| SCT | Sequence control table |
| SDT | Selected device table |
| SEG | Buffer segment control |
| SNS | Sense data storage area |
| SRAH | Read ahead scheduled |
| SS | Status store |
| SY | Synchronize circuit |
| SYNC | Synchronous mode |
| TM | Tape mark |
| TSWM | Tape synchronous write mode |
| TWM | Tape write mode |
| X | Transfer is active, interconnection is active; addressed device (FIG. 37) |
| XQ | Work queue of DOT 136 |
| V | Valid entry, device is busy (DOT) |
| W | Operation is waiting |
| WDF | Write data flag |
| WM | Write mode |

While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of operating a peripheral data processing system having a data buffer and a plurality of magnetic tape recorders coupled to the data buffer for recording data signals on magnetic tapes transportable past a transducer in the recorders, respectively, and attachable to a host processor operating with a plurality of computer programs, including; the automatically performed steps of:

transferring data signals relating to said plurality of computer programs to said peripheral subsystem as a series of signal blocks, respectively;

temporarily storing in the buffer a plurality of said series of signal blocks to free said host from storing same;

asynchronously to said host operations, operating said peripheral subsystem to perform peripheral data processing functions with respect to all said temporarily stored series of signal blocks, including recording said data signals on said tapes in accordance with a peripheral data processing system set of priorities, said recording constituting said peripheral data processing functions;

maintaining in said peripheral data processing system a tally of all signal blocks that are temporarily stored in the buffer for said respective magnetic tape recorders;

receiving a SYNCHRONIZE command in said peripheral subsystem from said host including an electrical indication of certain ones of said temporarily stored signal blocks for actuating said peripheral subsystem to perform said peripheral data processing functions on said certain ones of said signal blocks before performing data processing operations on other ones of said signal blocks;

addressing said SYNCHRONIZE command to a given one of said magnetic tape recorders such that said certain signal blocks constitute said tallied signal blocks for said given magnetic tape recorder;

recording said tallied temporarily-stored signal blocks on said magnetic tape in said given tape recorder as said data processing function on said certain ones of said temporarily-stored signal blocks such that operation of said given tape recorder is synchronized to execution of a program in said host; and upon completion of said peripheral data processing functions on said certain ones of said signal blocks notifying said host processor whereby data processing operations of said host processor and peripheral subsystem are synchronized only with respect to certain ones of signal blocks such that synchronization between the host processor and peripheral subsystem is limited.

2. The method set forth in claim 1 further including the automatically performed steps of:

queuing said peripheral data processing functions in a FIFO queue for establishing an order of execution of said peripheral data processing functions; and inserting said actuated data processing function in said FIFO queue for enabling execution thereof before execution of other peripheral data processing functions not currently listed in said FIFO queue.

3. The method set forth in claims 1 or 2 further including the steps of:

upon receipt of each signal block and temporarily storing said received signal block giving an adumbrative indication to the said host that supplied said received and temporarily-stored signal block that a peripheral data processing function for said received and temporarily-stored signal block has been performed; and upon receipt of said SYNCHRONIZE command withhold any indication of completion of any peripheral data processing function for said certain ones of said signal blocks until after such peripheral data processing functions for all said certain ones of said signal blocks have been completed.

4. A method of operating a data processing system comprising one or more host processors connected to a peripheral data processing system including at least one control unit and a plurality of peripheral devices, in which the control unit includes a buffer for temporarily storing blocks of data signals from a host processor for the peripheral devices, the method including the steps of transferring blocks of data signals from a host processor to a control unit, temporarily storing transferred blocks of data signals in the buffer of the control unit, scheduling temporarily stored blocks of signals for asynchronous transfer to peripheral devices, transferring temporarily stored blocks of signals to peripheral devices in accordance with the schedule, and sending an adumbrative signal to a host processor that a peripheral device has received a block of signals, in response to the temporary storage of the block of signals; in response to a synchronizing command received from a host processor for a particular peripheral device, setting forth in the schedule as the next asynchronous transfer the transfer of all said temporarily stored blocks of signals scheduled for that particular device to that device, and resuming after said next transfer the transfer of other stored signal blocks in accordance to the original schedule as would be applied to the other peripheral devices prior to the receipt of said synchronize command in response to the complete transfer of the block of signals to the peripheral device, signalling the host processor that the peripheral device has stored the block of signals, and in response to the synchronizing command received from the host processor, the sending of the adumbrative signal to the host processor is inhibited, if not already sent.

5. A method of operating a peripheral data processing system attached to a host processor operating with a plurality of computer programs, including the steps of transferring data signals relating to the plurality of computer programs to the peripheral subsystem as a series of signal blocks, first, temporarily storing in a data buffer a plurality of the series of signal blocks from respective ones of the programs in the peripheral system to free the host processor from storing them, asynchronously to the host processor operations, operating the peripheral system to perform peripheral data processing functions with respect to all the temporarily stored series of signal blocks, as part of said peripheral data processing functions respectively, secondly, recording the temporarily-stored data signals on magnetic tapes transportable past a transducer in respective magnetic tape recorders in accordance with a peripheral data processing system internal set of priorities, when temporarily storing the series of signal blocks in said data buffer, maintaining in the peripheral data processing system a tally of all signal blocks that are temporarily stored for respective magnetic tape recorders, receiving a synchronizing command in the peripheral subsystem from the host processor for actuating the peripheral system to perform said peripheral data processing functions on a certain one of the signal blocks before performing data processing operations on other ones of the signal blocks by recording the tallied temporarily-stored signal block on the magnetic tape currently in the given tape recorder as the data processing function on the certain one of the temporarily-stored signal blocks, such that operation of the given magnetic tape recorder is synchronized to execution of a program in the host processor, and upon completion of the peripheral data processing functions on the certain one of the signal blocks, notifying the host processor, whereby data processing operations of the host processor and peripheral system are synchronized only with respect to the certain one of the signal blocks, such that synchronization between the host and peripheral system is limited.

6. A method according to claim 5, including the steps of queuing the peripheral data processing functions in a FIFO queue for establishing an order of execution internal to the peripheral data processing system of the peripheral data processing functions, and inserting the data processing function to be performed in the FIFO queue for enabling execution thereof before execution of other peripheral data processing functions not yet queued therein.

7. A method according to claim 5 or 6, including the steps of, upon transfer and temporary storage of each signal block, sending an adumbrative signal to the host processor that a peripheral data processing function for the transferred signal block has been performed, and upon receipt of the synchronizing command, withholding any indication of completion of any peripheral data processing function for the certain one of the signal blocks until after the peripheral data processing function for the cerain one of the signal blocks has been completed.

* * * * *